(12) United States Patent
Hallale et al.

(10) Patent No.: US 10,822,768 B2
(45) Date of Patent: Nov. 3, 2020

(54) HYBRID LOADER BOOM ARM ASSEMBLY

(71) Applicant: Deere & Company, Moline, IL (US)

(72) Inventors: Sanjeev M. Hallale, Pune (IL);
Mohamad S. El-Zein, Bettendorf, IA (US); Hector Portillo, Monterrey (MX); Israel Priego, Augusta, GA (US); Daniel Chapa, Monterrey (MX); Nathan F. Tortorella, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 265 days.

(21) Appl. No.: 15/950,812

(22) Filed: Apr. 11, 2018

(65) Prior Publication Data
US 2019/0316315 A1 Oct. 17, 2019

(51) Int. Cl.
*E02F 3/34* (2006.01)
*E02F 3/38* (2006.01)
*E02F 3/36* (2006.01)
*B66C 23/70* (2006.01)

(52) U.S. Cl.
CPC ............... *E02F 3/382* (2013.01); *E02F 3/34* (2013.01); *E02F 3/369* (2013.01); *B66C 23/70* (2013.01)

(58) Field of Classification Search
CPC .. B66C 23/70; E02F 3/34; E02F 3/369; E02F 3/38; E02F 3/382
USPC ........ 414/685, 686, 722, 727; 403/292, 293, 403/295
See application file for complete search history.

(56) References Cited

U.S. PATENT DOCUMENTS

| 3,722,864 | A |   | 3/1973  | Borer et al. |
| 4,576,543 | A | * | 3/1986  | Kuchyt ............... A01D 87/0069 |
|           |   |   |         | 414/685 |
| 4,904,151 | A | * | 2/1990  | Biemans ................... E02F 3/34 |
|           |   |   |         | 172/817 |
| 5,152,659 | A | * | 10/1992 | Waka ........................ E02F 3/38 |
|           |   |   |         | 212/347 |
| 5,316,709 | A |   | 5/1994  | Ko et al. |
| 6,572,323 | B2|   | 6/2003  | Schupback |
| 6,695,568 | B2|   | 2/2004  | Bares et al. |

(Continued)

FOREIGN PATENT DOCUMENTS

DE 102015209918 A   12/2016
DE 202018104059 U1 * 7/2018 .............. E02F 3/627

(Continued)

OTHER PUBLICATIONS

European Search Report issued in related application No. 19163533. 3, dated Aug. 19, 2019, 8 pages.

(Continued)

*Primary Examiner* — Saul Rodriguez
*Assistant Examiner* — Brendan P Tighe
(74) *Attorney, Agent, or Firm* — Tucker Ellis LLP

(57) ABSTRACT

A hybrid loader boom arm assembly for a loader work vehicle includes an arm assembly. The arm assembly includes a hollow first beam formed from a lightweight material and a block formed from a second lightweight material. The block has a first block end received within a first end of the first beam. The arm assembly includes at least one first steel reinforcing plate coupled to the first beam at the end, and at least one connecting plate coupled to the at least one first reinforcing plate.

20 Claims, 29 Drawing Sheets

(56) References Cited

U.S. PATENT DOCUMENTS

| | | | |
|---|---|---|---|
| 6,726,437 B2 * | 4/2004 | Albright | B66C 23/705 414/718 |
| 7,273,342 B2 * | 9/2007 | DeSilvio | E02F 3/06 414/680 |
| D584,749 S * | 1/2009 | Smith | D15/28 |
| 8,505,258 B2 | 8/2013 | Durney | |
| 8,708,171 B2 | 4/2014 | Schmidt et al. | |
| 8,974,172 B2 | 3/2015 | Nishi | |
| 9,546,498 B2 | 1/2017 | Britt, Jr. | |
| 2002/0170212 A1 * | 11/2002 | Sasaki | E02F 3/38 37/466 |
| 2003/0131682 A1 * | 7/2003 | Crane | E02F 3/966 403/167 |
| 2003/0223851 A1 * | 12/2003 | Muramoto | E02F 3/382 414/686 |
| 2006/0182597 A1 * | 8/2006 | Higashikawa | E02F 3/34 414/722 |
| 2006/0182598 A1 * | 8/2006 | Fukudome | E02F 3/6273 414/722 |
| 2007/0224027 A1 * | 9/2007 | Nishi | E02F 3/627 414/722 |
| 2010/0158653 A1 * | 6/2010 | Webb | E02F 9/2275 414/722 |
| 2012/0177471 A1 | 7/2012 | Valentini et al. | |
| 2013/0017049 A1 * | 1/2013 | Nishi | E02F 3/627 414/727 |
| 2014/0079523 A1 | 3/2014 | Jensen et al. | |
| 2015/0003949 A1 | 1/2015 | Kusama | |
| 2015/0090850 A1 | 4/2015 | Maini et al. | |
| 2019/0316315 A1 * | 10/2019 | Hallale | E02F 3/382 |
| 2019/0316317 A1 * | 10/2019 | Hallale | E02F 3/369 |

FOREIGN PATENT DOCUMENTS

| | | | |
|---|---|---|---|
| EP | 1387012 A2 | 2/2004 | |
| KR | 20070008814 A | 1/2007 | |
| KR | 20090085411 A | 8/2009 | |
| KR | 20140100675 A | 8/2014 | |
| WO | 9904104 A1 | 1/1999 | |
| WO | 2009094727 A1 | 8/2009 | |
| WO | WO-2019123145 A1 * | 6/2019 | B66C 23/022 |

OTHER PUBLICATIONS

European Search Report issued in related application No. 19163524.2, dated Aug. 19, 2019, 8 pages.

* cited by examiner

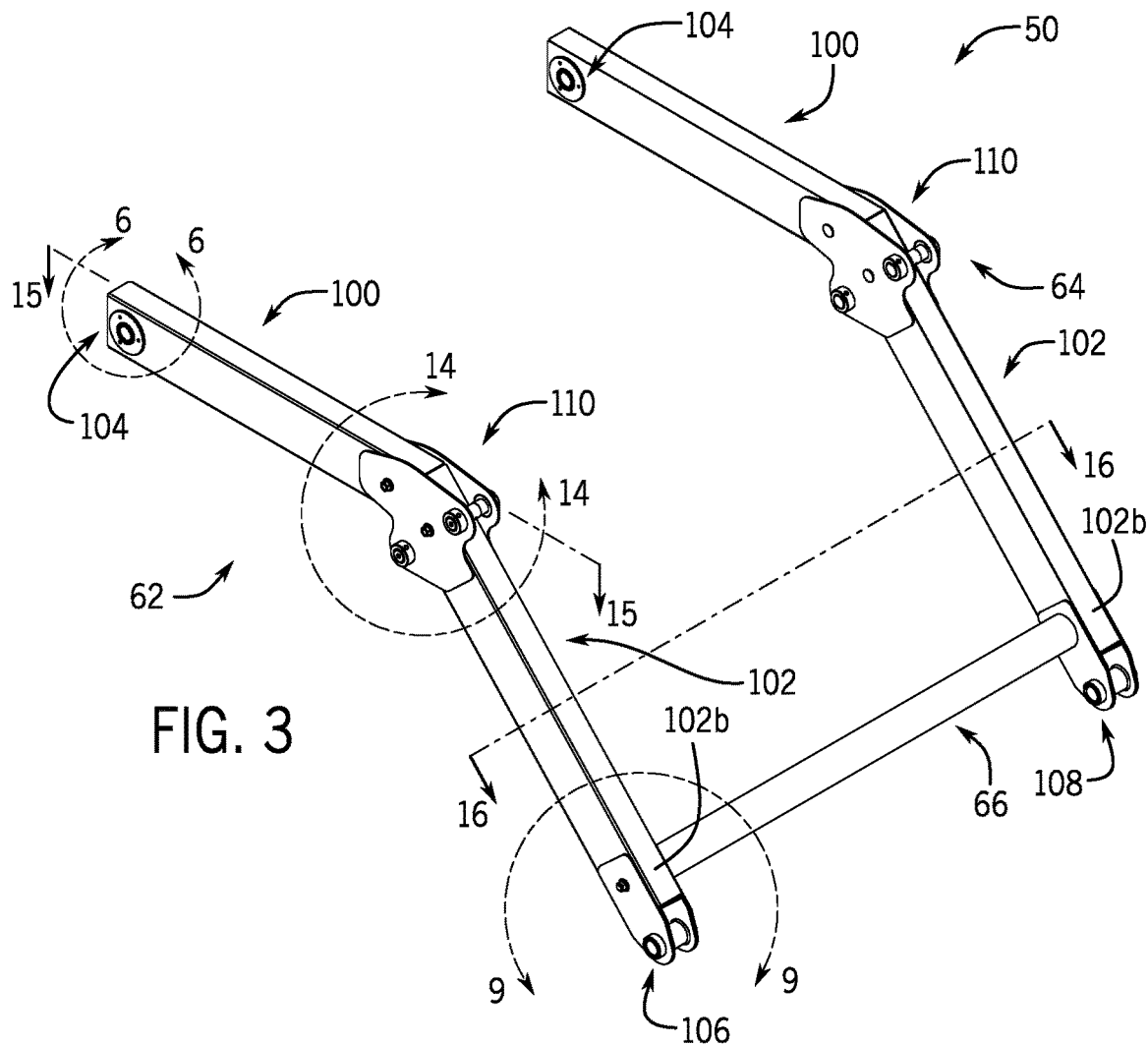
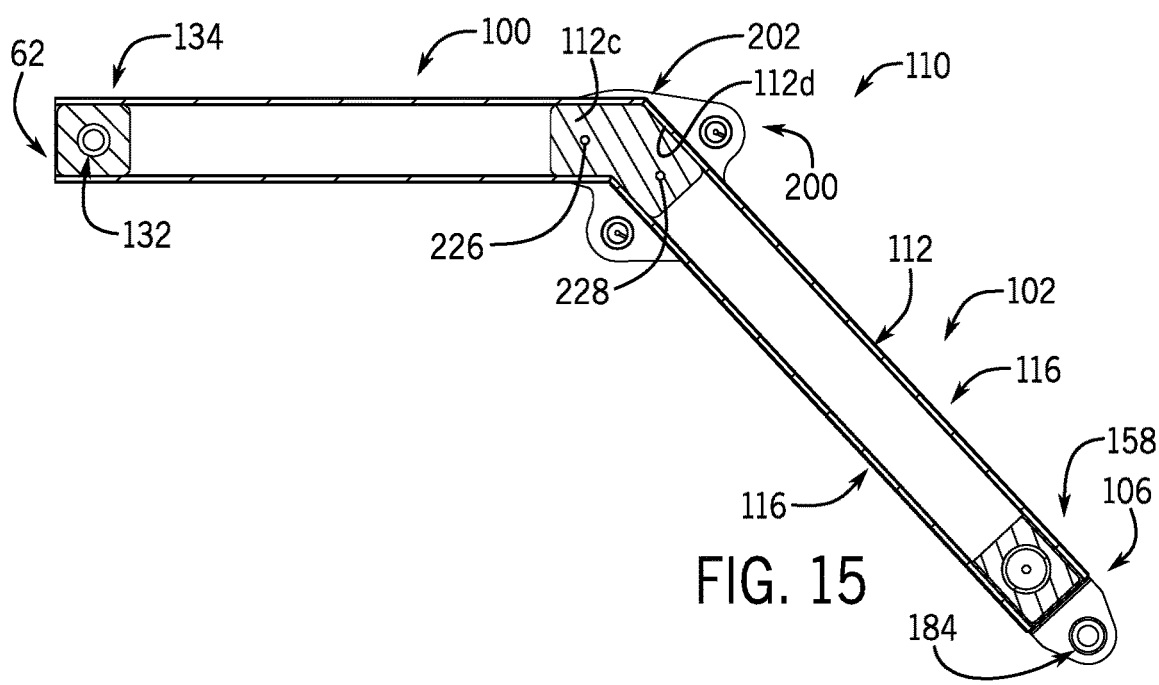

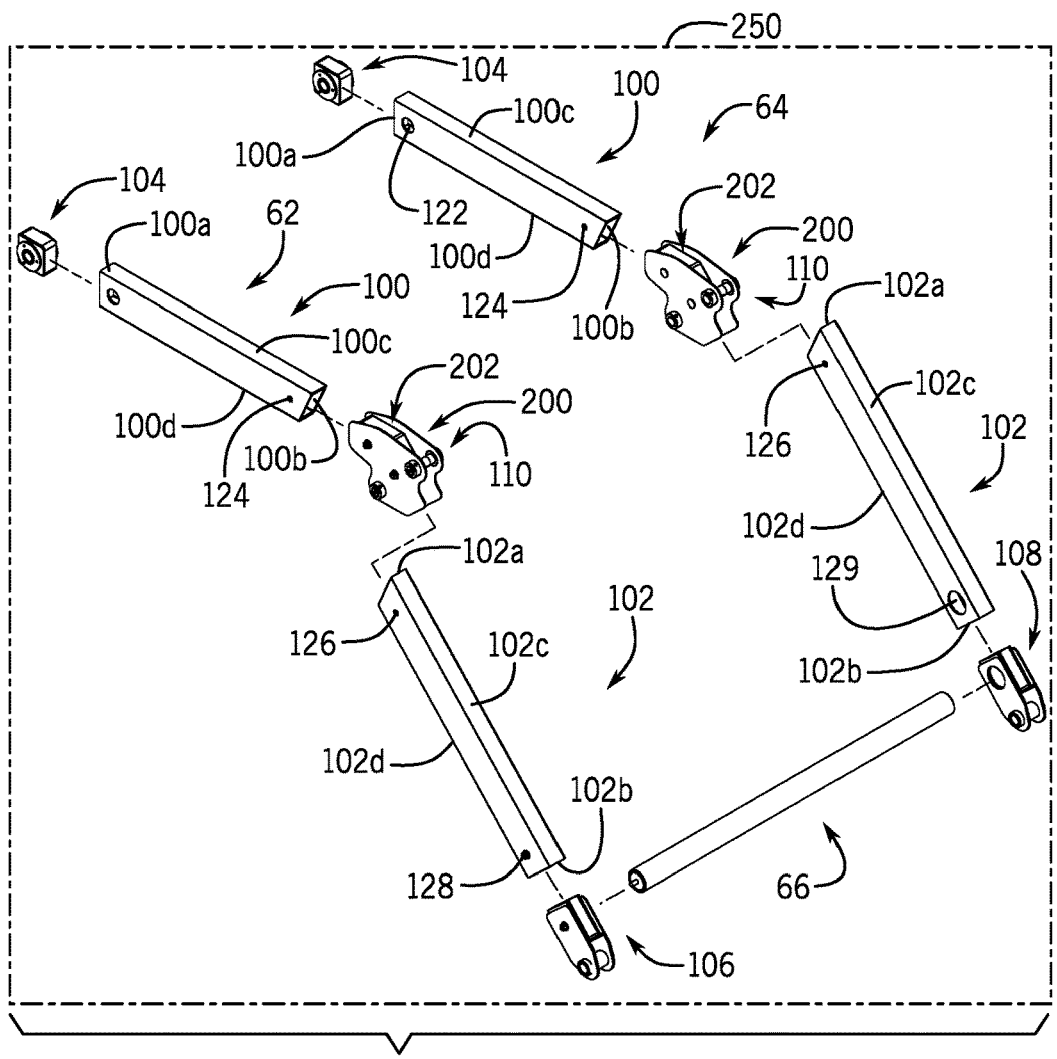
FIG. 5      FIG. 4
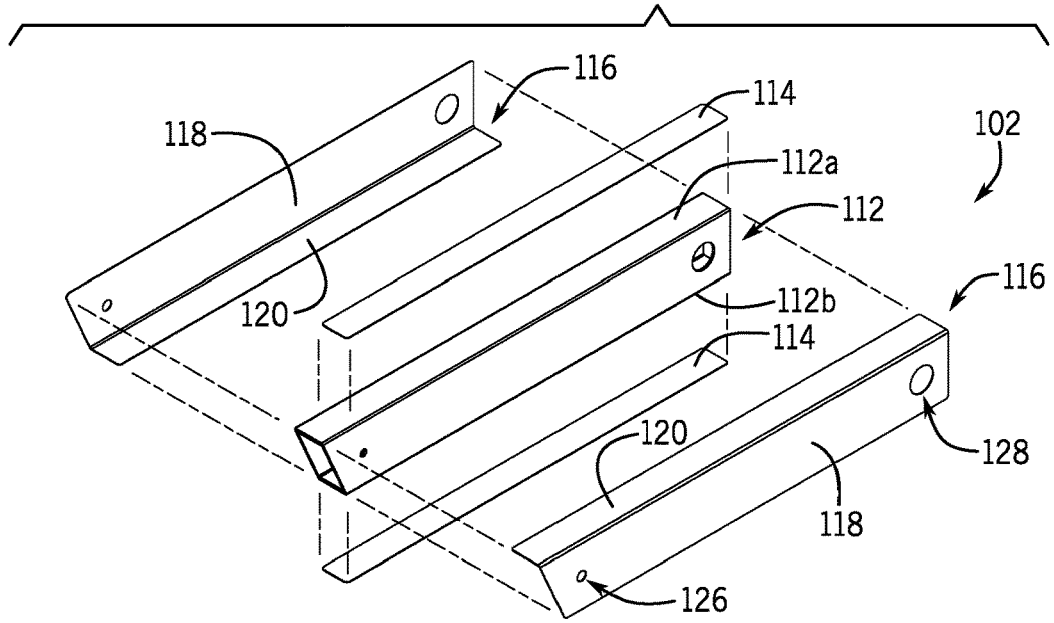

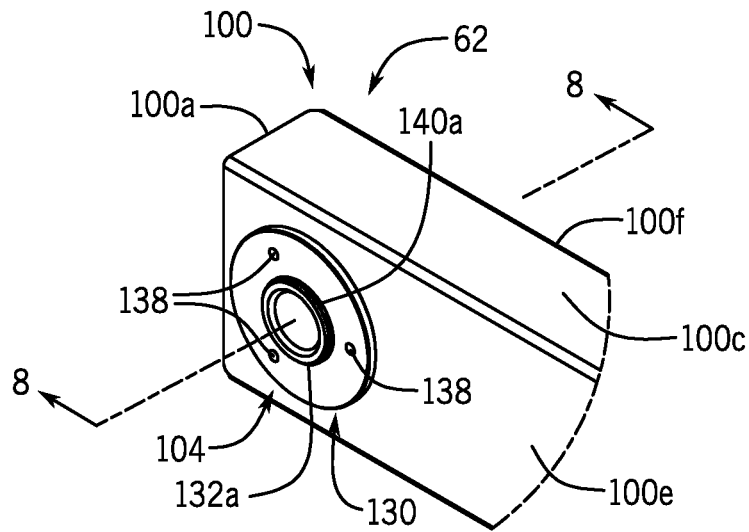
FIG. 6
FIG. 7
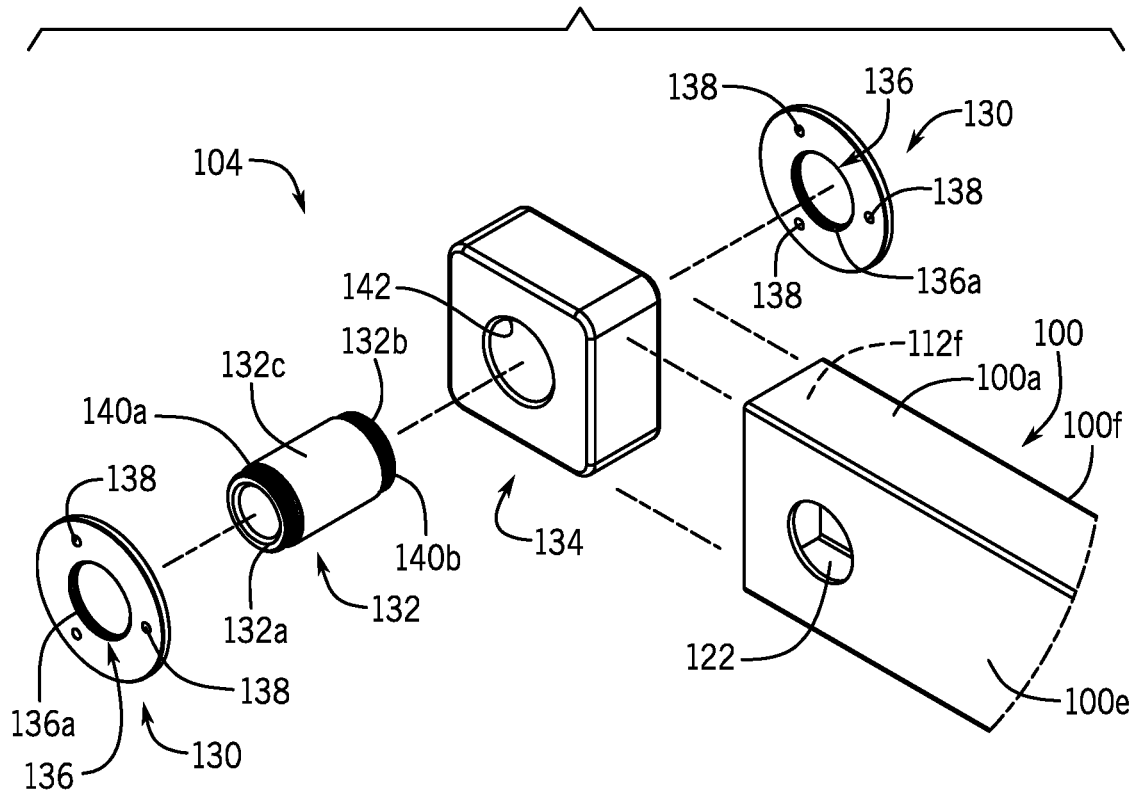

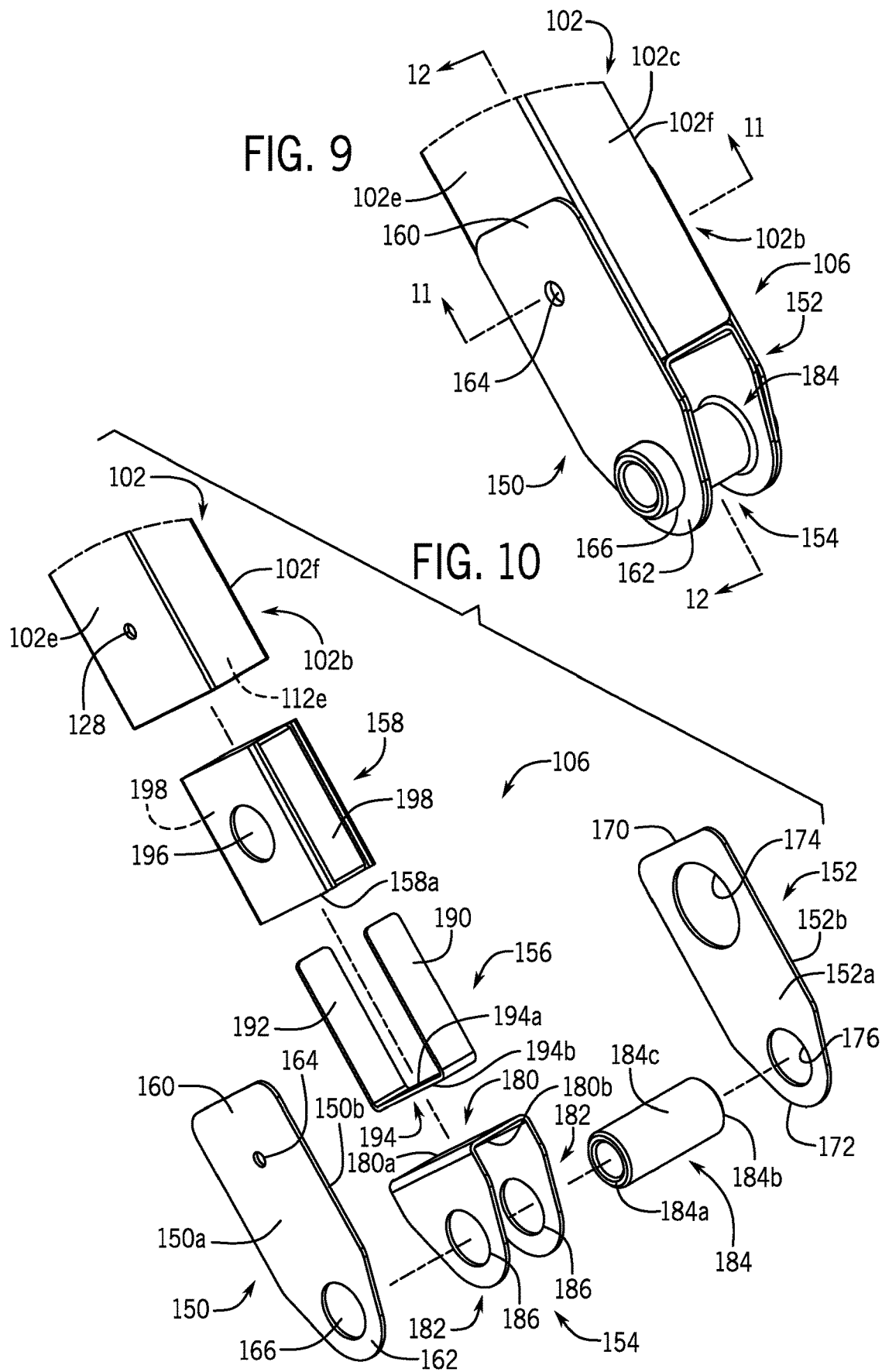

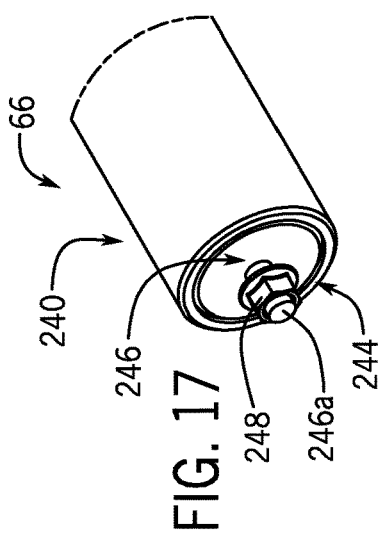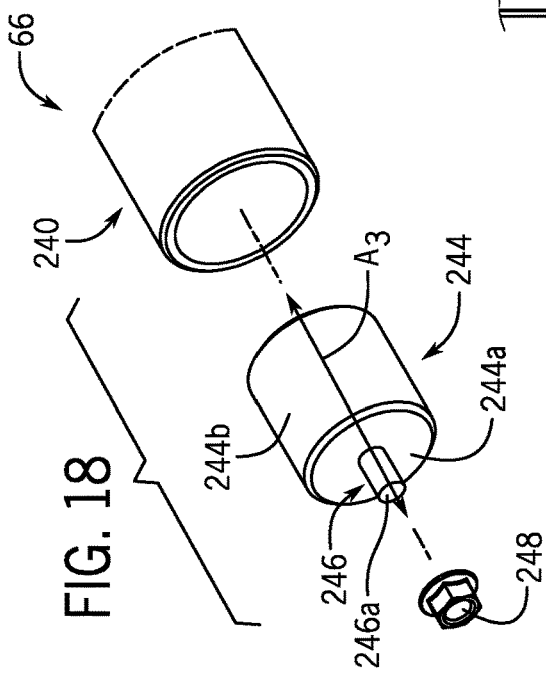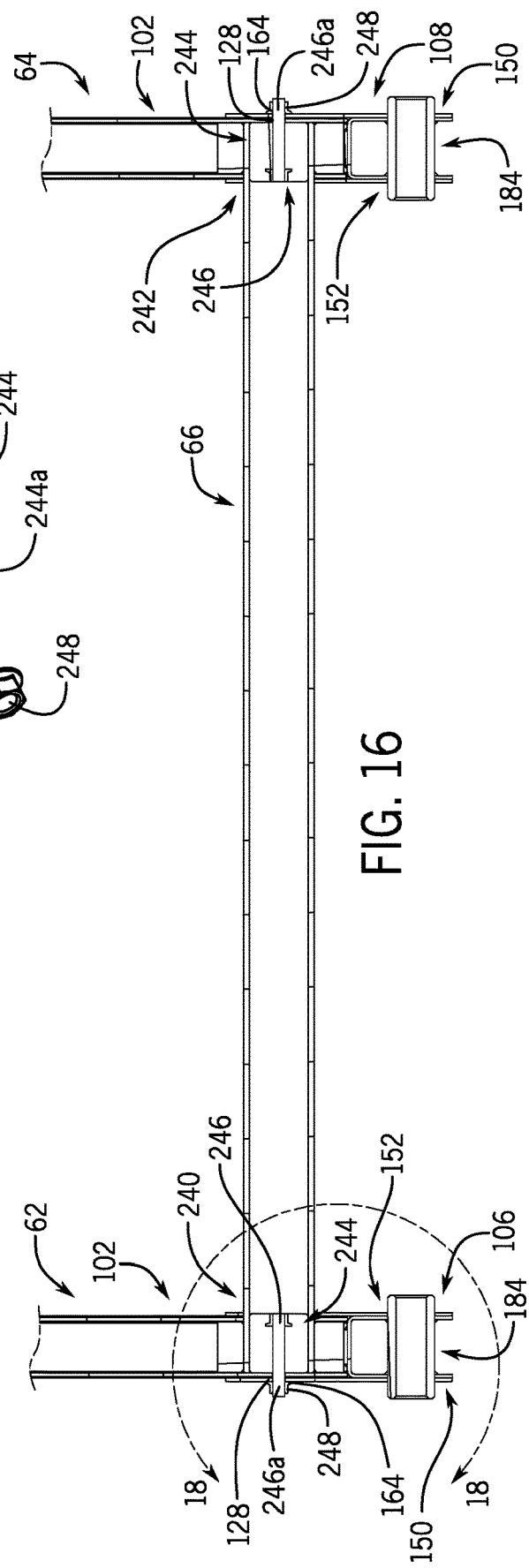

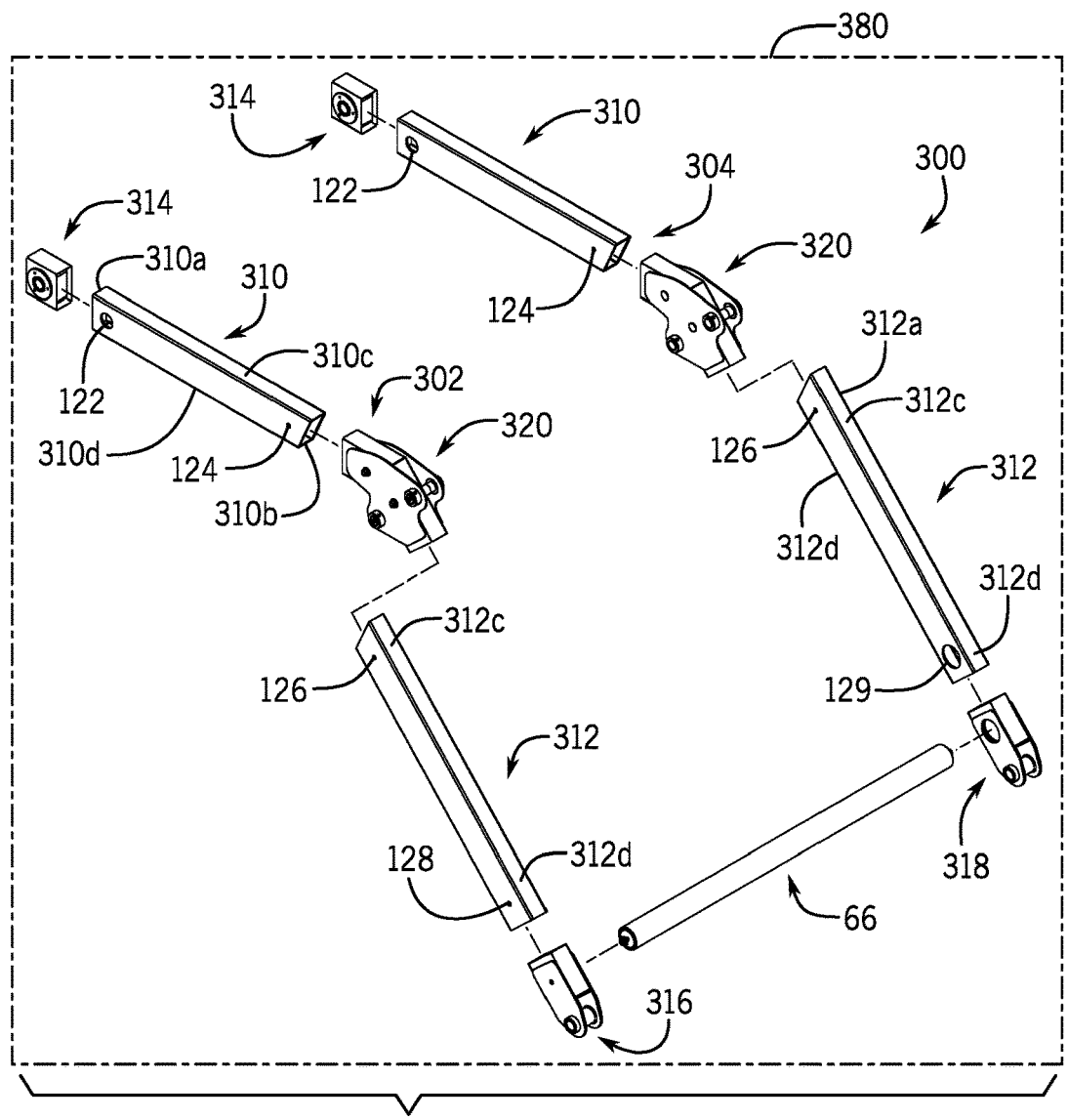
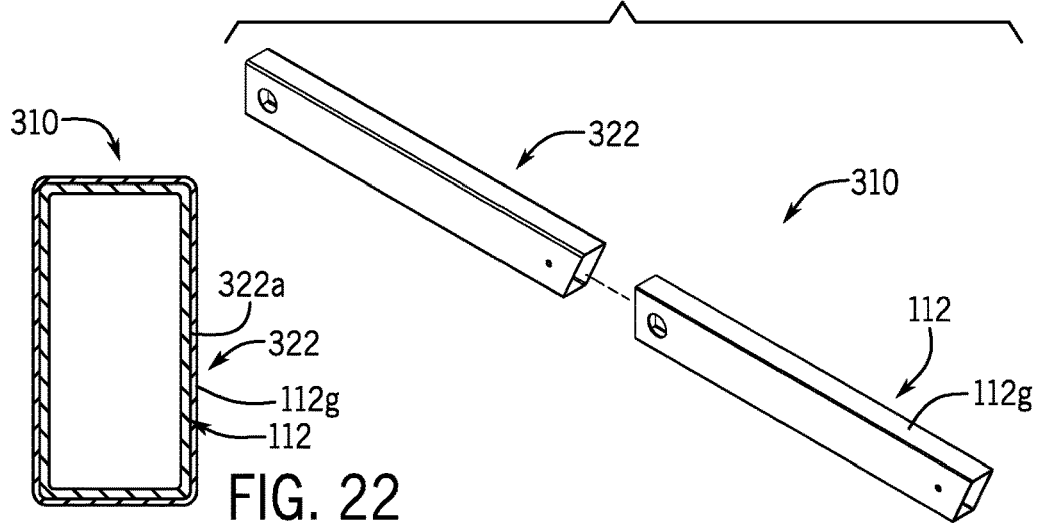
FIG. 23   FIG. 21
FIG. 22

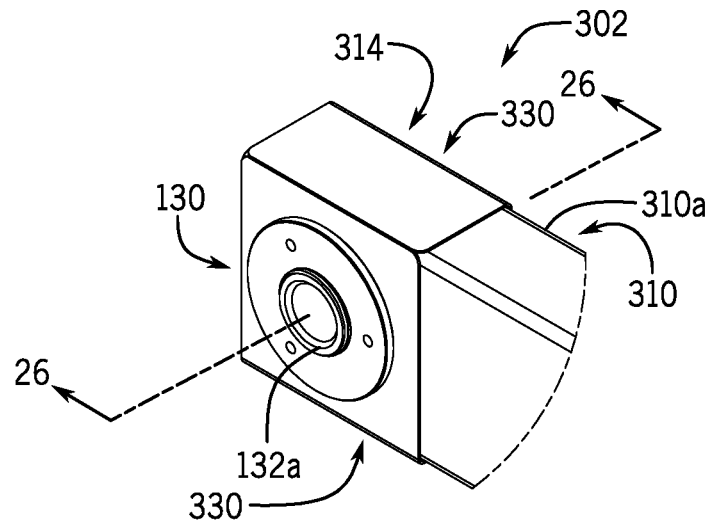
FIG. 24
FIG. 25
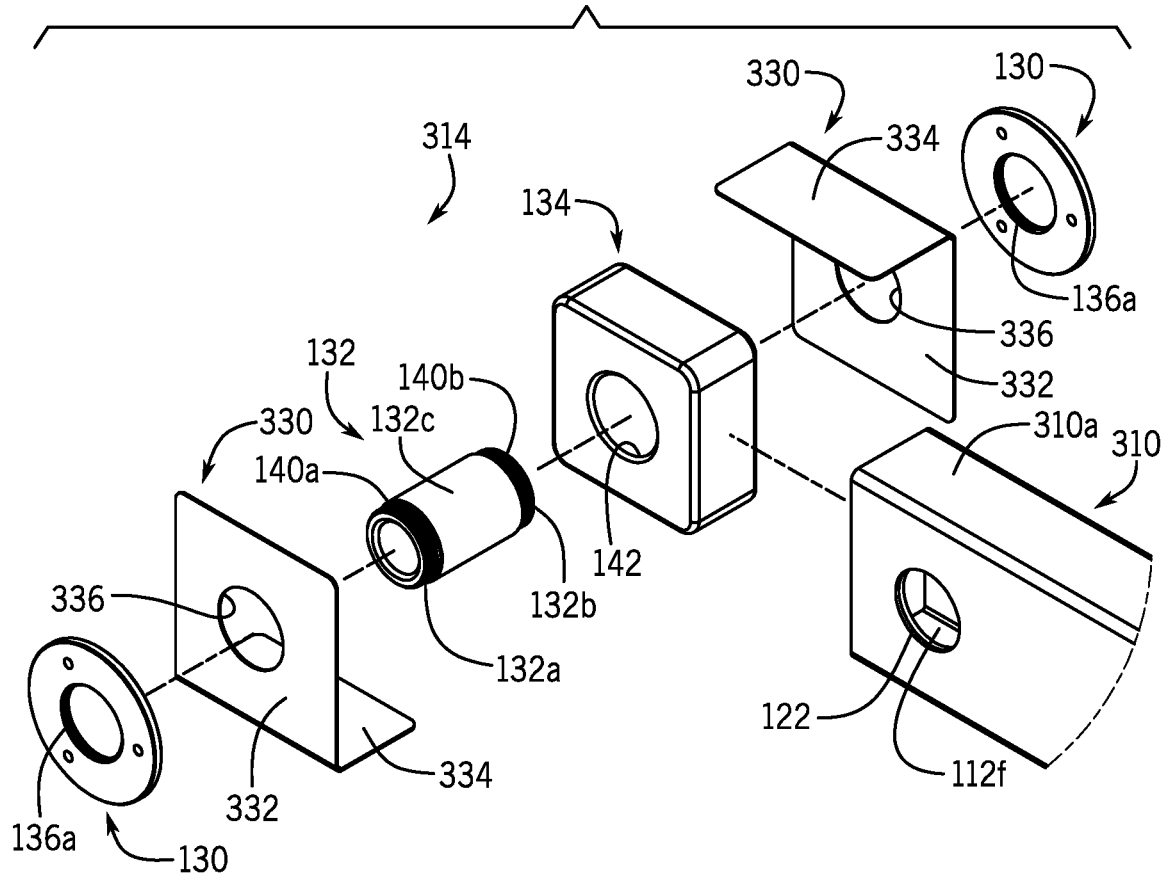

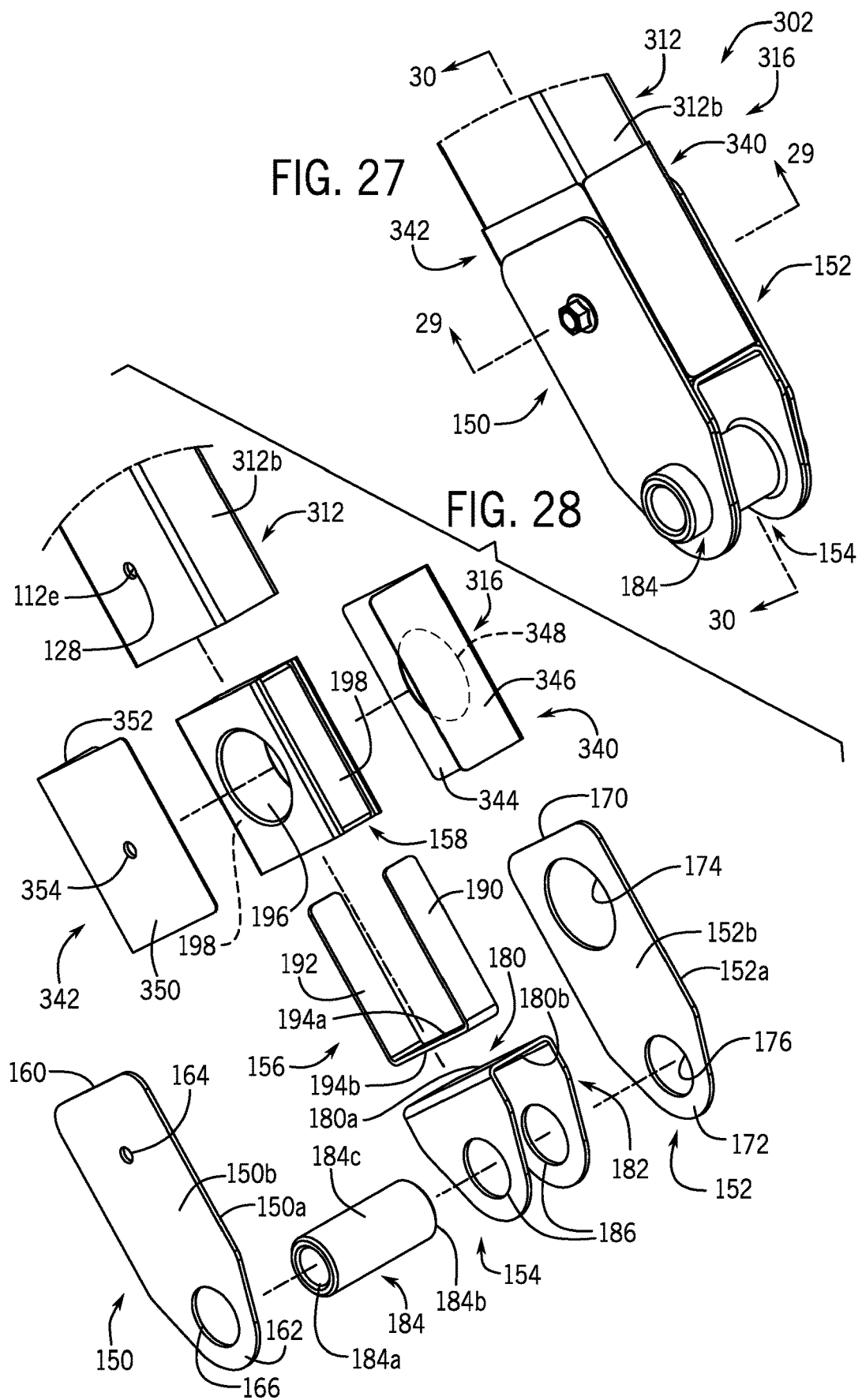

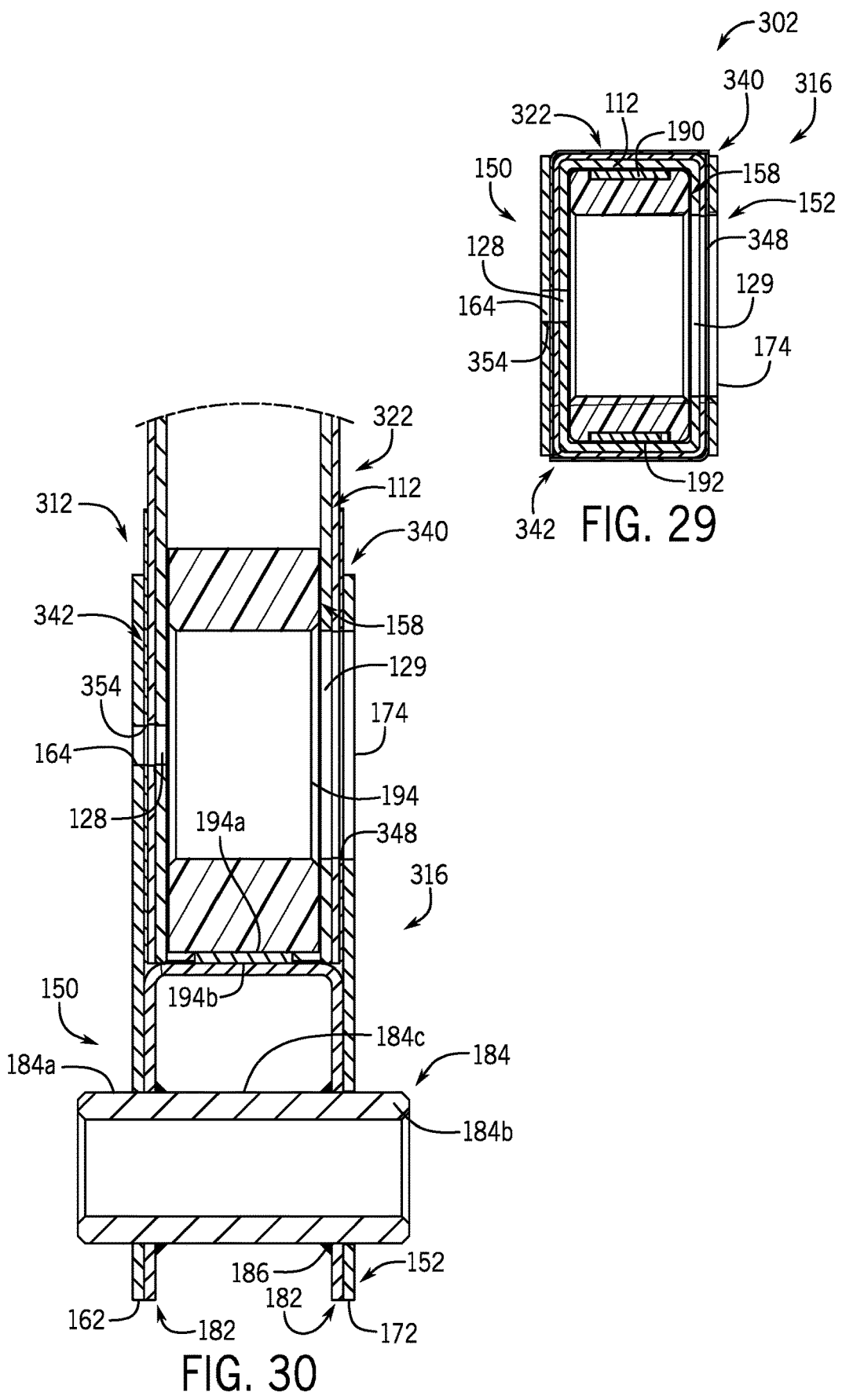

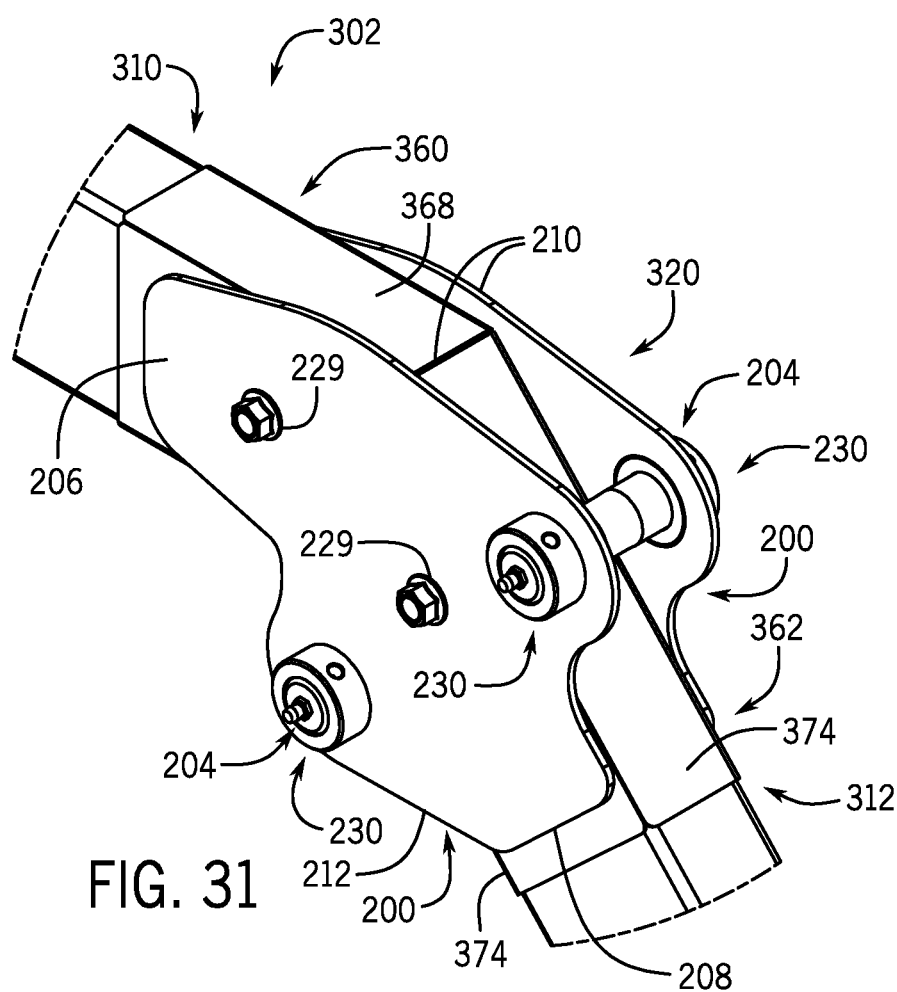

US 10,822,768 B2

HYBRID LOADER BOOM ARM ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, such as loaders, and boom arm assemblies that are configured to attach a work implement, such as a bucket, to the work vehicles to carry material.

BACKGROUND OF THE DISCLOSURE

In the agriculture, construction and forestry industries, various work machines, such as loaders, may be utilized in lifting and moving various materials. In certain examples, a loader may include a bucket pivotally coupled by a loader boom arms to the vehicle chassis. One or more hydraulic cylinders move the loader boom arms and/or the bucket to move the bucket between positions relative to the chassis to lift and move materials.

Various factors are considered when designing or selecting the loader boom arms and bucket arrangement used, for example, the durability and wear resistance of the loader boom arms, and the weight of material the loader boom arms can lift. These factors typically indicate that the loader boom arms be made of heavy steel plate construction to handle large volumes of material and the corresponding weight and other forces associated with loading and carrying the heavy material. This also requires a robust hydraulic system with correspondingly large-capacity pumps, accumulators, valves and cylinders. Further, wear or damage to the loader boom arms may also require replacement or vehicle downtime to repair the heavy-duty components.

SUMMARY OF THE DISCLOSURE

The disclosure provides a hybrid loader boom arm assembly in which an arm assembly and a second arm assembly formed of a lightweight material are interconnected by a torque transfer tube formed of a lightweight material.

In one aspect, the disclosure provides a hybrid loader boom arm assembly for a loader work vehicle. The loader boom arm includes an arm assembly, which includes a hollow first beam formed from a lightweight material and a block formed from a second lightweight material. The block has a first block end received within a first end of the first beam. The arm assembly includes at least one first steel reinforcing plate coupled to the first beam at the end, and at least one connecting plate coupled to the at least one first reinforcing plate.

In another aspect, the present disclosure provides a hybrid loader boom arm assembly for a loader work vehicle. The loader boom arm includes an arm assembly, which includes a hollow first beam formed from a lightweight material and a hollow second beam formed from the lightweight material. The arm assembly includes a block formed from a second lightweight material. The block has a first block end received within a first end of the first beam and a second block end received within a second end of the second beam. The block is configured to couple the first beam to the second beam. The arm assembly includes at least one first steel reinforcing plate coupled to the first beam at the end, and at least one second steel reinforcing plate coupled to the second beam at the second end. The arm assembly includes at least one connecting plate coupled to the at least one first reinforcing plate and the at least one second reinforcing plate.

The details of one or more embodiments are set forth in the accompanying drawings and the description below. Other features and advantages will become apparent from the description, the drawings, and the claims.

BRIEF DESCRIPTION OF THE DRAWINGS

FIG. 3 is a perspective view of the hybrid loader boom arm assembly of FIG. 2;

FIG. 4 is an exploded view of a first beam of one of the arm assemblies of the hybrid loader boom arm assembly of FIG. 3;

FIG. 5 is a partially exploded view of the hybrid loader boom arm assembly of FIG. 3;

FIG. 6 is a detail view of a vehicle mounting subassembly coupled to the first beam of one of the arm assemblies of the hybrid loader boom arm assembly of FIG. 3;

FIG. 7 is an exploded view of the vehicle mounting subassembly of FIG. 6;

FIG. 9 is a detail view of a bucket mount bracket subassembly coupled to a second beam of an arm assembly of the hybrid loader boom arm assembly of FIG. 3;

FIG. 10 is an exploded view of the bucket mount bracket subassembly of FIG. 9;

FIG. 15 is a cross-sectional view of one arm assembly of the hybrid loader boom arm assembly, taken along line 15-15 of FIG. 3;

FIG. 16 is a cross-sectional view of a torque transfer tube connected to the arm assembly and a second arm assembly of the hybrid loader boom arm assembly, taken along line 16-16 of FIG. 3;

FIG. 17 is a perspective view of an end of the torque transfer tube of the hybrid loader boom arm assembly of FIG. 3;

FIG. 18 is an exploded view of the end of the torque transfer tube of the hybrid loader boom arm assembly of FIG. 17;

FIG. 21 is an exploded view of a first beam of one of the arm assemblies of the hybrid loader boom arm assembly of FIG. 20;

FIG. 22 is a cross-sectional view of the first beam of the one of the arm assemblies of the hybrid loader boom arm assembly of FIG. 20, taken along line 22-22 of FIG. 20;

FIG. 23 is a partially exploded view of the hybrid loader boom arm assembly of FIG. 20;

FIG. 24 is a detail view of a vehicle mounting subassembly coupled to the first beam of one of the arm assemblies of the hybrid loader boom arm assembly of FIG. 20;

FIG. 25 is an exploded view of the vehicle mounting subassembly of FIG. 24;

FIG. 27 is a detail view of a bucket mount bracket subassembly of the hybrid loader boom arm assembly of FIG. 20;

FIG. 28 is an exploded view of the bucket mount bracket subassembly of FIG. 27;

FIG. 29 is a cross-sectional view of the bucket mount bracket subassembly, taken along line 29-29 of FIG. 27;

FIG. 30 is a cross-sectional view of the bucket mount bracket subassembly, taken along line 30-30 of FIG. 27;

FIG. 31 is a detail view of a knee mounting subassembly of the hybrid loader boom arm assembly of FIG. 20;

Like reference symbols in the various drawings indicate like elements.

DETAILED DESCRIPTION

Figure 1:
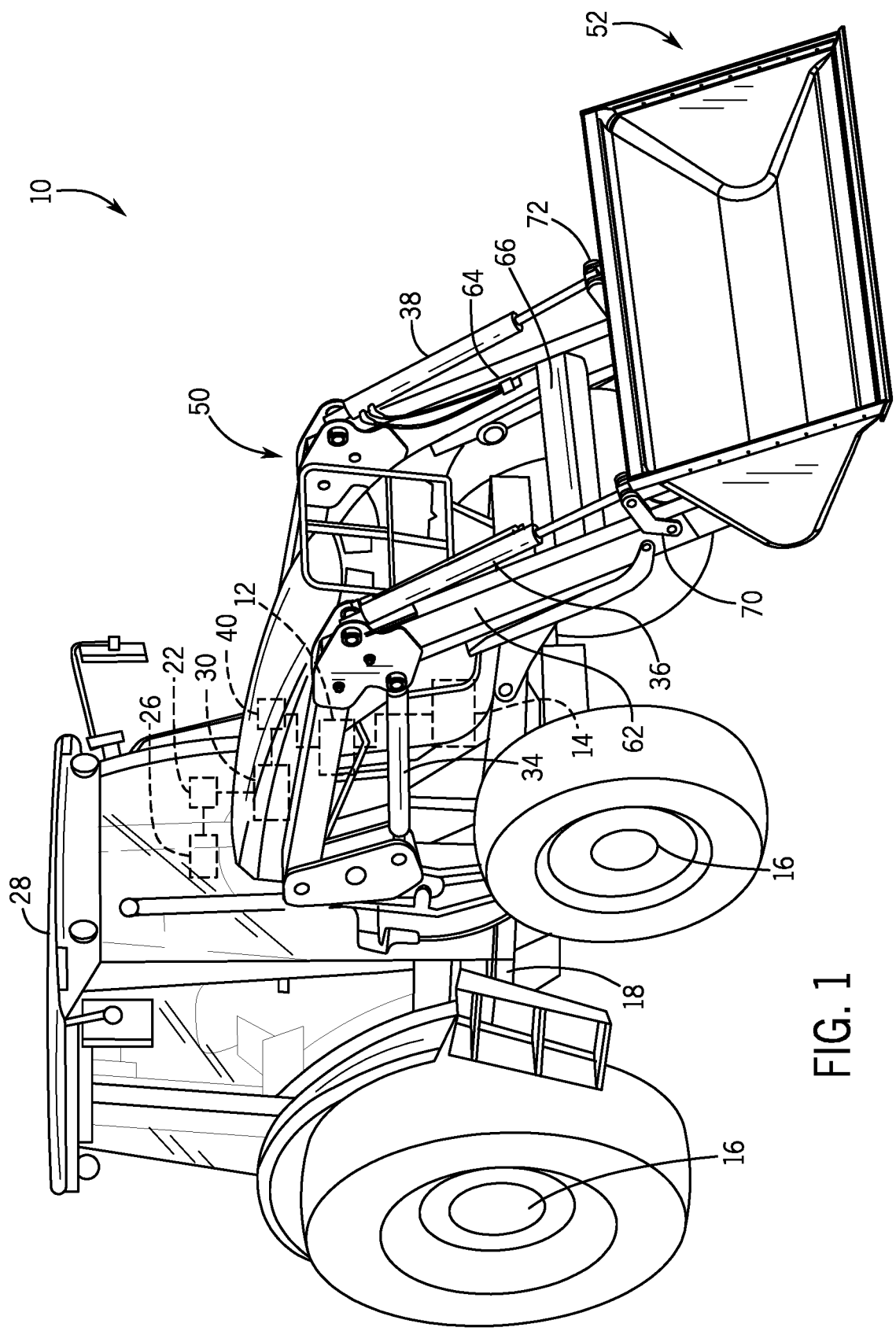
FIG. 1 is a perspective view of an example work vehicle in the form of an agricultural loader in which the disclosed hybrid loader boom arm assembly may be used.

The following describes one or more example embodiments of the disclosed hybrid loader boom arm assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Conventional loader boom arms for use in various construction and agricultural applications to couple a work implement to a work vehicle for hauling materials (e.g., dirt, sand, aggregate and so on) are typically cast or fabricated of heavy-duty construction using high-strength materials (e.g., steel). The heavy-duty construction affords conventional loader boom arms the ability to undergo extreme lifting and treatment during use. In addition to the material itself, the weight of the heavy-duty loader boom arms must be accommodated by the host machine, and specifically by its hydraulic system, to ensure that the machine performs as expected, that is will raise and lower the loader boom arms at the rate and range of motion desired. Further, as heavy and rugged as they are, encountering sufficient loading, abrasion or other forces can cause damage to conventional loader boom arms. The loader boom arms may yield (i.e., crack) due to impact or stress concentrations, or they may experience wear that may impact the performance of the machine. Damage or worn loader boom arms may need to be replaced or repaired at significant expense or operational downtime of the machine.

This disclosure provides an alternative to the conventional loader boom arms through the use of a hybrid loader boom arm assembly that is configured to couple to the work vehicle and the bucket. The disclosed hybrid loader boom arm assembly has a light-duty construction, and is composed of generally lightweight materials. For example, the disclosed hybrid loader boom arm assembly ("HLBAA") may have arm assemblies composed of a first beam, a second beam and a torque transfer tube, each of which is composed of a lightweight material. As used herein "lightweight material" generally denotes a material that has a weight that is less than a weight of steel, such that an arm assembly of the HLBAA has a weight that is less than a weight of a conventional steel arm assembly. Exemplary lightweight materials include, but are not limited to, aluminum, polymer-based material, glass-fiber reinforced polymer-based materials, carbon-fiber reinforced polymer-based materials, G10 material, and the like. In certain embodiments, internal fibrous reinforcements may be employed to enable the polymer-based material, glass-fiber reinforced polymer-based materials and carbon-fiber reinforced polymer-based materials to sustain the loading and twisting experienced during the operation of the loader. The internal fibrous reinforcements may be randomly oriented or may be oriented in the direction of loading. The internal fibrous reinforcements include, but are not limited to, glass, basalt, carbon, aramids, olefins, and cellulose-based materials. The HLBAA generally has a weight that is about 10% to about 20% lighter than conventional steel loader boom arms. This reduces fuel consumption, and may enable the use of a light-duty hydraulic system. In this way, the disclosed HLBAA may have both lightweight and low-cost attributes.

In addition, the first beam, the second beam and the torque transfer tube that make up the HBLAA may be coupled together using various joining techniques, including the use of an adhesive and adhesive bonds. The adhesive used with the HBLAA may include, but is not limited to, a polyurethane-based adhesive, epoxy, etc. Generally, the lightweight construction of the HBLAA enables the HBLAA to be packaged in regular packaging, and transported in a disassembled state, which reduces shipping and transportation costs. The HBLAA may be assembled at the customer's location or other location remote from the manufacturing facility, which increases a volume of HBLAA that may be transported in a transportation vehicle, for example. The HBLAA may be shipped as a kit and bonded at the customer's location, or assembled in the factory and shipped to the customer. As used herein, the adhesives to form the adhesive bond of the HBLAA cure at room temperature and do not require special equipment to cure or assemble, which enables a customer, remote from the factory, to assemble the HBLAA. Moreover, the adhesive bonds are formed by adhesives that will break apart when exposed to a specific energy source, such as through inductive heating. This enables the customer to disassemble the HBLAA for repair or replacement of a damaged component. Further, in certain instances, the customer may be provided with a structural reinforcing patch, which the customer may adhesively bond or fasten to the damaged area to repair the HBLAA, without requiring disassembly of the HBLAA.

Figure 2:
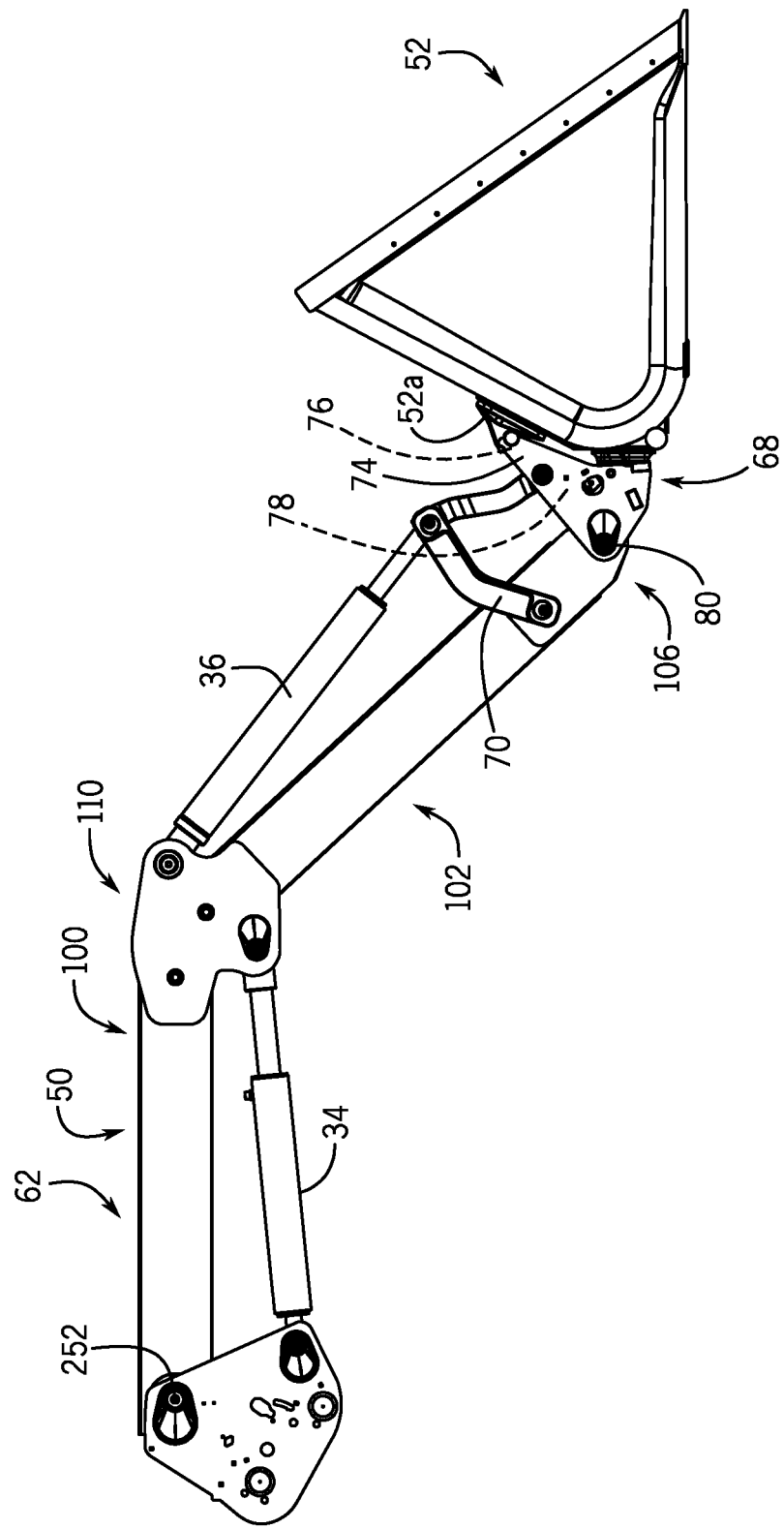
FIG. 2 is a side view of an example hybrid loader boom arm assembly coupled to a bucket as shown in FIG. 1.

The following describes one or more example implementations of the disclosed HLBAA. The HLBAA may be utilized with various machines or work vehicles, including loaders and other machines for lifting and moving various materials in the agricultural and construction industries. Referring to FIGS. 1 and 2, in some embodiments, the HLBAA may be used with an agricultural loader 10. It will be understood that the configuration of the loader 10 is presented as an example only. In this regard, the disclosed HLBAA may be implemented as a front loader removably coupled to a work vehicle, such as a tractor. Other work vehicles, such as dedicated wheel loaders used in the construction industry, may benefit from the disclosed HLBAA as well. Further, the HLBAA may be used with a skid-steer or other work vehicles that employ one or more boom arms to couple work implements to the work vehicle.

Generally, the loader 10 includes a source of propulsion, such as an engine 12 that supplies power to a transmission 14. In one example, the engine 12 is an internal combustion engine, such as a diesel engine, that is controlled by an engine control module. The transmission 14 transfers power from the engine 12 to a suitable driveline coupled to one or more driven wheels 16 of the loader 10 to enable the loader 10 to move. The engine 12, the transmission 14 and the rest of the driveline are supported by a vehicle chassis 18, which is supported off the ground by the wheels 16. As is known to one skilled in the art, the transmission 14 can include a suitable gear transmission, which can be operated in a variety of ranges containing one or more gears, including, but not limited to a park range, a neutral range, a reverse range, a drive range, a low range, a high range, etc. The transmission 14 may be controlled by a transmission control module, which is, along with the engine control module, in communication with a master controller 22 (or group of controllers).

The controller 22 may control various aspects of the operation of the loader 10 and may be configured as a computing device with associated processor devices and memory architectures, as a hard-wired computing circuit (or circuits), as a programmable circuit, as a hydraulic, electrical or electro-hydraulic controller, or otherwise. As such, the controller 22 may be configured to execute various computational and control functionality with respect to the loader 10 (or other machinery). In some embodiments, the controller 22 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 22 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 22 may be in electronic, hydraulic, mechanical, or other communication with various other systems or devices of the loader 10 (or other machinery). For example, the controller 22 may be in electronic or hydraulic communication with various actuators, sensors, and other devices within (or outside of) the loader 10, including various devices associated with a hydraulic system. The controller 22 may communicate with other systems or devices (including other controllers) in various known ways, including via a CAN bus (not shown) of the loader 10, via wireless or hydraulic communication means, or otherwise. An example location for the controller 22 is depicted in FIG. 1. It will be understood, however, that other locations are possible including other locations on the loader 10, or various remote locations. In some embodiments, the controller 22 may be configured to receive input commands and to interface with an operator via a human-machine interface 26, which may be disposed inside a cab 28 of the loader 10 for easy access by the operator. The human-machine interface 26 may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

The loader 10 also has a hydraulic system that includes one or more pumps and accumulators (designated generally by reference number 30), which may be driven by the engine 12 of the loader 10. Flow from the pumps 30 may be routed through various control valves and various conduits (e.g., flexible hoses) to drive various hydraulic cylinders, such as hydraulic cylinders 34, 36, 38, shown in FIG. 1. Flow from the pumps (and accumulators) 30 may also power various other components of the loader 10. The flow from the pumps 30 may be controlled in various ways (e.g., through control of various electro-hydraulic control valves 40) to cause movement of the hydraulic cylinders 34, 36, 38, and thus, a HLBAA 50 relative to the loader 10. In this way, for example, movement of the HLBAA 50 between various positions relative to the chassis 18 of the loader 10 may be implemented by various control signals to the pumps 30, control valves 40, and so on.

In the embodiment depicted, a bucket 52 is pivotally mounted to the HLBAA 50. The bucket 52 may comprise a conventional steel bucket, or may comprise a hybrid loader bucket assembly. As will be discussed in greater detail herein, the HLBAA 50 includes a first or arm assembly 62 and a second arm assembly 64, which are interconnected via a hollow torque transfer tube 66 to operate in parallel. The arm assemblies 62, 64 are each coupled to the chassis 18, directly or via another frame portion of the loader 10, at one end, and are coupled at an opposite end to the bucket 52 via a carrier 68, which is pivoted via first and second (left and right) pivot linkages 70, 72. In the illustrated example, the carrier 68 comprises first and second (left and right) couplers 74, 76, connected by a cross-rod 78, that mount to the distal ends of the respective arm assemblies 62, 64 via coupling pins 80. Additional pins pivotally couple the pivot linkages 70, 72 between the arm assemblies 62, 64 and the respective first and second couplers 74, 76. The pivot linkages 70, 72 enable pivotal movement of the bucket 52 upon actuation of the hydraulic cylinders 36, 38.

The hydraulic cylinders may be actuated to raise and lower the HLBAA 50 relative to the loader 10. In the illustrated example, the HLBAA 50 includes two hydraulic cylinders, namely the hydraulic cylinder 34 coupled between the chassis 18 and the arm assembly 62 and a corresponding cylinder on the opposite side of the loader (not shown) coupled between the chassis 18 and the second arm assembly 64. It should be noted that the loader 10 may have any number of hydraulic cylinders, such as one, three, etc. Each of the hydraulic cylinders 34 includes an end coupled to the chassis 18 (e.g., via a coupling pin) and an end mounted to the respective one of the arm assembly 62 and the second arm assembly 64 (e.g., via another pin). Upon activation of the hydraulic cylinders 34, the HLBAA 50 may be moved between various positions to elevate the HLBAA 50, and thus the bucket 52, relative to the chassis 18 of the loader 10.

One or more hydraulic cylinders 36 are mounted to the arm assembly 62 and the first pivot linkage 70, and one or more hydraulic cylinders 38 are mounted to the second arm assembly 64 and the second pivot linkage 72. In the illustrated example, the loader 10 includes a single hydraulic cylinder 36, 38 associated with a respective one of the arm assembly 62 and the second arm assembly 64, respectively. Each of the hydraulic cylinders 36, 38 includes an end mounted to the respective one of the arm assembly 62 and the second arm assembly 64 (via another pin) and an end mounted to the respective one of the first pivot linkage 70 and the second pivot linkage 72 (via another pin). Upon activation of the hydraulic cylinders 36, 38, the bucket 52 may be moved between various positions, namely to pivot the carrier 68, and thereby the bucket 52, relative to the HLBAA 50.

Thus, in the embodiment depicted, the bucket 52 is pivotable about the carrier 68 of the HLBAA 50 by the hydraulic cylinders 36, 38. As noted, in some embodiments, a different number or configuration of hydraulic cylinders or other actuators may be used. Thus, it will be understood that the configuration of the hydraulic system and the HLBAA 50 is presented as an example only. In this regard, in other contexts, a hoist boom (e.g. the HLBAA 50) may be generally viewed as a boom that is pivotally attached to a vehicle frame, and that is also pivotally attached to an end effector (e.g., the bucket 52). Similarly, the carrier 68 (e.g., the couplers 74, 76) may be generally viewed as a component effecting pivotal attachment of a bucket (e.g. the bucket 52) to a vehicle frame. In this light, a tilt actuator (e.g., the hydraulic cylinders 36, 38) may be generally viewed as an actuator for pivoting a receptacle with respect to a hoist boom, and the hoist actuator (e.g. the hydraulic cylinders 34) may be generally viewed as an actuator for pivoting a hoist boom with respect to a vehicle frame.

In certain applications, sensors (e.g., pressure, flow or other sensors) may be provided to observe various conditions associated with the loader 10. For example, the sensors may include one or more pressure sensors that observe a pressure within the hydraulic circuit, such as a pressure associated with at least one of the pumps 30, the control valves 40 and/or one or more hydraulic cylinders 34, 36, 38 to observe a pressure within the hydraulic cylinders and generate sensor signals based thereon. In some cases, various sensors may be disposed on or near the carrier 68 and/or the bucket 52. For example, sensors (e.g. inertial measurement sensors) may be coupled on or near the bucket 52 to observe or measure parameters including the acceleration of the HLBAA 50 and/or the bucket 52 and generate sensor signals, which may indicate if the HLBAA 50 and/or the bucket 52 is accelerating or decelerating. In some embodiments, various sensors (e.g., angular position sensors) may be configured to detect the angular orientation of the bucket 52 relative to the HLBAA 50, or to detect the angular orientation of the HLBAA 50 relative to the chassis 18, and various other indicators of the current orientation or position of the bucket 52. For example, rotary angular positon sensors may be used or linear position or displacement sensors may be used to determine the length of the hydraulic cylinders 34, 36, 38 relative to the HLBAA 50.

The bucket 52 generally defines a receptacle for carrying various materials, such as dirt, rocks, wet dirt, sand, hay, etc. In one example, the bucket 52 may receive about two cubic yards of material to over about five cubic yards of material. The bucket 52 is movable upon actuation of the hydraulic cylinders 36, 38 between a level position, a roll-back position and a dump position, along with various positions in between. In the level position, the bucket 52 can receive various materials. In the roll-back position, the bucket 52 is pivoted upward relative to the earth's surface or ground by the actuation of the hydraulic cylinders 36, 38 such that the bucket 52 may be loaded with and retain the various materials. In the dump position, the bucket 52 is pivoted downward relative to the earth's surface or ground by the actuation of the hydraulic cylinders 36, 38 such that the various materials may fall from the bucket 52 to substantially empty the bucket 52.

Figure 1A:
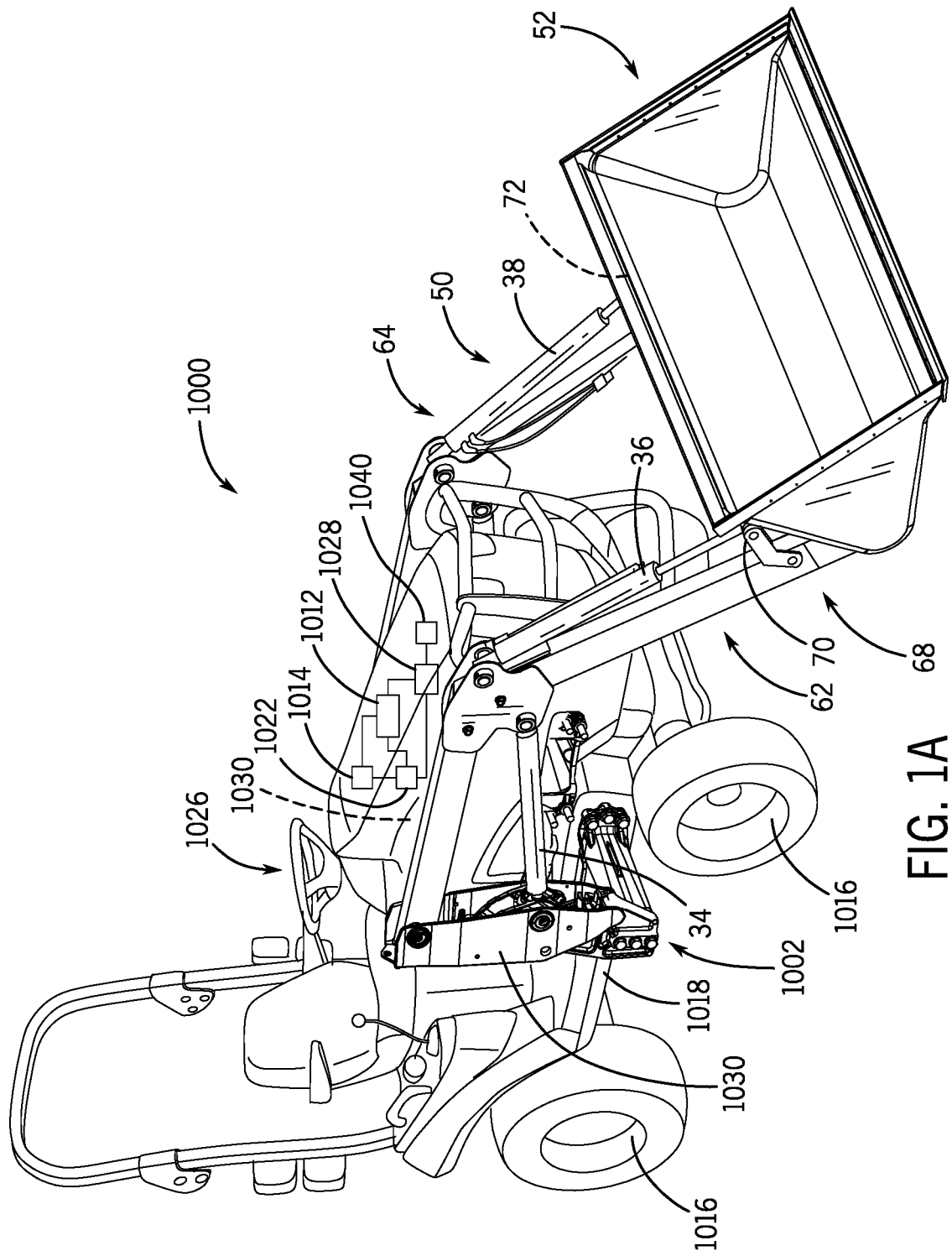
FIG. 1A is a perspective view of an example work vehicle in the form of a compact utility tractor in which the disclosed hybrid loader boom arm assembly may be used.

Referring to FIG. 1A, in some embodiments, the HLBAA 50 may be used with a compact utility tractor 1000 having a front loader 1002 removably coupled to the compact utility tractor 1000. It will be understood that the implementation of the HLBAA 50 with the compact utility tractor 1000 is presented as an example only. Generally, the compact utility tractor 1000 includes a source of propulsion, such as an engine 1012 that supplies power to a transmission 1014. In one example, the engine 1012 is an internal combustion engine, such as a diesel engine, that is controlled by an engine control module. The transmission 1014 transfers power from the engine 1012 to a suitable driveline coupled to one or more driven wheels 1016 of the compact utility tractor 1000 to enable the compact utility tractor 1000 to move. The engine 1012, the transmission 1014 and the rest of the driveline are supported by a vehicle chassis 1018, which is supported off the ground by the wheels 1016. As is known to one skilled in the art, the transmission 1014 can include a suitable gear transmission, which can be operated in a variety of ranges. The transmission 1014 may be controlled by a transmission control module, which is, along with the engine control module, in communication with a master controller 1022 (or group of controllers).

The controller 1022 may control various aspects of the operation of the compact utility tractor 1000 and may be configured as a computing device with associated processor devices and memory architectures, as a hard-wired computing circuit (or circuits), as a programmable circuit, as a hydraulic, electrical or electro-hydraulic controller, or otherwise. As such, the controller 1022 may be configured to execute various computational and control functionality with respect to the compact utility tractor 1000 (or other machinery). In some embodiments, the controller 1022 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 1022 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 1022 may be in electronic, hydraulic, mechanical, or other communication with various other systems or devices of the compact utility tractor 1000 (or other machinery), including the front loader 1002. For example, the controller 1022 may be in electronic or hydraulic communication with various actuators, sensors, and other devices within (or outside of) the compact utility tractor 1000, including various devices associated with a hydraulic system of the front loader 1002. The controller 1022 may communicate with other systems or devices (including other controllers) in various known ways, including via a CAN bus (not shown) of the compact utility tractor 1000, via wireless or hydraulic communication means, or otherwise. An example location for the controller 1022 is depicted in FIG. 1A. It will be understood, however, that other locations are possible including other locations on the compact utility tractor 1000, or various remote locations. In some embodiments, the controller 1022 may be configured to receive input commands and to interface with an operator via a human-machine interface 1026, which may be disposed for easy access by the operator. The human-machine interface 1026 is in communication with the controller 1022 over a suitable communication architecture, such as a CAN bus.

The human-machine interface 1026 may be configured in a variety of ways and may include one or more joysticks, various switches or levers, a steering wheel, one or more buttons, a touchscreen interface that may be overlaid on a display, a keyboard, a speaker, a microphone associated with a speech recognition system, or various other human-machine interface devices.

The compact utility tractor 1000 also has a hydraulic system that includes one or more pumps and accumulators (designated generally by reference number 1028), which may be driven by the engine 1012 of the compact utility tractor 1000. Flow from the pumps 1028 may be routed through various control valves and various conduits (e.g., flexible hoses) to drive various hydraulic cylinders, such as hydraulic cylinders 34, 36, 38 associated with the front loader 1002, shown in FIG. 1A. Flow from the pumps (and accumulators) 1028 may also power various other components of the compact utility tractor 1000. The flow from the pumps 1028 may be controlled in various ways (e.g., through control of various electro-hydraulic control valves 1040) to cause movement of the hydraulic cylinders 34, 36, 38, and thus, the front loader 1002 relative to the compact utility tractor 1000 when the front loader 1002 is mounted on the compact utility tractor 1000 through a suitable mounting arrangement. In this way, for example, movement of the front loader 1002 between various positions relative to the chassis 1018 of the compact utility tractor 1000 may be implemented by various control signals to the pumps 1028, control valves 1040, and so on.

In the embodiment depicted, the front loader 1002 includes the bucket 52 pivotally mounted to the HLBAA 50. The arm assemblies 62, 64 are each configured to be coupled to the chassis 18 via a suitable mounting arrangement, at one end, and are coupled at an opposite end to the bucket 52 via the carrier 68. The mounting arrangement may include a mast 1030 on each side of the front loader 1002 that cooperates with a mounting frame on each side of the compact utility tractor 1000 to removably couple the front loader 1002 to the compact utility tractor 1000.

As discussed with regard to FIGS. 1 and 2, the hydraulic cylinders 34 may be actuated to raise and lower the HLBAA 50 relative to the compact utility tractor 1000. In the illustrated example, the HLBAA 50 includes two hydraulic cylinders, namely the hydraulic cylinder 34 coupled between the mast 1030 of the front loader 1002 and the arm assembly 62 and a corresponding cylinder on the opposite side of the loader (not shown) coupled between the mast 1030 and the second arm assembly 64. It should be noted that the compact utility tractor 1000 may have any number of hydraulic cylinders, such as one, three, etc. Each of the hydraulic cylinders 34 includes an end coupled to the mast 1030 (e.g., via a coupling pin) and an end mounted to the respective one of the arm assemblies 62, 64 (e.g., via another pin). Upon activation of the hydraulic cylinders 34, the HLBAA 50 may be moved between various positions to elevate the HLBAA 50, and thus the bucket 52, relative to the chassis 1018 of the compact utility tractor 1000.

The one or more hydraulic cylinders 36 are mounted to the arm assembly 62 and the first pivot linkage 70, and the one or more hydraulic cylinders 38 are mounted to the second arm assembly 64 and the second pivot linkage 72. In the illustrated example, the front loader 1002 includes a single hydraulic cylinder 36, 38 associated with a respective one of the arm assemblies 62, 64, respectively. Each of the hydraulic cylinders 36, 38 includes an end mounted to a respective one of the arm assemblies 62, 64 (via a pin) and an end mounted to the respective one of the first pivot linkage 70 and the second pivot linkage 72 (via another pin). Upon activation of the hydraulic cylinders 36, 38, the bucket 52 may be moved between various positions, namely to pivot the carrier 68, and thereby the bucket 52, relative to the HLBAA 50. Thus, in the embodiment depicted, the bucket 52 is pivotable about the carrier 68 of the HLBAA 50 by the hydraulic cylinders 36, 38. As noted, in some embodiments, a different number or configuration of hydraulic cylinders or other actuators may be used. Accordingly, it will be understood that the configuration of the hydraulic system and the HLBAA 50 is presented as an example only.

Referring also to FIG. 3, the example HLBAA 50 will now be detailed. The HLBAA 50 includes the arm assembly 62, the second arm assembly 64 and the hollow torque transfer tube 66 that interconnects the arm assembly 62 and the second arm assembly 64. Each of the arm assembly 62 and the second arm assembly 64 include a first beam 100, a second beam 102, a vehicle mounting subassembly 104, a respective bucket mount bracket or bucket mount bracket subassembly 106, 108 and a knee mounting subassembly 110. Generally, the arm assembly 62 is a mirror image of the second arm assembly 64.

The first beam 100 and the second beam 102 are each formed from the lightweight material. In one example, with reference to FIG. 4, the first beam 100 and the second beam 102 are each composed of an inner tube 112, a pair of reinforcing layers 114 and a pair of reinforcing plates 116. As the first beam 100 and the second beam 102 have the same composition, the composition of the second beam 102 is illustrated in FIG. 4 with the understanding that the composition of the first beam 100 is the same. The inner tube 112 has a generally rectangular cross-section. In one example, inner tube 112 is formed from a lightweight material, including, but not limited to a polymer-based material. In this example, the inner tube 112 is composed of a polymer-based resin that includes reinforcing fibers and/or reinforcing particles. The reinforcing fibers, include, but are not limited to, glass, basalt, carbon, aramids, olefins, and/or cellulose. The polymer-based resin may be a thermoset or a thermoplastic. In the example of a thermoset polymer-based resin, the polymer-based resin includes, but is not limited to, polyurethane, epoxy, and acrylic. In the example of a thermoplastic polymer-based resin, the polymer-based resin includes, but is not limited to, polyamides, polyolefins, polycarbonates, or polyesters. The inner tube 112 is formed using wet-ply lay-up, pultrusion, hand lay-up, filament winding, extrusion, injection molding, rotomolding, blow molding, etc.

The pair of reinforcing layers 114 are each coupled to the inner tube 112. In one example, the inner tube 112 includes a first surface 112a opposite a second surface 112b, and a respective one of the reinforcing layers 114 is coupled to each of the first surface 112a and the second surface 112b. In this example, the first surface 112a and the second surface 112b are a top and a bottom surface, respectively of the inner tube 112. The pair of reinforcing layers 114 provides additional stiffness to the inner tube 112. The pair of reinforcing layers 114 are each composed of a polymer-based material, including, but not limited to, a carbon fiber reinforced polymer-based material. In one example, the carbon fibers are aligned longitudinally with the inner tube 112 in a tow form. The carbon fibers may also be a continuous strand mat or 0 degree roving, or web. The carbon fiber reinforced polymer-based material may comprise any suitable carbon fiber reinforced polymer-based material known in the art. The carbon fibers may be woven with another material, such as glass fiber, to impart impact resistance. The pair of reinforcing layers 114 are each formed using wet-ply lay-up, pultrusion, hand lay-up, filament winding, etc. The pair of reinforcing layers 114 are coupled to the inner tube 112 by an adhesive, including, but not limited to polyurethane, epoxy, acrylic, etc. As used herein, "adhesive" or "the adhesive" includes, but is not limited to polyurethane, epoxy, acrylic, etc.

The pair of reinforcing plates 116 is each coupled about the inner tube 112 and the pair of reinforcing layers 114 to define an exterior surface of the respective one of the first beam 100 and the second beam 102. The reinforcing plates 116 are each substantially L-shaped and include a body 118 having an inward projecting flange 120. One of the pair of reinforcing plates 116 is rotated about 180 degrees relative to the other reinforcing plate 116 such that the body 118 and the respective inward projecting flange 120 cooperate to enclose the inner tube 112 and the pair of reinforcing layers 114. Each of the reinforcing plates 116 is composed of a metal or metal alloy, such as a steel, and may be formed by stamping, machining, forging, casting, etc. Each of the reinforcing plates 116 are coupled to the inner tube 112 and the pair of reinforcing layers 114 by the adhesive.

With reference to FIG. 5, the first beam 100 includes a first end 100a and an opposite second end 100b. The first end 100a defines a respective first end of the arm assembly 62 and the second arm assembly 64. The first beam 100 defines a first through bore 122 at the first end 100a, and defines a second through bore 124 at the second end 100b. The first through bore 122 receives a portion of the vehicle mounting subassembly 104 to couple the vehicle mounting subassembly 104 to the first beam 100. The second through bore 124 is coupled to the knee mounting subassembly 110. It should be understood that each of the first through bore 122 and the second through bore 124 are defined in the first beam 100 so as to extend through each of the pair of reinforcing plates 116 and the inner tube 112. In one example, the second end 100b of the first beam 100 is beveled from a first surface 100d to a second, opposite surface 100c. By beveling the second end 100b, the second end 100b of the first beam 100 may be positioned against a cooperating bevel defined on a third end 102a of the second beam 102 so that the second beam 102 extends at an angle relative to the first beam 100.

The second beam 102 includes the third end 102a and an opposite fourth end 102b. The fourth end 102b defines a respective second end of the arm assembly 62 and the second arm assembly 64. In one example, the third end 102a of the second beam 102 is beveled from a first surface 102d to a second, opposite surface 102c. By beveling the third end 102a, the second beam 102 extends at an angle relative to the first beam 100 to assist in coupling the bucket 52 (FIG. 1) to the HLBAA 50. The second beam 102 defines a third through bore 126 at the third end 102a, and defines a fourth bore 128 and a fifth bore 129 at the fourth end 102b. The third through bore 126 is coupled to the knee mounting subassembly 110. It should be understood that the third through bore 126 is defined in the second beam 102 so as to extend through each of the pair of reinforcing plates 116 and the inner tube 112. The fourth bore 128 and the fifth bore 129 each receives a portion of the bucket mount bracket subassembly 106, 108 and the torque transfer tube 66 to couple the bucket mount bracket subassembly 106, 108 and the torque transfer tube 66 to the second beam 102. In this example, with reference to FIG. 11, the fourth bore 128 has a diameter that is less than a diameter of the fifth bore 129. The fourth bore 128 is defined in the second beam 102 so as to extend through one of the pair of reinforcing plates 116 and the inner tube 112 and so as to be coaxial with the fifth bore 129.

The fifth bore 129 is defined in the second beam 102 so as to extend through the other of the pair of reinforcing plates 116, and is sized to receive the torque transfer tube 66 therethrough.

The vehicle mounting subassembly 104 is coupled to the first end 100a of each first beam 100 of the arm assembly 62 and the second arm assembly 64. Stated another way, the vehicle mounting subassembly 104 is coupled to the first end of each of the arm assembly 62 and the second arm assembly 64 and is configured to couple the arm assembly 62 and the second arm assembly 64 to the loader 10. With reference to FIG. 5, the vehicle mounting subassembly 104 is shown in greater detail. As the vehicle mounting subassembly 104 is the same for both the arm assembly 62 and the second arm assembly 64, the vehicle mounting subassembly 104 will be shown in detail herein with regard to the first beam 100 of the arm assembly 62 for ease of description, with the understanding that the vehicle mounting subassembly 104 coupled to the second arm assembly 64 is the same.

A portion of the vehicle mounting subassembly 104 passes through the first end 100a of the first beam 100 for coupling the respective one of the arm assembly 62 and the second arm assembly 64 to the loader 10. With reference to FIG. 7, in one example, the vehicle mounting subassembly 104 includes a pair of lock plates 130, a sleeve 132 and a block 134. Each of the pair of lock plates 130 is composed of a metal or metal alloy, including, but not limited to, steel, and is cast, forged, stamped, etc. Each of the pair of lock plates 130 is annular; however, each of the pair of lock plates 130 may have any desired shape. Each of the pair of lock plates 130 defines a central bore 136. In one example, the central bore 136 includes a plurality of threads 136a. The plurality of threads 136a cooperates with the sleeve 132 to couple the vehicle mounting subassembly 104 to the first beam 100. Each of the pair of lock plates 130 may also define a plurality of coupling bores 138. In one example, each bore 138 of the plurality of coupling bores 138 are spaced apart about a perimeter or circumference of the respective one of the pair of lock plates 130 to receive a tool or instrument to facilitate rotating the respective one of the pair of lock plates 130 into threaded engagement with the sleeve 132. The pair of lock plates 130 are generally coupled to the first beam 100 so as to be on opposed surfaces 100e, 100f of the first beam 100.

The sleeve 132 is received through the first through bore 122 and the block 134. In this example, the sleeve 132 is a hollow cylinder, and includes a first end 132a opposite a second end 132b and a midsection 132c that extends between the first end 132a and the second end 132b. The sleeve 132 is composed of a metal or metal alloy, including, but not limited to, steel, and is cast, forged, stamped, etc. The first end 132a and the second end 132b each include a plurality of threads 140a, 140b. The plurality of threads 140a, 140b matingly engage with the plurality of threads 136a of a respective one of the pair of lock plates 130 to couple the vehicle mounting subassembly 104 to the first beam 100. The sleeve 132 defines a sleeve bore 141 that extends from the first end 132a to the second end 132b. The sleeve bore 141 enables a pin 252 (FIG. 2) to pass through the vehicle mounting subassembly 104 to couple the respective one of the arm assembly 62 and the second arm assembly 64 to the loader 10.

Figure 8:
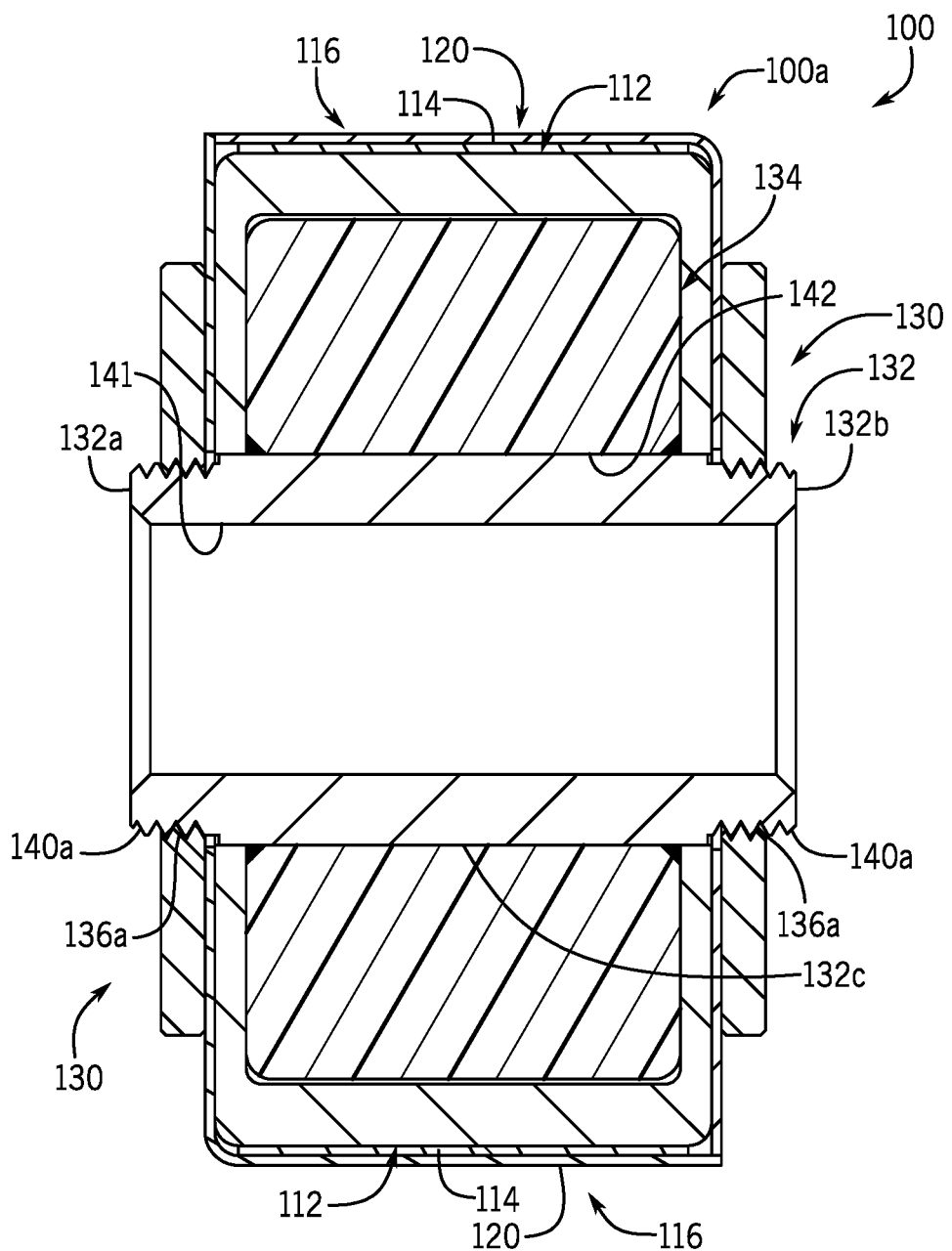
FIG. 8 is a cross-sectional view of the vehicle mounting subassembly, taken along line 8-8 of FIG. 6.

The block 134 is sized to be received wholly within the inner tube 112 at the first end 100a of the first beam 100. In one example, the block 134 is substantially square; however, the block 134 may be rectangular. The block 134 is composed of a polymer-based material, including, but not limited to, a glass-reinforced polymer-based material. For example, the block 134 is composed of G10 glass-fiber mat reinforced epoxy material. The block 134 may be formed using wet-ply lay-up, pultrusion, hand lay-up autoclave, compression molding, injection molding, extrusion, etc. The block 134 defines a central cross-bore 142. With reference to FIG. 8, the cross-bore 142 receives a portion of the sleeve 132 therethrough. The block 134 supports the sleeve 132 within the first beam 100. The block 134 may be coupled to the inner tube 112 via the adhesive, which may surround the block 134 to fixedly retain the block 134 within the inner tube 112.

With reference back to FIG. 5, the bucket mount bracket subassembly 106, 108 couples the bucket 52 (FIG. 1) to the HLBAA 50. With reference to FIGS. 9 and 10, the bucket mount bracket subassembly 106 is shown in greater detail. As the bucket mount bracket subassembly 106 is a mirror image of the bucket mount bracket subassembly 108, for ease of description, the bucket mount bracket subassembly 106 will be discussed herein with the understanding that the bucket mount bracket subassembly 108 ii is substantially the same. The bucket mount bracket subassembly 106 includes a first outer plate 150, a second inner plate 152, a flange assembly 154, a retaining flange 156 (FIG. 10) and a second block 158 (FIG. 10).

The first outer plate 150 is planar, and extends along a third surface 102e of the second beam 102. The third surface 102e is opposite a fourth surface 102f. In one example, the first outer plate 150 is composed of a metal or metal alloy, such as steel, and may be formed by stamping, casting, forging, etc. With reference to FIG. 10, the first outer plate 150 has a first plate end 160 and an opposite second plate end 162. The first plate end 160 defines a first plate bore 164, which cooperates with the torque transfer tube 66 to couple the torque transfer tube 66 to the arm assembly 62. The second plate end 162 defines a second plate bore 166, which receives a portion of the flange assembly 154. The first outer plate 150 has a first plate surface 150a opposite a second plate surface 150b. The first plate bore 164 and the second plate bore 166 are defined through the first outer plate 150 so as to extend from the first plate surface 150a to the second plate surface 150b. The first plate surface 150a defines an exterior surface of the first outer plate 150. A portion of the second plate surface 150b is coupled to the respective one of the pair of reinforcing plates 116, via welding, for example, and a remainder of the second plate surface 150b is coupled to the flange assembly 154.

The second inner plate 152 is planar, and extends along the fourth surface 102f of the second beam 102 (FIG. 9). In one example, the second inner plate 152 is composed of a metal or metal alloy, such as steel, and may be formed by stamping, casting, forging, etc. With reference to FIG. 10, the second inner plate 152 has a third plate end 170 and an opposite fourth plate end 172. The third plate end 170 defines a third plate bore 174, which cooperates with the torque transfer tube 66 to couple the torque transfer tube 66 to the arm assembly 62. The fourth plate end 172 defines a fourth plate bore 176, which receives a portion of the flange assembly 154. The second inner plate 152 has a third plate surface 152a opposite a fourth plate surface 152b. The third plate bore 174 and the fourth plate bore 176 are defined through the second inner plate 152 so as to extend from the third plate surface 152a to the fourth plate surface 152b. A portion of the third plate surface 152a is coupled to the respective one of the pair of reinforcing plates 116, via welding, for example, and a remainder of the third plate surface 152a is coupled to the flange assembly 154. The fourth plate surface 152b defines an exterior surface of the second inner plate 152.

The flange assembly 154 cooperates with the first outer plate 150 and the second inner plate 152 for coupling the bucket 52 (FIG. 1) to the arm assembly 62. In one example, the flange assembly 154 includes a base 180, a pair of retaining flanges 182 ii and a bushing 184. The base 180 and the pair of retaining flanges 182 are generally integrally formed, and may be stamped, cast, machined, etc. The base 180 and the pair of retaining flanges 182 may be composed of metal or metal alloy, including, but not limited to, steel. The base 180 is substantially flat or planar, and includes a first base surface 180a opposite a second base surface 180b. The first base surface 180a is coupled to the retaining flange 156, via welding, for example. The pair of retaining flanges 182 extend upwardly from opposed sides of the second base surface 180b. Each of the pair of retaining flanges 182 defines a bore 186. Each of the bores 186 are coaxially aligned and configured to receive the bushing 184.

The bushing 184 comprises a hollow cylinder, which has a first bushing end 184a opposite a second bushing end 184b. A bushing midsection 184c extends between the first bushing end 184a and the second bushing end 184b. The bushing 184 is composed of metal or metal alloy, including, but not limited to, steel, and is cast, forged, stamped, extruded, etc. The first bushing end 184a is received through a respective one of the bores 186 and is coupled to the respective one of the pair of retaining flanges 182, via welding, for example. The second bushing end 184b is received through a respective one of the bores 186 and is coupled to the respective one of the pair of retaining flanges 182, via welding, for example. The bushing midsection 184c is positioned between the pair of retaining flanges 182, and is configured to receive a portion of a hook 52a (FIG. 2) of the bucket 52 to couple the bucket 52 to the arm assembly 62.

The retaining flange 156 is substantially U-shaped, and is composed of metal or metal alloy, including, but not limited to, steel, and is cast, forged, stamped, extruded, etc. In this example, the retaining flange 156 includes a first leg 190, an opposite second leg 192 and a retaining base 194. The first leg 190 and the second leg 192 extend outwardly from the retaining base 194. The retaining base 194 includes a first surface 194a opposite a second surface 194b. The second surface 194b is coupled to the first base surface 180a of the base 180 of the flange assembly 154. In one example, the second surface 194b is coupled to the first base surface 180a via welding. The first leg 190, the second leg 192 and the first surface 194a of the retaining base 194 are each coupled to the second block 158.

Figure 11:
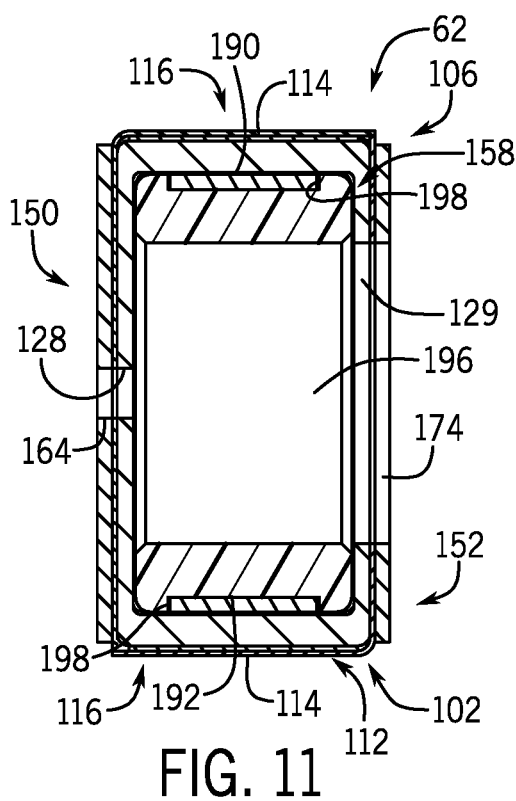
FIG. 11 is a cross-sectional view of the bucket mount bracket subassembly, taken along line 11-11 of FIG. 9.

The second block 158 is received wholly within the inner tube 112 at the fourth end 102b of the second beam 102. In one example, the second block 158 is substantially square; however, the second block 158 may be rectangular. The second block 158 is composed of a polymer-based material, including, but not limited to, a glass-reinforced polymer-based material. For example, the second block 158 is composed of G10 glass-fiber mat reinforced epoxy material. The second block 158 may be formed ii using wet-ply lay-up, pultrusion, hand lay-up autoclave, compression molding, injection molding, extrusion, etc. The second block 158 defines a central second cross-bore 196, and a pair of opposed slots 198. As will be discussed, the second cross-bore 196 receives a portion of the torque transfer tube 66 therethrough. The second block 158 supports the torque transfer tube 66 within the second beam 102. With reference to FIG. 11, the second block 158 is shown received within the inner tube 112 such that the fourth bore 128 and the fifth bore 129 of the second beam 102 are coaxially aligned with the second cross-bore 196. The pair of opposed slots 198 receive a respective one of the first leg 190 and the second leg 192. Each of the pair of opposed slots 198 include a layer of the adhesive, such that the respective one of the first leg 190 and the second leg 192 are coupled to the second block 158 via the adhesive layer defined in the respective one of the slots 198. With reference back to FIG. 10, the first surface 194a of the retaining base 194 is also coupled to a side 158a of the second block 158, via the adhesive, for example. In addition, the second block 158 may be coupled to the inner tube 112 via the adhesive, which may surround the second block 158 to fixedly retain the second block 158 within the inner tube 112.

Figure 12:
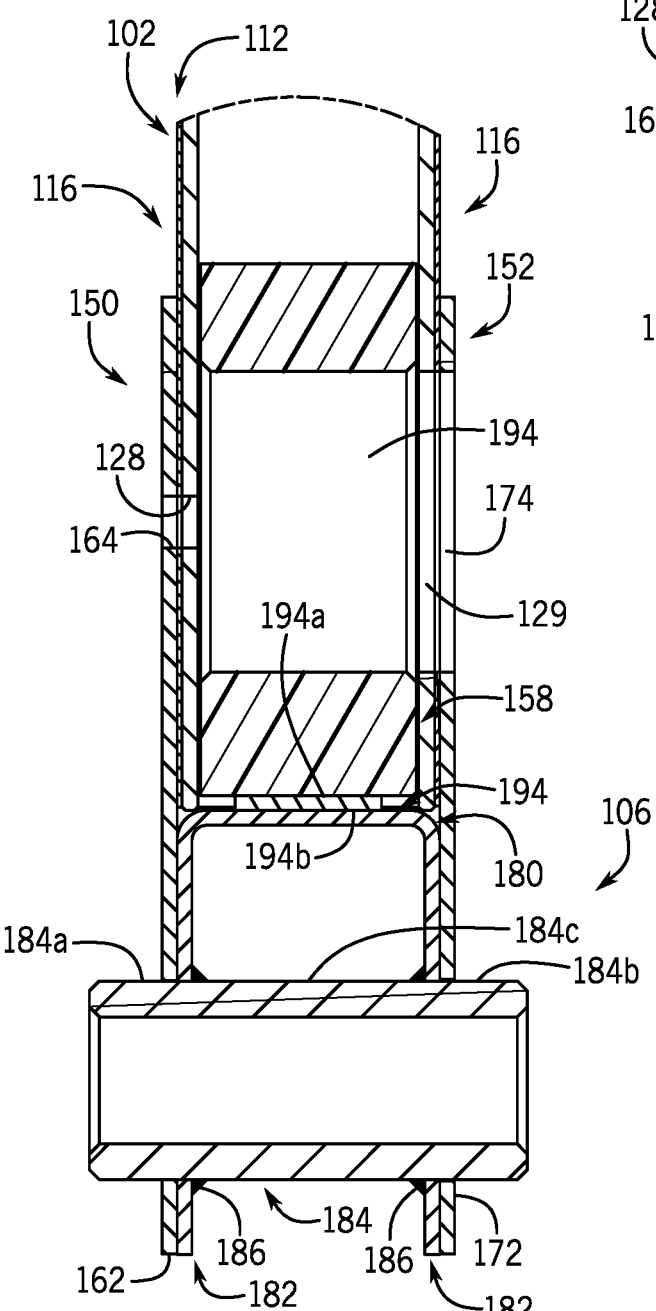
FIG. 12 is a cross-sectional view of the bucket mount bracket subassembly, taken along line 12-12 of FIG. 9.

As shown in FIG. 12, the bucket mount bracket subassembly 106 is coupled to the second beam 102 such that the second block 158 is received wholly within the inner tube 112 of the second beam 102, and the flange assembly 154 is disposed external to the second beam 102. The first leg 190 and the second leg 192 are coupled to the slots 198, and the retaining base 194 is coupled to the base 180 of the flange assembly 154.

Figure 13:
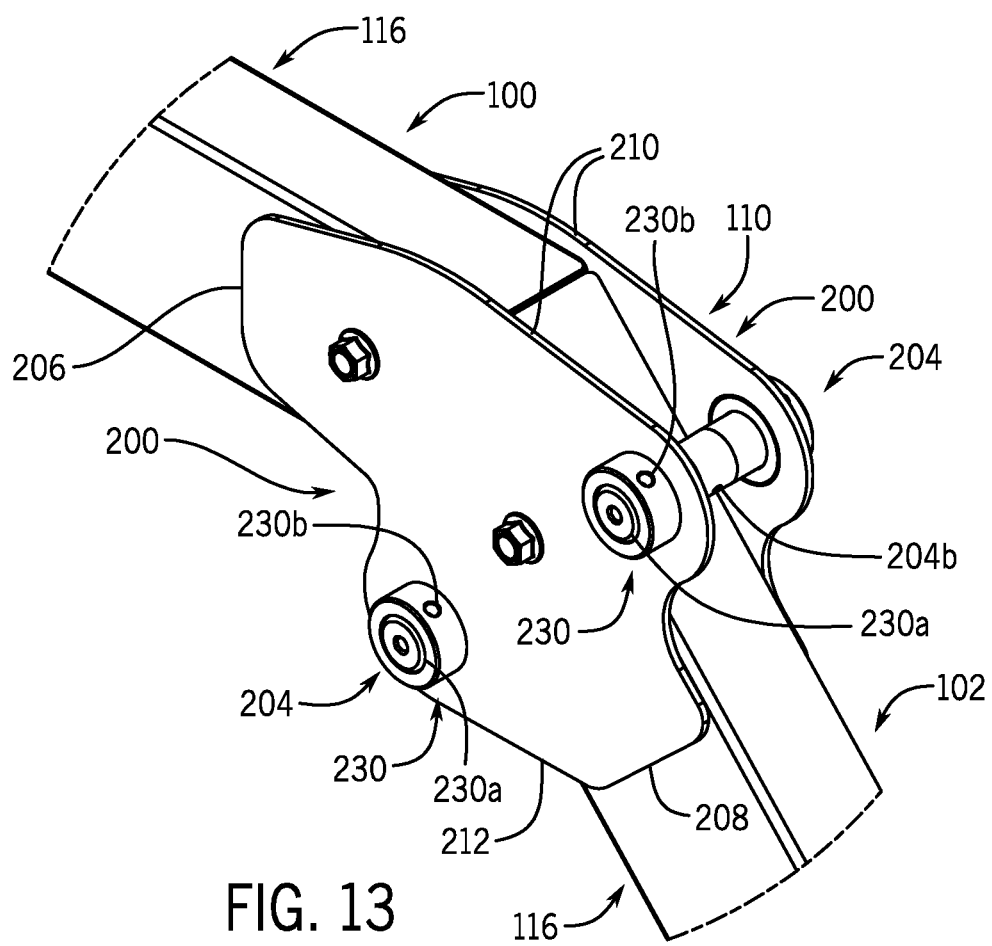
FIG. 13 is a detail view of a knee mounting subassembly of the hybrid loader boom arm assembly of FIG. 3.
Figure 14:
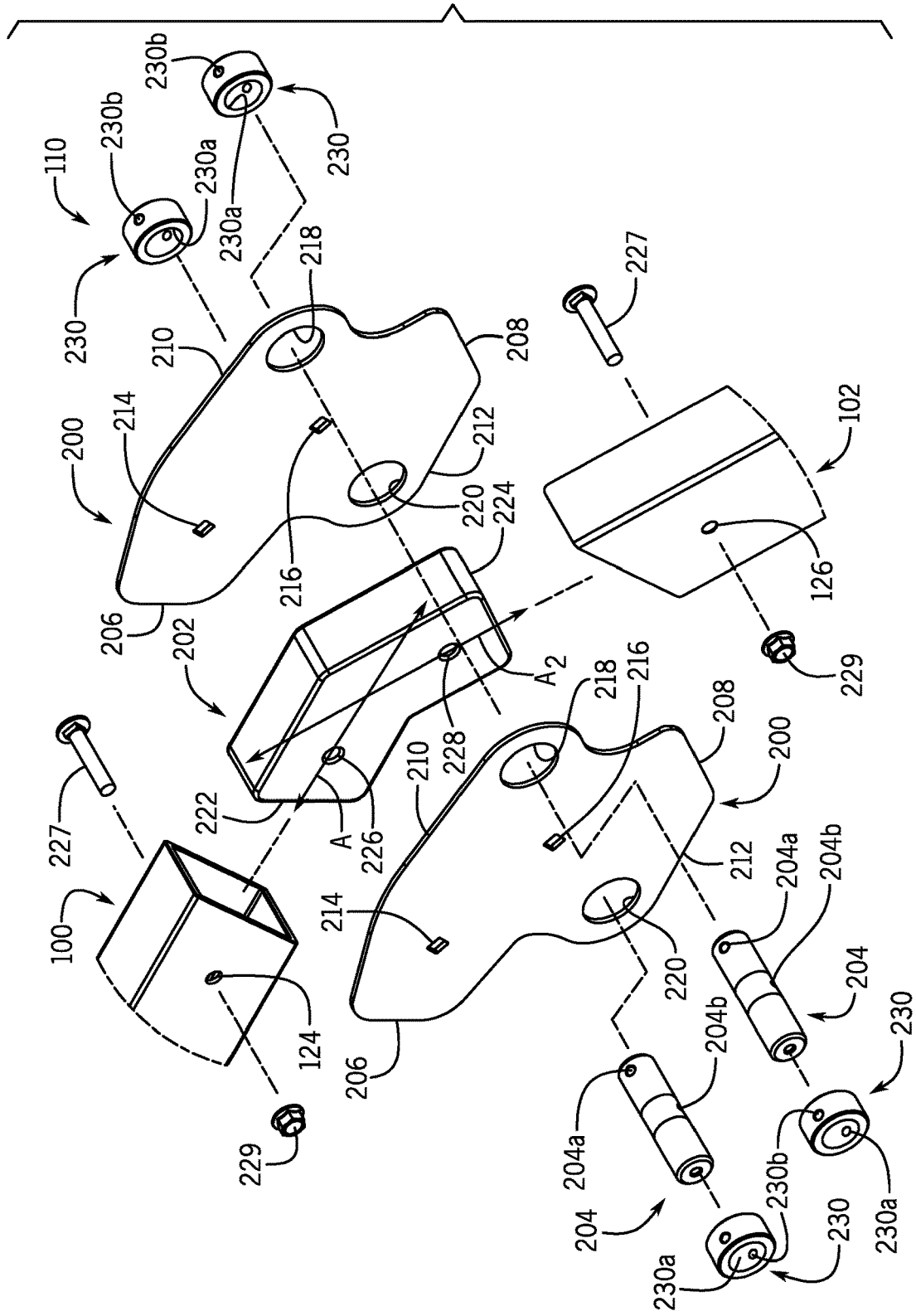
FIG. 14 is an exploded view of the knee mounting subassembly of FIG. 13.

With reference to FIG. 13, the knee mounting subassembly 110 interconnects the first beam 100 with the second beam 102. The knee mounting subassembly 110 includes a pair of knee plates 200, an angled block 202 (FIG. 14) and a pair of coupling pins 204. The pair of knee plates 200 comprises connecting plates for interconnecting the first beam 100 with the second beam 102. Each of the knee plates 200 is composed of metal or metal alloy, including, but not limited to, steel, and is cast, forged, stamped, extruded, etc. The knee plates 200 are each coupled to a respective two of the reinforcing plates 116, via welding, for example. With reference to FIG. 14, each of the pair of knee plates 200 includes a first plate end 206 opposite a second plate end 208, and a first plate side 210 opposite a second plate side 212. The first plate end 206 defines a first plate bore 214 for coupling the respective knee plate 200 to the first beam 100. A second plate bore 216 is defined through each of the knee plates 200 between the first plate bore 214 and the second plate end 208. Each of the knee plates 200 also defines a first pin bore 218 along the first plate side 210 and a second pin bore 220 along the second plate side 210. The first pin bore 218 receives one of the coupling pins 204, ii and the second pin bore 220 receives the other of the coupling pins 204.

With reference to FIG. 15, the angled block 202 is received wholly within a portion of the first beam 100 and the second beam 102 when the arm assembly 62 is assembled. The angled block 202 is composed of a polymer-based material, including, but not limited to, a glass-reinforced polymer-based material. For example, the angled block 202 is composed of G10 glass-fiber mat reinforced epoxy material. The angled block 202 may be formed using wet-ply lay-up, pultrusion, hand lay-up autoclave, compression molding, injection molding, extrusion, etc. With reference back to FIG. 14, the angled block 202 has a first block end 222 and a second block end 224. The second block end 224 is angled relative to the first block end 222. Stated another way, the first block end 222 extends along an axis A, and the second block end 224 extends along a second axis A2, and the second axis A2 is oblique to the axis A. A first block bore 226 is defined through the angled block 202 at the first block end 222, and a second block bore 228 is defined through the angled block 202 at the second block end 224. When the angled block 202 is positioned within the first beam 100 and the second beam 102, the first block bore 226 is coaxially aligned with the second through bore 124 of the first beam 100 and the second block bore 228 is coaxially aligned with the third through bore 126 of the second beam 102. When the knee plates 200 are coupled to the respective reinforcing plates 116, the first plate bore 214 is coaxially aligned with the second through bore 124 of the first beam 100 and the first block bore 226 to enable a mechanical fastener 227, such as a bolt, to be received through the first plate bore 214 of each of the knee plates 200, the first block bore 226 and the second through bore 124, and secured with a flange nut 229, for example, to couple the first beam 100 to the pair of knee plates 200. The second plate bore 216 is coaxially aligned with the third through bore 126 of the second beam 102 and the second block bore 228 to enable another mechanical fastener 227, such as a bolt, to be received through the second plate bore 216 of each of the knee plates 200, the second block bore 228 and the third through bore 126 and secured with another flange nut 229, for example, to couple the second beam 102 to the pair of knee plates 200. In addition, the angled block 202 may be coupled to the inner tube 112 of each of the first beam 100 and the second beam 102 via the adhesive, which may surround the angled block 202 to fixedly retain the angled block 202 within the inner tube 112 of each of the first beam 100 and the second beam 102.

The pair of coupling pins 204 couple the hydraulic cylinders 34, 36, 38 to the respective one of the arm assembly 62 and the second arm assembly 64. Each of the coupling pins 204 includes a pair of collars 230. The pair of collars 230 secures and retains the coupling pins 204 to the pair of knee plates 200. Generally, one of the coupling pins 204 is received through each of the first pin bores 218 and the other one of the coupling pins 204 is received through each of the second pin bores 220. A first one of the collars 230 is coupled to one end of one of the coupling pins 204, and a second one of the pair of collars 230 is coupled to the other opposed end of the respective one of the coupling pins 204. One of the pair of collars 230 is coupled to one end of the other one of the coupling pins 204, and the second one of the pair of collars 230 is coupled to the opposed end of the other coupling pins 204. Thus, each of the collars 230 includes a central collar bore 230a that receives the respective end of the coupling pin 204 therein (FIG. 13). In one example, each end of the coupling pins 204 includes a through bore 204a that cooperates with corresponding cross-bores 230b defined in each of the collars 230. A pin is received within the through bores 204a and the cross-bores 230b to couple the coupling pins 204 to the knee plates 200. Each of the coupling pins 204 may also include a bore 204b, which receives a pin, to couple the respective hydraulic cylinders 34, 36, 38 to the respective one of the arm assembly 62 and the second arm assembly 64.

With reference back to FIG. 3, the torque transfer tube 66 interconnects the arm assembly 62 and the second arm assembly 64. The torque transfer tube 66 is coupled to each of the arm assembly 62 and the second arm assembly 64 at the fourth end 102b of the respective second beam 102. With reference to FIG. 16, the torque transfer tube 66 has a first tube end 240 and an opposite second tube end 242. The first tube end 240 is coupled to the arm assembly 62, and the second tube end 242 is coupled to the second arm assembly 64. The torque transfer tube 66 is a hollow cylindrical tube, and is composed of a polymer-based material. In one example, the torque transfer tube 66 is composed of a polymer-based resin that includes reinforcing fibers and/or reinforcing particles. The reinforcing fibers, include, but are not limited to, glass, basalt, carbon, aramids, olefins, and/or cellulose. The polymer-based resin may be a thermoset or a thermoplastic. In the example of a thermoset polymer-based resin, the polymer-based resin includes, but is not limited to, polyurethane, epoxy, and acrylic. In the example of a thermoplastic polymer-based resin, the polymer-based resin includes, but is not limited to, polyamides, polyolefins, polycarbonates, or polyesters. The torque transfer tube 66 is formed using wet-ply lay-up, pultrusion, hand lay-up, filament winding, extrusion, injection molding, rotomolding, blow molding, etc.

With reference to FIG. 17, the first tube end 240 is shown in greater detail. As the first tube end 240 is a mirror image of the second tube end 242, the first tube end 240 will be described in detail herein with the understanding that the second tube end 242 is substantially the same. The first tube end 240 includes a third block 244. The third block ii 244 is received wholly within the torque transfer tube 66 at the first tube end 240. In one example, with reference to FIG. 18, the third block 244 is substantially cylindrical; however, the third block 244 may have any desired shape. The third block 244 is composed of a polymer-based material, including, but not limited to, a glass-reinforced polymer-based material. For example, the third block 244 is composed of G10 glass-fiber mat reinforced epoxy material. The third block 244 may be formed using wet-ply lay-up, pultrusion, hand lay-up autoclave, compression molding, injection molding, extrusion, etc. The third block 244 includes a mechanical fastener 246, such as a bolt, which is integrally formed with or monolithic with the third block 244. The mechanical fastener 246 is generally formed with the third block 244 such that the mechanical fastener 246 extends along a central axis A3 of the third block 244 or is centered relative to the third block 244. The mechanical fastener 246 is formed with the third block 244 such that a shank 246a of the mechanical fastener 246 extends a distance beyond the third block 244 for receiving a flange nut 248, for example, to couple the first tube end 240 to the arm assembly 62.

It should be noted that while the third block 244 is described herein as being composed of G10 material, the third block 244 may alternatively be composed of a bulk molding compound, including, but not limited to, glass-fiber reinforced thermoset or thermoplastic polymer-based material. In the example of the third block 244 composed of bulk molding compound, the mechanical fastener 246 may be molded into the bulk molding compound, via compression or injection molding, for example, to form the third block 244.

Generally, with reference to FIG. 16, when the torque transfer tube 66 is coupled to the arm assembly 62, the first tube end 240 is received through the second cross-bore 196 of the second block 158 and the shank 246a of the mechanical fastener 246 extends through the fourth bore 128 of the second beam 102 and the first plate bore 164 of the first outer plate 150. The flange nut 248 is coupled to the shank 246a and tightened to the first outer plate 150 for coupling the torque transfer tube 66 to the arm assembly 62. In addition, the adhesive may be applied to a surface 244a of the third block 244(FIG. 18) to aid in coupling the third block 244 to the inner tube 112 of the second beam 102. Further, the adhesive may be applied about a second surface 244b (FIG. 18) or the perimeter of the third block 244 to aid in coupling the third block 244 to the first tube end 240 of the torque transfer tube 66. In one example, the adhesive is also applied about the second cross-bore 196 to further couple the first tube end 240 to the second block 158.

With reference back to FIG. 5, the first beams 100, the second beams 102, the ii vehicle mounting assemblies 104, the bucket mount bracket subassemblies 106, 108, the knee mounting subassemblies 110, the torque transfer tube 66, the adhesive, the mechanical fasteners 227 and the flange nuts 229 comprise a kit 250 for the HLBAA 50. In one example, in order to assemble the arm assembly 62 and the second arm assembly 64, the reinforcing layers 114 are coupled to the inner tubes 112, via the adhesive, for example. With the angled blocks 202 formed, with reference to FIG. 15, the angled blocks 202 are inserted into a second end 112c of a respective one of the inner tubes 112 associated with the first beam 100 and a first end 112d of a respective one of the inner tubes 112 associated with the second beam 102 to couple two of the inner tubes 112 together. This is repeated to form two subassemblies, one for each of the arm assembly 62 and the second arm assembly 64. The adhesive may be applied to the angled blocks 202 and used to couple the angled blocks 202 to the inner tubes 112.

With reference to FIG. 10, with the retaining flanges 182 formed with the base 180, the bushing 184 is inserted through the bores 186 and coupled to the retaining flanges 182, via welding, for example. With the retaining flange 156 formed, the retaining flange 156 is coupled to the base 180, via welding, for example. With the second block 158 formed, the retaining flange 156 is coupled to the second block 158. Generally, with a layer of the adhesive applied to the slots 198 and the surface 158a of the second block 158, the first leg 190 and the second leg 192 are coupled to the slots 198 such that the first surface 194a contacts the surface 158a of the second block 158. The second block 158 is inserted into a second end 112e of the inner tube 112 associated with one of the second beams 102. In one example, the adhesive is applied about the second block 158 to further couple the second block 158 to the inner tube 112. This process is repeated to couple another one of the second blocks 158 to the inner tube 112 associated with the other of the second beams 102.

With reference to FIG. 7, with the blocks 134 formed, one of the blocks 134 is inserted into a first end 112d of the inner tube 112 associated with one of the first beams 100, and the other of the blocks 134 is inserted into the first end 112d of the inner tube 112 associated with the other of the first beams 100. The blocks 134 may be coupled to the inner tubes 112 via the adhesive, which may surround the blocks 134 to fixedly retain the blocks 134 within the inner tubes 112. One of the sleeves 132 is inserted through the first through bore 122 and the cross-bore 142 of the block 134 coupled to the inner tube 112 associated with the first beam 100 of the arm assembly 62, and the other of the sleeves 132 is inserted through the first through bore 122 and the cross-bore 142 of the block 134 coupled to the inner tube 112 associated with the first beam 100 of the second arm assembly 64.

With reference to FIGS. 4 and 5, with the reinforcing plates 116 formed, the reinforcing plates 116 are coupled about each of the first beam 100 and the second beam 102, via the adhesive, for example. The knee plates 200 are coupled to the reinforcing plates 116, via welding, for example. The first outer plate 150 and the second inner plate 152 are coupled to the reinforcing plates 116 associated with the second beams 102, via welding, for example. One of the pair of lock plates 130 is coupled to the first end 132a of the sleeve 132 of the arm assembly 62, and the other one of the lock plates 130 is coupled to the second end 132b to couple the sleeve 132 to the first beam 100 of the arm assembly 62. One of the pair of lock plates 130 is coupled to the first end 132a of the sleeve 132 of the second arm assembly 64, and the other one of the lock plates 130 is coupled to the second end 132b to couple the sleeve 132 to the first beam 100 of the second arm assembly 64.

With reference to FIG. 14, the mechanical fasteners 227 are inserted through the first plate bores 214 of each pair of knee plates 200 and the first block bore 226 of the angled block 202. The mechanical fasteners 227 are secured with the flange nut 229. The mechanical fasteners 227 are inserted through the second plate bores 216 of each pair of knee plates 200 and the second block bore 228 of the angled block 202. The mechanical fasteners 227 are secured with the flange nut 229 to reinforce the connection of the knee plates 200 to the respective first beam 100 and the second beam 102. The coupling pins 204 are inserted through the first pin bore 218 and the second pin bore 220, respectively, and the collars 230 are coupled about the opposed ends of the coupling pins 204. Pins are inserted through the bores 204a of the coupling pins 204 and the cross-bores 232b of the collars 230 to couple the coupling pins 204 to the respective pair of knee plates 200.

Figure 19:
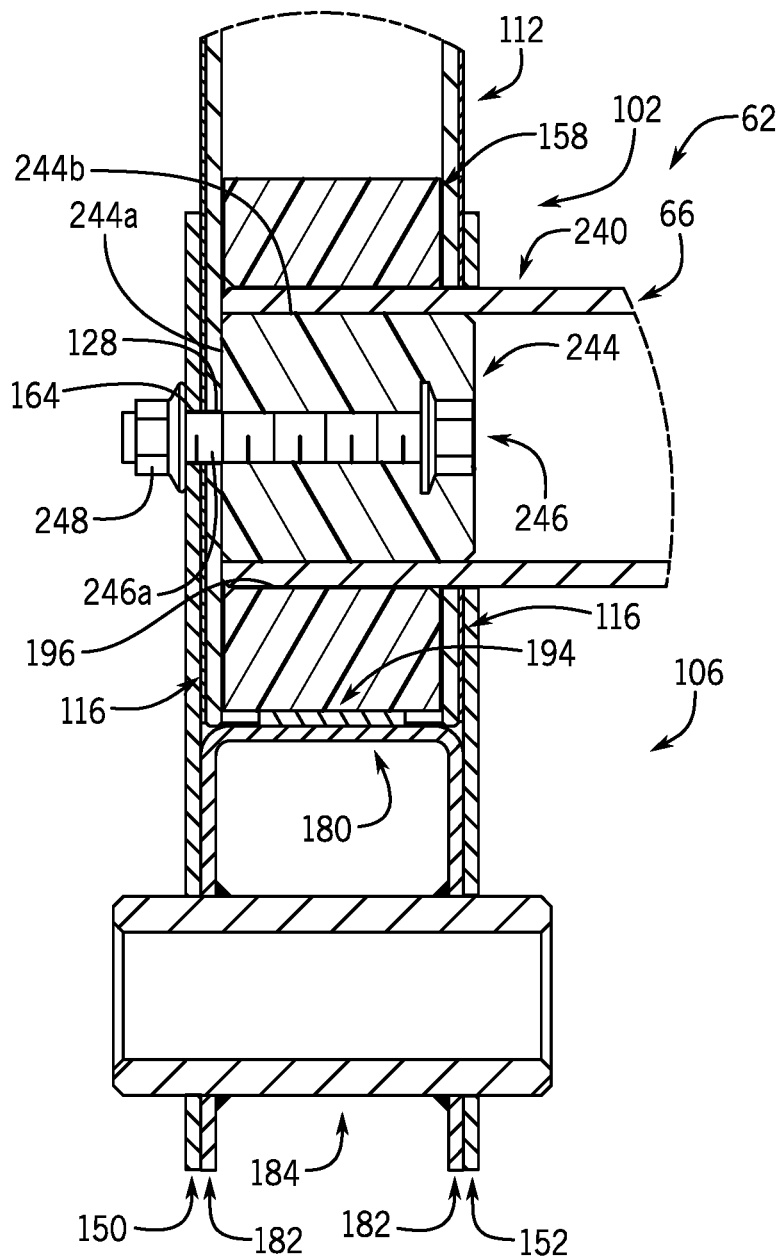
FIG. 19 is a detail cross-sectional view of the end of the torque transfer tube connected to the arm assembly of the hybrid loader boom arm assembly, taken at 19 of FIG. 16.

With reference to FIGS. 18 and 19, with the torque transfer tube 66 formed, the adhesive is applied to the surface 244a and the second surface 244b of the third block 244 and the third block 244 is inserted into the first tube end 240. This process is repeated to couple another one of the third blocks 244 to the second tube end 242. With the third block 244 coupled to the first tube end 240, the first tube end 240 is positioned within the second cross-bore 196 of the second block 158 such that the shank 246a extends through the fourth bore 128 of the second beam 102 and the first plate bore 164 of the first outer plate 150. In one example, the adhesive is applied about the second cross-bore 196 to further couple the first tube end 140 to the second block 158. The flange nut 248 is coupled to the shank 246a to couple the first tube end 240 to the arm assembly 62. With reference to FIG. 16, the second tube end 242 is positioned within the second cross-bore 196 of the second block 158 such that the shank 246a extends through the fourth bore 128 of the second beam 102 and the first plate bore 164 of the first outer plate 150. In one example, the adhesive is applied about the second cross-bore 196 to further couple the second tube end 242 to the second block 158. The flange nut 248 is coupled to the shank 246a to couple the second tube end 242 to the arm assembly 62.

With the HLBAA 50 assembled, with reference to FIG. 2, the first end 100a of the first beams 100 of the HLBAA 50 may be coupled to the loader 10 (FIG. 1) or the compact utility tractor 1000 (FIG. 1A) via a pin 252 engaging the sleeves 132 of the respective vehicle mounting assemblies 104. The fourth end 102b of the second beams 102 of the HLBAA 50 may be coupled to the respective couplers 74, 76 for coupling the bucket 52 (FIG. 1 or FIG. 1A) to the HLBAA 50 by engaging the coupling pins 80 with each of the bushings 184 of each of the bucket mount bracket subassemblies 106, 108 and the couplers 74, 76. The hydraulic cylinders 34, 36, 38 may also be coupled to the coupling pins 204 of the arm assembly 62 and the second arm assembly 64.

It should be noted that the HLBAA 50 described with regard to FIGS. 1-19 may be configured differently to couple a work implement, such as the bucket 52, to a work vehicle, such as the loader 10. In one example, with reference to FIGS. 20-35, a HLBAA 300 is shown. As the HLBAA 300 includes components that are substantially similar to or the same as the HLBAA 50 discussed with regard to FIGS. 1-19, the same reference numerals will be used to denote the same or similar features. The HLBAA 300 may couple the bucket 52 to the loader 10, or may couple the bucket 52 to the compact utility tractor 1000. It should be noted that the HLBAA 300 may also be used with a variety of other work vehicles. In this example, the HLBAA 300 includes an arm assembly 302, a second arm assembly 304 and the hollow torque transfer tube 66 that interconnects the arm assembly 302 and the second arm assembly 304. Each of the arm assembly 302 and the second arm assembly 304 include a first beam 310, a second beam 312, a vehicle mounting subassembly 314, a respective bucket mount bracket or bucket mount bracket subassembly 316, 318 and a knee mounting subassembly 320. Generally, the arm assembly 302 is a mirror image of the second arm assembly 304.

Figure 20:
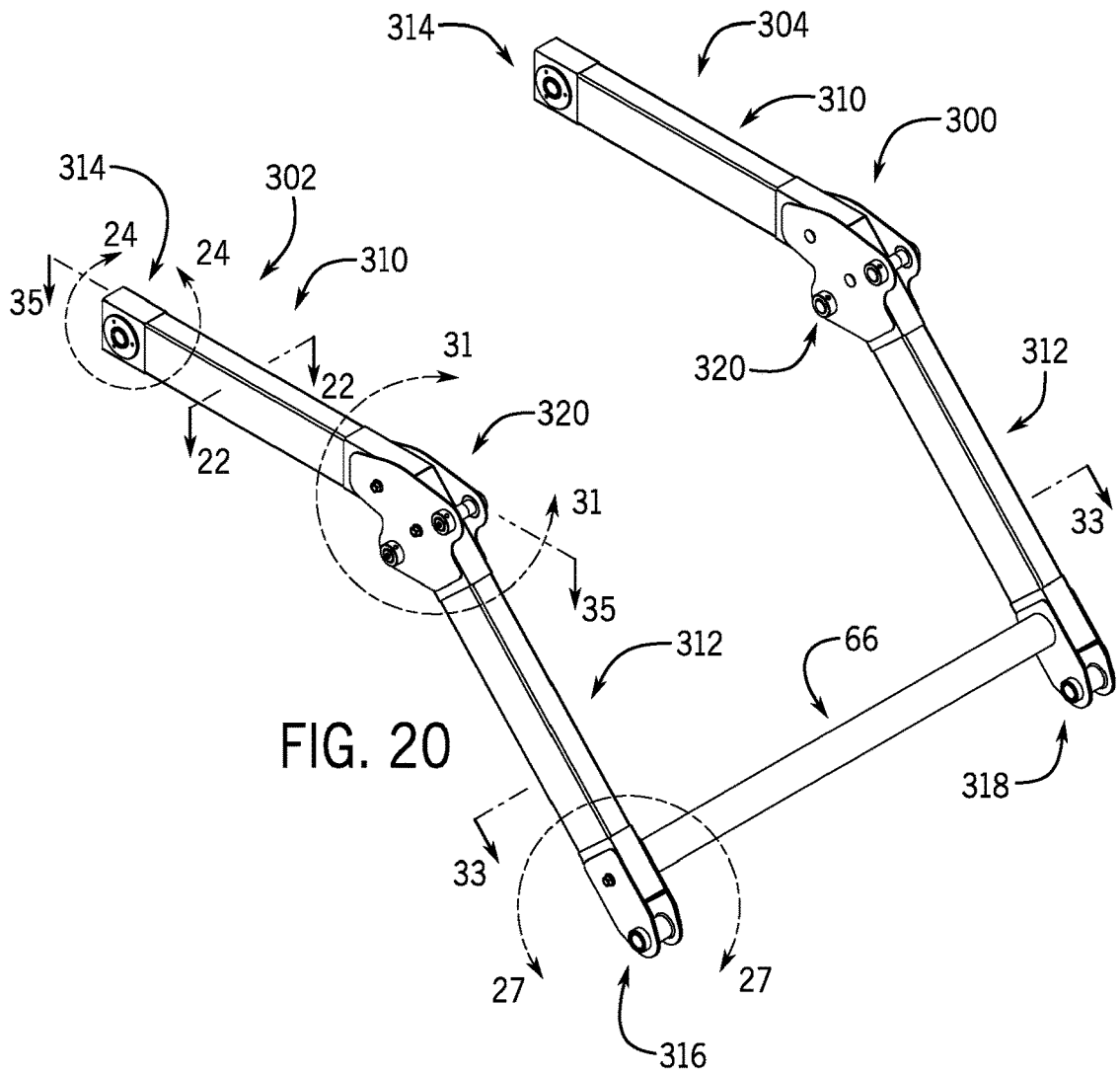
FIG. 20 is a perspective view of another hybrid loader boom arm assembly for use with the work vehicle of FIG. 1 or FIG. 1A.

The first beam 310 and the second beam 312 are each formed from the lightweight material. In one example, with reference to FIG. 21, the first beam 310 and the second beam 312 are each composed of the inner tube 112 and an outer tube 322. As the first beam 310 and the second beam 312 have the same composition, the composition of the first beam 310 is illustrated in FIG. 20 with the understanding that the composition of the second beam 312 is the same. The outer tube 322 has a generally rectangular cross-section, and is sized to receive the inner tube 112 such that the inner tube 112 is disposed wholly within the outer tube 322 (FIG. 22). In one example, outer tube 322 is formed from a lightweight material, including, but not limited to a polymer-based material. In this example, the outer tube 322 is composed of a polymer-based resin that includes reinforcing fibers and/or reinforcing particles. The reinforcing fibers, include, but are not limited to, glass, basalt, carbon, aramids, olefins, and/or cellulose. The polymer-based resin may be a thermoset or a thermoplastic. In the example of a thermoset polymer-based resin, the polymer-based resin includes, but is not limited to, polyurethane, epoxy, and acrylic. In the example of a thermoplastic polymer-based resin, the polymer-based resin includes, but is not limited to, polyamides, polyolefins, polycarbonates, or polyesters. The outer tube 322 is formed using wet-ply lay-up, pultrusion, hand lay-up, filament winding, extrusion, injection molding, rotomolding, blow molding, etc. In one example, the adhesive is applied between an inner surface 322a of the outer tube 322 and an outer surface 112g of the inner tube 112 to couple the outer tube 322 to the inner tube 112. For example, the adhesive is applied as a coating, for example, on the outer surface 112g of the inner tube 112.

With reference to FIG. 23, the first beam 310 includes a first end 310a and an opposite second end 310b. The first end 310a defines a respective first end of the arm assembly 302 and the second arm assembly 304. The first beam 310 defines the first through bore 122 at the first end 310a, and defines the second through bore 124 at the second end 310b. The first through bore 122 receives a portion of the vehicle mounting subassembly 314 to couple the vehicle mounting subassembly 314 to the first beam 310. The second through bore 124 is coupled to the knee mounting subassembly 320. It should be understood that each of the first through bore 122 and the second through bore 124 are defined in the first beam 310 so as to extend through the inner tube 112 and the outer tube 322. In one example, the second end 310b of the first beam 310 is beveled from a first surface 310d to a second, opposite surface 310c. By beveling the second end 310b, the second end 310b of the first beam 310 may be positioned against a cooperating bevel defined on a third end 312a of the second beam 312 so that the second beam 312 extends at an angle relative to the first beam 310.

The second beam 312 includes the third end 312a and an opposite fourth end 312b. The fourth end 312b defines a respective second end of the arm assembly 302 and the second arm assembly 304. In one example, the third end 312a of the second beam 312 is beveled from a first surface 312d to a second, opposite surface 312c. By beveling the third end 312a, the second beam 312 extends at an angle relative to the first beam 310 to assist in coupling the bucket 52 (FIG. 1) to the HLBAA 300. The second beam 312 defines the third through bore 126 at the third end 312a, and defines the fourth bore 128 and the fifth bore 129 at the fourth end 312b. The third through bore 126 is coupled to the knee mounting subassembly 320. It should be understood that the third through bore 126 is defined in the second beam 312 so as to extend through each of the outer tube 322 and the inner tube 112. The fourth bore 128 and the fifth bore 129 each receives a portion of the bucket mount bracket subassembly 316, 318 and the torque transfer tube 66 to couple the bucket mount bracket subassembly 316, 318 and the torque transfer tube 66 to the second beam 312. In this example, the fourth bore 128 is defined in the second beam 102 so as to extend through one side of the outer tube 322 and the inner tube 112 and so as to be coaxial with the fifth bore 129. The fifth bore 129 is defined in the second beam 312 so as to extend through the other side of the outer tube 322 and the inner tube 112, and is sized to receive the torque transfer tube 66 therethrough.

The vehicle mounting subassembly 314 is coupled to the first end 310a of each first beam 310 of the arm assembly 302 and the second arm assembly 304. Stated another way, the vehicle mounting subassembly 314 is coupled to the first end of each of the arm assembly 302 and the second arm assembly 304 and is configured to couple the arm assembly 302 and the second arm assembly 304 to the loader 10. With reference to FIG. 24, the vehicle mounting subassembly 314 is shown in greater detail. As the vehicle mounting subassembly 314 is the same for both the arm assembly 302 and the second arm assembly 304, the vehicle mounting subassembly 314 will be shown in detail herein with regard to the first beam 310 of the arm assembly 302 for ease of description, with the understanding that the vehicle mounting subassembly 314 coupled to the second arm assembly 304 is the same.

A portion of the vehicle mounting subassembly 314 passes through the first end 310a of the first beam 310 for coupling the respective one of the arm assembly 302 and the second arm assembly 304 to the loader 10 (FIG. 1). With reference to FIG. 25, in one example, the vehicle mounting subassembly 314 includes the pair of lock plates 130, the sleeve 132, the block 134 and a pair of reinforcing plates 330.

The pair of lock plates 130 is generally coupled to the first beam 310 so as contact a respective one of the pair of reinforcing plates 330. The sleeve 132 is received through the first through bore 122 and the block 134, and the plurality of threads 140a, 140b matingly engage with the plurality of threads 136a of a respective one of the pair of lock plates 130 to couple the vehicle mounting subassembly 314 to the first beam 310. The sleeve 132 enables the pin 252 (FIG. 2) to pass through the vehicle mounting subassembly 314 the couple the respective one of the arm assembly 302 and the second arm assembly 304 to the loader 10 (FIG. 1). The block 134 is sized to be received wholly within the inner tube 112 at the first end 310a of the first beam 310. The block 134 supports the sleeve 132 within the first beam 310. The block 134 may be coupled to the inner tube 112 via the adhesive, which may surround the block 134 to fixedly retain the block 134 within the inner tube 112.

The pair of reinforcing plates 330 is each coupled about the outer tube 322 at the first end 310*a* of the first beam 310 to define an exterior surface of the first beam 310 at the first end 310*a*. The reinforcing plates 330 are each substantially L-shaped and include a body 332 having an inwardly projecting flange 334. One of the pair of reinforcing plates 330 is rotated about 180 degrees relative to the other reinforcing plate 330 such that the body 332 and the respective inwardly projecting flange 334 cooperate to enclose the outer tube 322. Each of the reinforcing plates 330 is composed of a metal or metal alloy, such as a steel, and may be formed by stamping, machining, forging, casting, etc. Each of the reinforcing plates 330 are coupled to the outer tube 322 by the adhesive. The body 332 of each of the reinforcing plates 330 defines a central plate bore 336. With regard to FIG. 26, each of the central plate bores 336 receives a portion of the sleeve 132 therethrough to enable the ends 132*a*, 132*b* of the sleeve 132 to matingly engage with the respective one of the lock plates 130.

With reference back to FIG. 23, the bucket mount bracket subassembly 316, 318 couples the bucket 52 (FIG. 1) to the HLBAA 300. With reference to FIGS. 27 and 28, the bucket mount bracket subassembly 316 is shown in greater detail. As the bucket mount bracket subassembly 316 is a mirror image of the bucket mount bracket subassembly 318, for ease of description, the bucket mount bracket subassembly 316 will be discussed herein with the understanding that the bucket mount bracket subassembly 318 is substantially the same. The bucket mount bracket subassembly 316 includes the first outer plate 150, the second inner plate 152, the flange assembly 154, the retaining flange 156 (FIG. 28), the second block 158 (FIG. 28), a first reinforcing plate 340 and a second reinforcing plate 342.

The first outer plate 150 is planar, and extends along a portion of the second reinforcing plate 342 (FIG. 27). The first plate surface 150*a* defines an exterior surface of the first outer plate 150. A portion of the second plate surface 150*b* is coupled to the second reinforcing plate 342, via welding, for example, and a remainder of the second plate surface 150*b* is coupled to the flange assembly 154. The second inner plate 152 is planar, and extends along a portion of the first reinforcing plate 340 (FIG. 27). A portion of the third plate surface 152*a* is coupled to the first reinforcing plates 340, via welding, for example, and a remainder of the third plate surface 152*a* is coupled to the flange assembly 154. The fourth plate surface 152*b* defines an exterior surface of the second inner plate 152. The flange assembly 154 cooperates with the first outer plate 150 and the second inner plate 152 for coupling the bucket 52 (FIG. 1) to the arm assembly 302. The second block 158 is received wholly within the inner tube 112 at the fourth end 312*b* of the second beam 312. With reference to FIG. 29, the second block 158 is shown received within the inner tube 112 such that the fourth bore 128 and the fifth bore 129 of the second beam 312 are coaxially aligned with the second cross-bore 196. In addition, the second block 158 may be coupled to the inner tube 112 via the adhesive, which may surround the second block 158 to fixedly retain the second block 158 within the inner tube 112.

As shown in FIG. 12, the bucket mount bracket subassembly 106 is coupled to the second beam 102 such that the second block 158 is received wholly within the inner tube 112 of the second beam 102, and the flange assembly 154 is disposed external to the second beam 102. The first leg 190 and the second leg 192 are coupled to the slots 198, and the retaining base 194 is coupled to the base 180 of the flange assembly 154.

The first reinforcing plate 340 and the second reinforcing plate 342 are coupled about the outer tube 322 at the fourth end 312*b* of the second beam 312 to define an exterior surface of the second beam 312 at the fourth end 312*b*. The first reinforcing plate 340 and the second reinforcing plate 342 are each substantially L-shaped. Each of the first reinforcing plate 340 and the second reinforcing plate 342 are composed of a metal or metal alloy, such as a steel, and may be formed by stamping, machining, forging, casting, etc. Each of the first reinforcing plate 340 and the second reinforcing plate 342 are coupled to the outer tube 322 by the adhesive. The first reinforcing plate 340 includes a body 344 having an inwardly projecting flange 346. The body 344 defines a central bore 348. With reference to FIG. 30, the central bore 348 is coaxial with the first plate bore 164 of the first outer plate 150 and the fourth bore 128 of the second beam 312 when assembled. With reference back to FIG. 28, the second reinforcing plate 342 includes a body 350 having an inwardly projecting flange 352. The body 350 defines a second central bore 354. With reference to FIG. 30, the second central bore 354 is coaxial with the third plate bore 174 of the second inner plate 152 and the fifth bore 129 of the second beam 312 when assembled. As shown in FIG. 27, the first reinforcing plate 340 and the second reinforcing plate 342 cooperate to enclose the outer tube 322 at the fourth end 312*b*.

Figure 32:
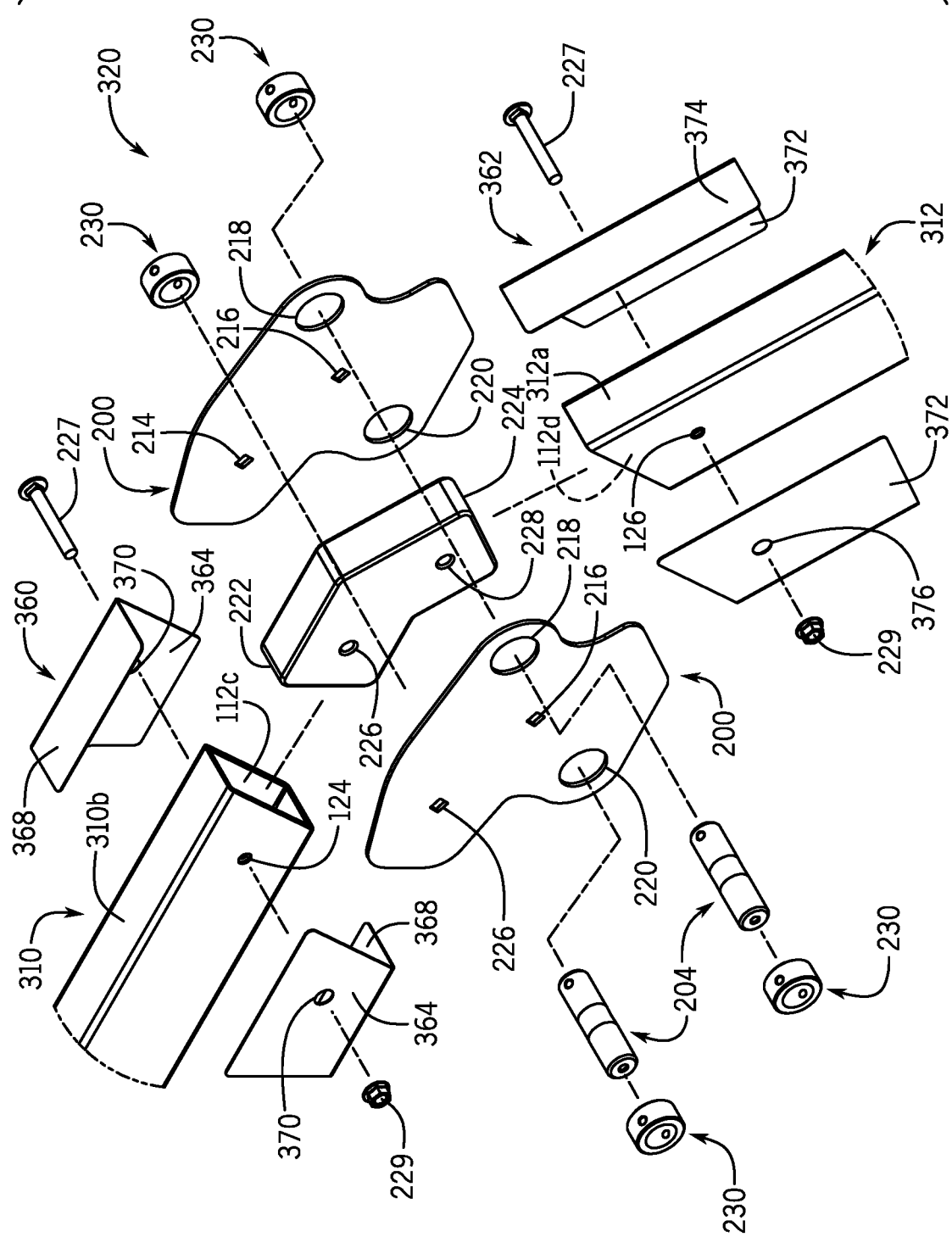
FIG. 32 is an exploded view of the knee mounting subassembly of FIG. 31.

With reference to FIG. 31, the knee mounting subassembly 320 interconnects the first beam 310 with the second beam 312. The knee mounting subassembly 320 includes the pair of knee plates 200, the angled block 202 (FIG. 32), the pair of coupling pins 204, a first pair of reinforcing plates 360 and a second pair of reinforcing plates 362. The knee plates 200 are each coupled to each of the first pair of reinforcing plates 360 and the second pair of reinforcing plates 362, via welding, for example. With reference to FIG. 32, the angled block 202 is received wholly within a portion of the inner tube 112 of the first beam 310 and a portion of the inner tube 112 of the second beam 312 when the arm assembly 302 is assembled. When the angled block 202 is positioned within the first beam 310 and the second beam 312, the first block bore 226 is coaxially aligned with the second through bore 124 of the first beam 310 and the second block bore 228 is coaxially aligned with the third through bore 126 of the second beam 312. The pair of coupling pins 204 couple the hydraulic cylinders 34, 36, 38 to the respective one of the arm assembly 302 and the second arm assembly 304.

The first pair of reinforcing plates 360 is coupled about the outer tube 322 at the second end 310*b* of the first beam 310 to define an exterior surface of the first beam 310 at the second end 310*b*. The first pair of reinforcing plates 360 is substantially L-shaped and includes a body 364 having an inwardly projecting flange 368. One of the first pair of reinforcing plates 360 is rotated about 180 degrees relative to the other reinforcing plate 360 such that the body 364 and the respective inwardly projecting flange 368 of each of the first pair of reinforcing plates 360 cooperate to enclose the outer tube 322. Each of the first pair of reinforcing plates 360 is composed of a metal or metal alloy, such as a steel, and may be formed by stamping, machining, forging, casting, etc. Each of the first pair of reinforcing plates 360 are coupled to the outer tube 322 by the adhesive. The body 364 of each of the first pair of reinforcing plates 360 defines a central plate bore 370.

The second pair of reinforcing plates 362 is coupled about the outer tube 322 at the third end 312*a* of the second beam 312 to define an exterior surface of the second beam 312 at the third end 312a. The second pair of reinforcing plates 362 is substantially L-shaped and includes a body 372 having an inwardly projecting flange 374. One of the second pair of reinforcing plates 362 is rotated about 180 degrees relative to the other reinforcing plate 362 such that the body 372 and the respective inwardly projecting flange 374 of each of the second pair of reinforcing plates 362 cooperate to enclose the outer tube 322. Each of the second pair of reinforcing plates 362 is composed of a metal or metal alloy, such as a steel, and may be formed by stamping, machining, forging, casting, etc. Each of the second pair of reinforcing plates 362 are coupled to the outer tube 322 by the adhesive. The body 372 of each of the second pair of reinforcing plates 362 defines a central plate bore 376.

When the knee plates 200 are coupled to the first pair of reinforcing plates 360, the central plate bore 370 is coaxially aligned with the second through bore 124 of the first beam 310 and the first block bore 226 to enable the mechanical fastener 227 to be received through the first plate bore 214 of each of the knee plates 200, the first block bore 226, the second through bore 124 and the central plate bore 370, and secured with the flange nut 229 to couple the first beam 310 to the pair of knee plates 200. The central plate bore 376 is coaxially aligned with the third through bore 126 of the second beam 312 and the second block bore 228 to enable another mechanical fastener 227 to be received through the second plate bore 216 of each of the knee plates 200, the second block bore 228, the third through bore 126 and the central plate bore 376 and secured with another flange nut 229 to couple the second beam 312 to the pair of knee plates 200.

Figure 33:
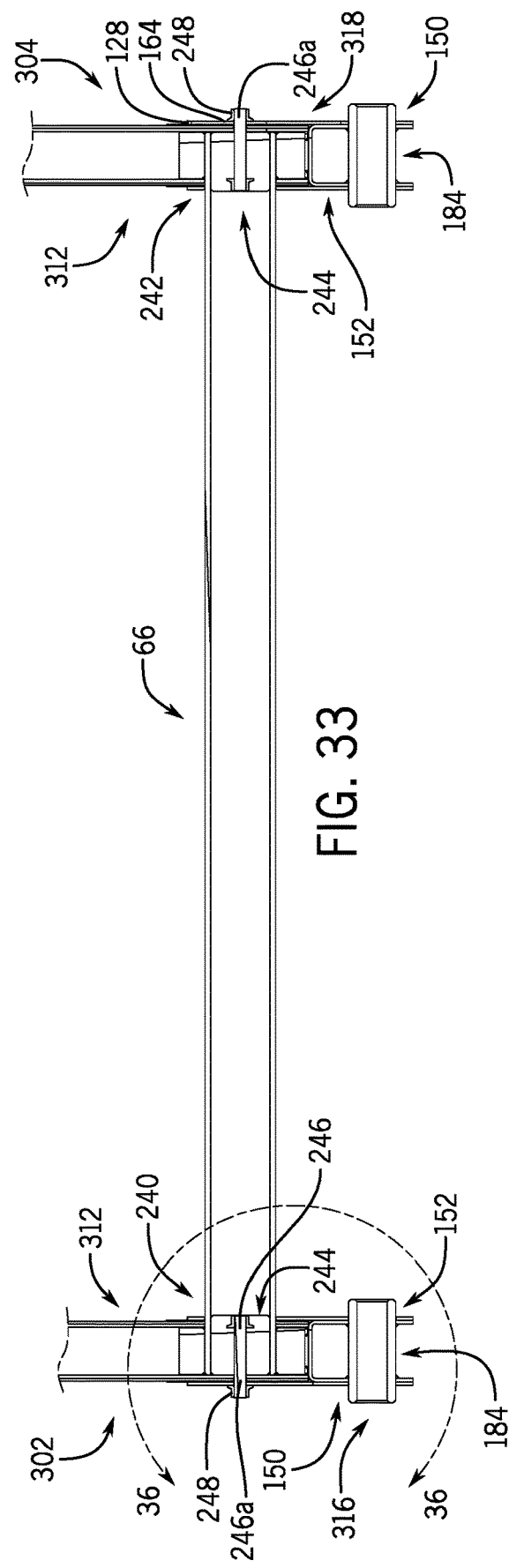
FIG. 33 is a cross-sectional view of a torque transfer tube connected to the arm assembly and a second arm assembly of the hybrid loader boom arm assembly, taken along line 33-33 of FIG. 20.
Figure 34:
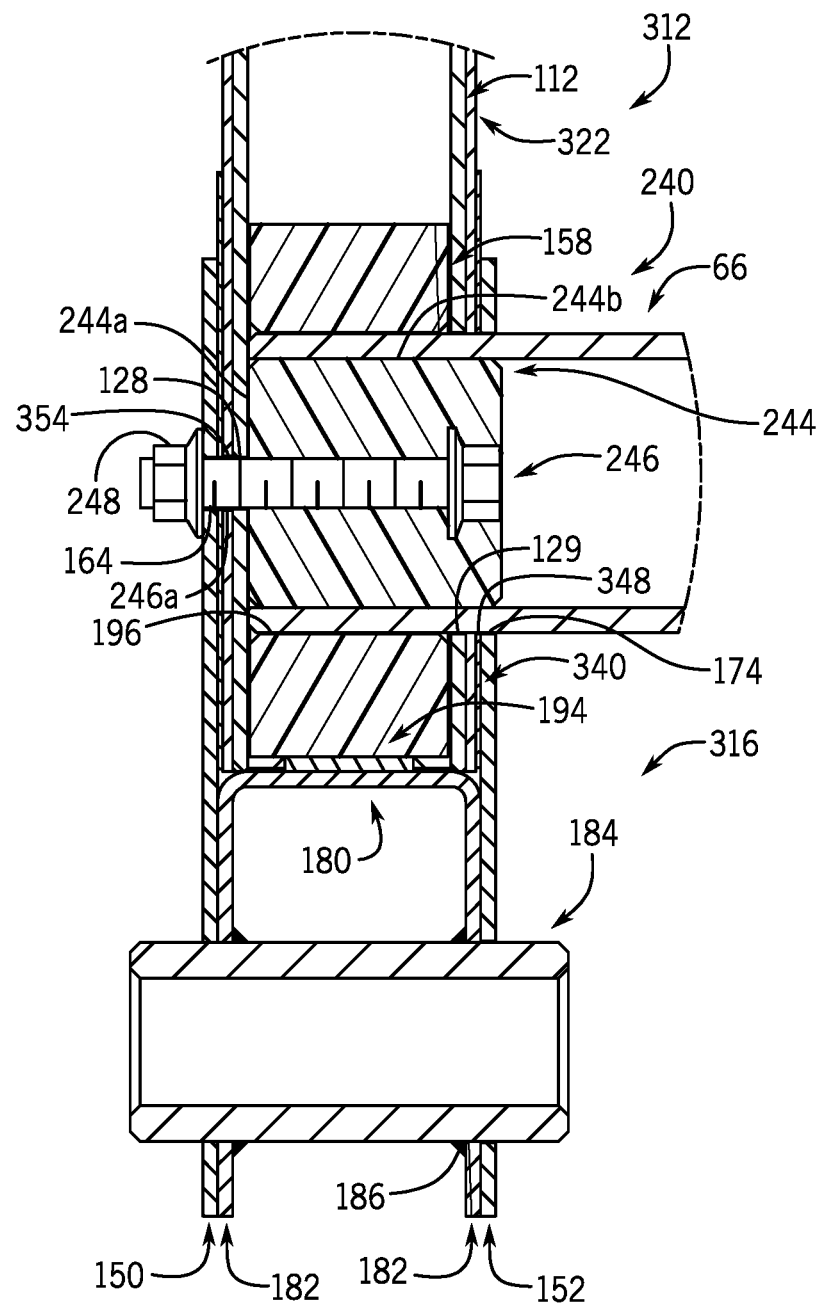
FIG. 34 is a detail cross-sectional view of the end of the torque transfer tube connected to the arm assembly of the hybrid loader boom arm assembly, taken at 34 of FIG. 20.

With reference back to FIG. 20, the torque transfer tube 66 interconnects the arm assembly 302 and the second arm assembly 304. The torque transfer tube 66 is coupled to each of the arm assembly 302 and the second arm assembly 304 at the fourth end 312b of the respective second beam 312. With reference to FIG. 33, the first tube end 240 is coupled to the arm assembly 302, and the second tube end 242 is coupled to the second arm assembly 304. With reference to FIG. 34, the first tube end 240 is shown coupled to the second beam 312 in greater detail. The third block 244 is received wholly within the torque transfer tube 66 at the first tube end 240. Generally, when the torque transfer tube 66 is coupled to the arm assembly 302, the first tube end 240 is received through the second cross-bore 196 of the second block 158 and the shank 246a of the mechanical fastener 246 extends through the fourth bore 128 of the second beam 312, the second central bore 354 of the second reinforcing plate 342 and the first plate bore 164 of the first outer plate 150. The flange nut 248 is coupled to the shank 246a and tightened to the first outer plate 150 for coupling the torque transfer tube 66 to the arm assembly 302. In addition, the adhesive may be applied to the surface 244a of the third block 244 to aid in coupling the third block 244 to the inner tube 112 of the second beam 312. Further, the adhesive may be applied about the second surface 244b or the perimeter of the third block 244 to aid in coupling the third block 244 to the first tube end 240 of the torque transfer tube 66. In one example, the adhesive is applied about the second cross-bore 196 to further couple the first tube end 240 to the second block 158.

Figure 35:
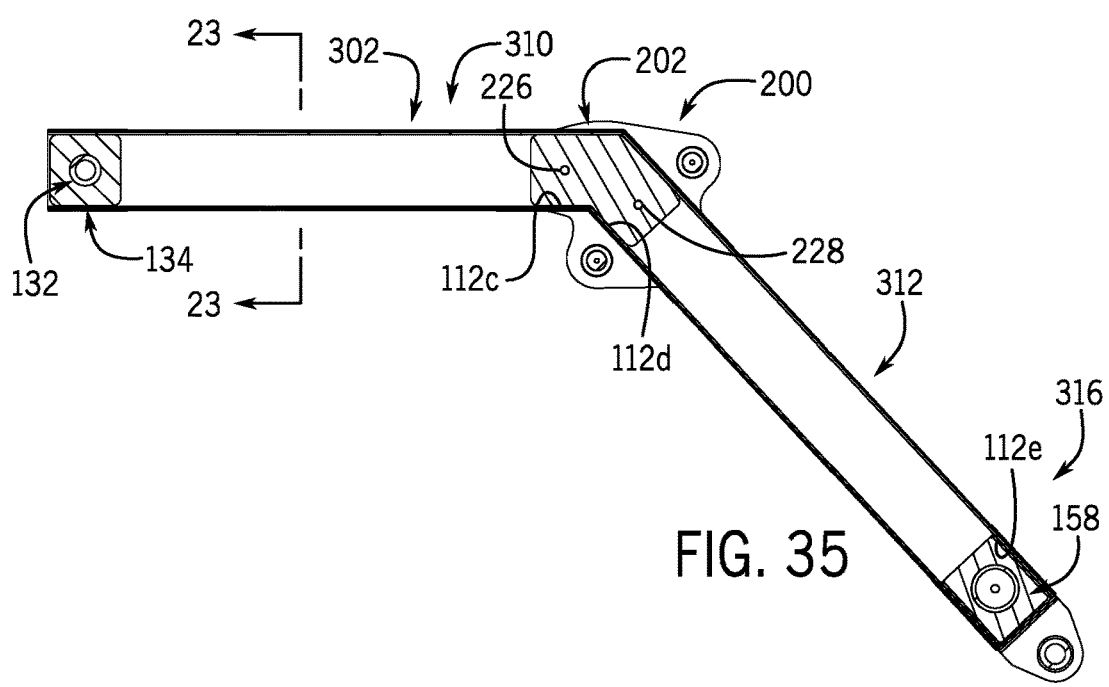
FIG. 35 is a cross-sectional view of one arm assembly of the hybrid loader boom arm assembly, taken along line 35-35 of FIG. 20.
Figure 26:
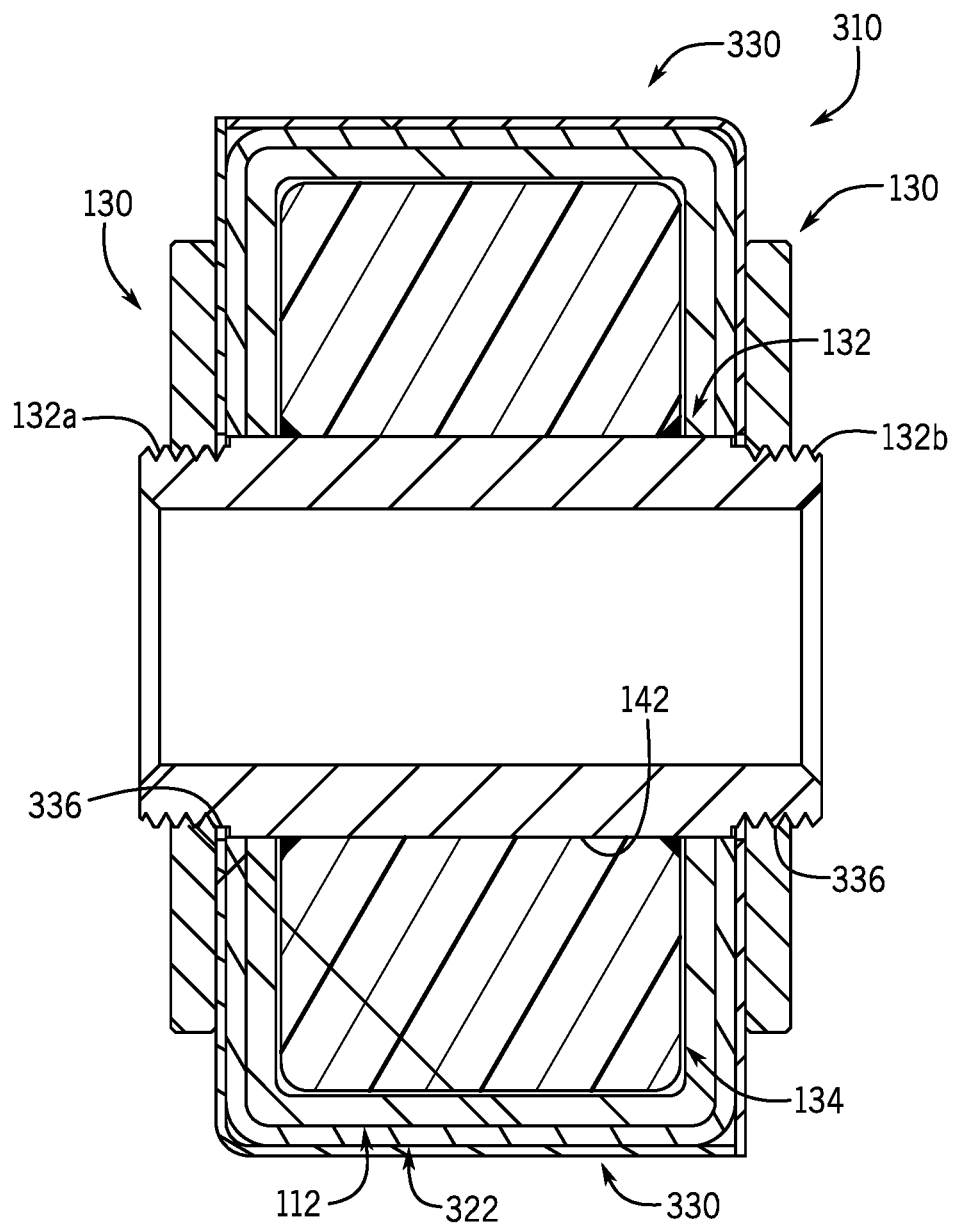
FIG. 26 is a cross-sectional view of the vehicle mounting subassembly, taken along line 26-26 of FIG. 24.

With reference back to FIG. 23, the first beams 310, the second beams 312, the vehicle mounting assemblies 314, the bucket mount bracket subassemblies 316, 318, the knee mounting subassemblies 320, the torque transfer tube 66 the adhesive, the mechanical fasteners 227 and the flange nuts 229 comprise a kit 380 for the HLBAA 300. In one example, in order to assemble the arm assembly 302 and the second arm assembly 304, with the inner tubes 112 formed, in one example, the inner tubes 112 are coated with the adhesive, and the inner tubes 112 are positioned within the respective outer tubes 322 to couple the respective inner tubes 112 to the outer tubes 322 (FIG. 21). With the angled blocks 202 formed, with reference to FIG. 32, the angled blocks 202 are inserted into a second end 112c of a respective one of the inner tubes 112 associated with the first beam 310 and a first end 112d of a respective one of the inner tubes 112 associated with the second beam 312 to couple two of the inner tubes 112 together, as also shown in FIG. 35. This is repeated to form two subassemblies, one for each of the arm assembly 302 and the second arm assembly 304. The adhesive may be applied to the angled blocks 202 and used to couple the angled blocks 202 to the inner tubes 112.

With reference to FIG. 28, with the retaining flanges 182 formed with the base 180, the bushing 184 is inserted through the bores 186 and coupled to the retaining flanges 182, via welding, for example. With the retaining flange 156 formed, the retaining flange 156 is coupled to the base 180, via welding, for example. With the second block 158 formed, the retaining flange 156 is coupled to the second block 158. Generally, with a layer of the adhesive applied to the slots 198 and the surface 158a of the second block 158, the first leg 190 and the second leg 192 are coupled to the slots 198 such that the first surface 194a contacts the surface 158a of the second block 158. The second block 158 is inserted into a second end 112e of the inner tube 112 associated with one of the second beams 312. In one example, the adhesive is applied about the second block 158 to further couple the second block 158 to the inner tube 112. This process is repeated to couple another one of the second blocks 158 to the inner tube 112 associated with the other of the second beams 312.

With reference to FIG. 25, with the blocks 134 formed, one of the blocks 134 is inserted into a first end 112f of the inner tube 112 associated with one of the first beams 100, and the other of the blocks 134 is inserted into a first end 112f of the inner tube 112 associated with the other of the first beams 310. The blocks 134 may be coupled to the inner tubes 112 via the adhesive, which may surround the blocks 134 to fixedly retain the blocks 134 within the inner tubes 112. One of the sleeves 132 is inserted through the first through bore 122 and the cross-bore 142 of the block 134 coupled to the inner tube 112 associated with the first beam 310 of the arm assembly 302, and the other of the sleeves 132 is inserted through the first through bore 122 and the cross-bore 142 of the block 134 coupled to the inner tube 112 associated with the first beam 310 of the second arm assembly 304.

With reference to FIG. 32, with the first pair of reinforcing plates 360 formed, the first pair of reinforcing plates 360 is coupled about each of the first beams 310, via the adhesive, for example. With the second pair of reinforcing plates 362 formed, the second pair of reinforcing plates 362 are coupled about each of the second beams 312, via the adhesive, for example. The knee plates 200 are coupled to the reinforcing plates 360, 362, via welding, for example. With reference to FIG. 28, with the first reinforcing plate 340 and the second reinforcing plate 342 formed, the first reinforcing plate 340 and the second reinforcing plate 342 are coupled about the second beams 312, via the adhesive, for example. The first outer plates 150 are coupled to the second reinforcing plates 342 and the second inner plates 152 are coupled to the first reinforcing plates 340, via welding, for example. With reference to FIG. 25, with the reinforcing plates 330 formed, the reinforcing plates 330 are coupled about the first beams 310, via the adhesive, for example. One of the pair of lock plates 130 is coupled to the first end 132a of the sleeve 132 of the arm assembly 302, and the other one of the lock plates 130 is coupled to the second end 132b to couple the sleeve 132 to the first beam 310 of the arm assembly 302. One of the pair of lock plates 130 is coupled to the first end 132a of the sleeve 132 of the second arm assembly 304, and the other one of the lock plates 130 is coupled to the second end 132b to couple the sleeve 132 to the first beam 310 of the second arm assembly 304.

With reference to FIG. 32, the mechanical fasteners 227 are inserted through the first plate bores 214 of each pair of knee plates 200, the first block bore 226 of the angled block 202 and the central plate bore 370 of the first pair of reinforcing plates 360. The mechanical fasteners 227 are secured with the flange nut 229, for example. The mechanical fasteners 227 are inserted through the second plate bores 216 of each pair of knee plates 200, the second block bore 228 of the angled block 202 and the central plate bore 376 of the second pair of reinforcing plates 362. The mechanical fasteners 227 are secured with the flange nut 229 to reinforce the connection of the knee plates 200 to the respective first beam 310 and the second beam 312. The coupling pins 204 are inserted through the first pin bore 218 and the second pin bore 220, respectively, and the collars 230 are coupled about the opposed ends of the coupling pins 204. Pins are inserted through the bores 204a of the coupling pins 204 and the cross-bores 232b of the collars 230 to couple the coupling pins 204 to the respective pair of knee plates 200.

With reference to FIGS. 33 and 34, with the torque transfer tube 66 formed, the adhesive is applied to the surface 244a and the second surface 244b of the third block 244 and the third block 244 is inserted into the first tube end 240. This process is repeated to couple another one of the third blocks 244 to the second tube end 242. With the third block 244 coupled to the first tube end 240, the first tube end 240 is positioned within the second cross-bore 196 of the second block 158 such that the shank 246a extends through the fourth bore 128 of the second beam 312 and the first plate bore 164 of the first outer plate 150. In one example, the adhesive is applied about the second cross-bore 196 to further couple the first tube end 140 to the second block 158. The flange nut 248 is coupled to the shank 246a to couple the first tube end 240 to the arm assembly 302. With reference to FIG. 16, the second tube end 242 is positioned within the second cross-bore 196 of the second block 158 such that the shank 246a extends through the fourth bore 128 of the second beam 312 and the first plate bore 164 of the first outer plate 150. In one example, the adhesive is applied about the second cross-bore 196 to further couple the second tube end 242 to the second block 158. The flange nut 248 is coupled to the shank 246a to couple the second tube end 242 to the arm assembly 302.

With the HLBAA 300 assembled, the first end 310a of the first beams 310 of the HLBAA 300 may be coupled to the loader 10 (FIG. 1) or the compact utility tractor 1000 (FIG. 1A) via the pin 252 (FIG. 2) engaging the sleeves 132 of the respective vehicle mounting assemblies 314. The fourth end 312b of the second beams 312 of the HLBAA 300 may be coupled to the couplers 74, 76 for coupling the bucket 52 (FIG. 1 or FIG. 1A) to the HLBAA 300 by engaging the coupling pins 80 (FIG. 2) with each of the bushings 184 of each of the bucket mount bracket subassemblies 316, 318 and the couplers 74, 76. The hydraulic cylinders 34, 36, 38 may also be coupled to the coupling pins 204 of the arm assembly 302 and the second arm assembly 304.

Figure 36:
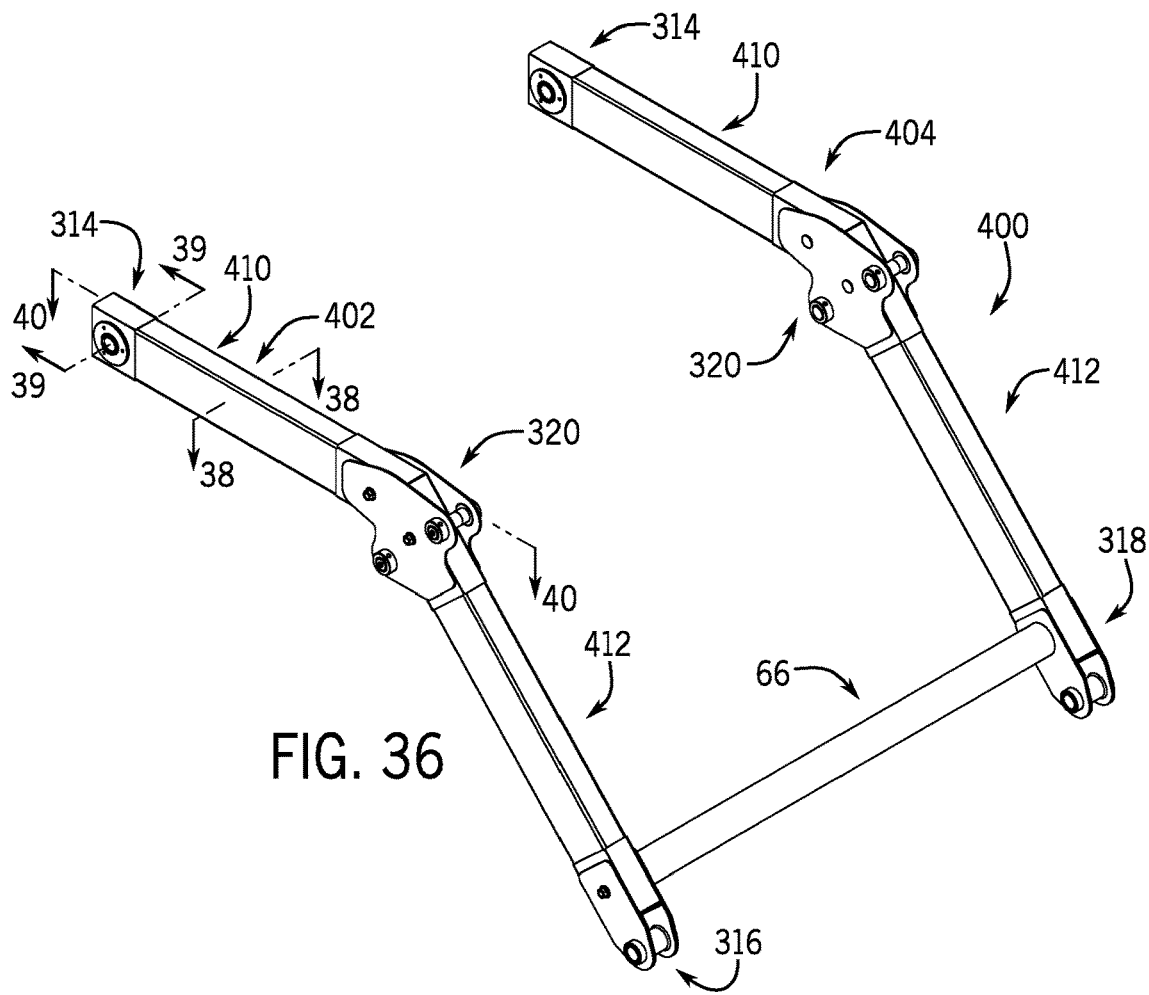
FIG. 36 is a perspective view of another hybrid loader boom arm assembly for use with the work vehicle of FIG. 1 or FIG. 1A.

It should be noted that the HLBAA 50 described with regard to FIGS. 1-19 may be configured differently to couple a work implement, such as the bucket 52, to a work vehicle, such as the loader 10. In one example, with reference to FIGS. 36-40, a HLBAA 400 is shown. As the HLBAA 400 includes components that are substantially similar to or the same as the HLBAA 50 discussed with regard to FIGS. 1-19 and the HLBAA 300 discussed with regard to FIGS. 20-35, the same reference numerals will be used to denote the same or similar features. The HLBAA 400 may couple the bucket 52 to the loader 10, or may couple the bucket 52 to the compact utility tractor 1000. It should be noted that the HLBAA 400 may also be used with a variety of other work vehicles. In this example, with reference to FIGS. 36 and 37, the HLBAA 400 includes an arm assembly 402, a second arm assembly 404 and the hollow torque transfer tube 66 that interconnects the arm assembly 402 and the second arm assembly 404. Each of the arm assembly 402 and the second arm assembly 404 include a first beam 410, a second beam 412, the vehicle mounting subassembly 314, the respective bucket mount bracket or bucket mount bracket subassembly 316, 318 and the knee mounting subassembly 320. Generally, the arm assembly 402 is a mirror image of the second arm assembly 404.

Figure 38:
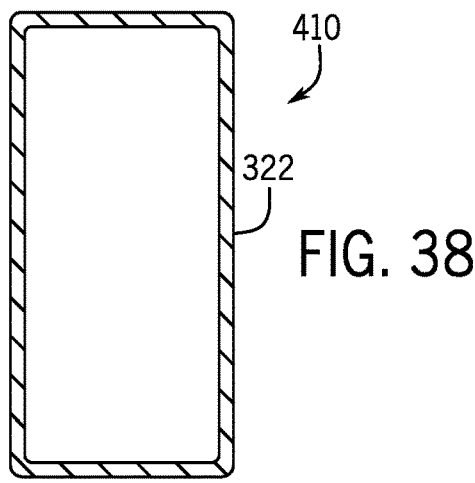
FIG. 38 is a cross-sectional view of the first beam of the one of the arm assemblies of the hybrid loader boom arm assembly of FIG. 36, taken along line 38-38 of FIG. 36.

The first beam 410 and the second beam 412 are each formed from the lightweight material. In one example, with reference to FIG. 38, the first beam 410 and the second beam 412 are each composed of the outer tube 322. As the first beam 410 and the second beam 412 have the same composition, the composition of the first beam 410 is illustrated in FIG. 38 with the understanding that the composition of the second beam 412 is the same. As discussed, the outer tube 322 is composed of a polymer-based resin that includes reinforcing fibers and/or reinforcing particles. The reinforcing fibers, include, but are not limited to, glass, basalt, carbon, aramids, olefins, and/or cellulose. The polymer-based resin may be a thermoset or a thermoplastic. In the example of a thermoset polymer-based resin, the polymer-based resin includes, but is not limited to, polyurethane, epoxy, and acrylic. In the example of a thermoplastic polymer-based resin, the polymer-based resin includes, but is not limited to, polyamides, polyolefins, polycarbonates, or polyesters. The outer tube 322 is formed using wet-ply lay-up, pultrusion, hand lay-up, filament winding, extrusion, injection molding, rotomolding, blow molding, etc.

Figure 37:
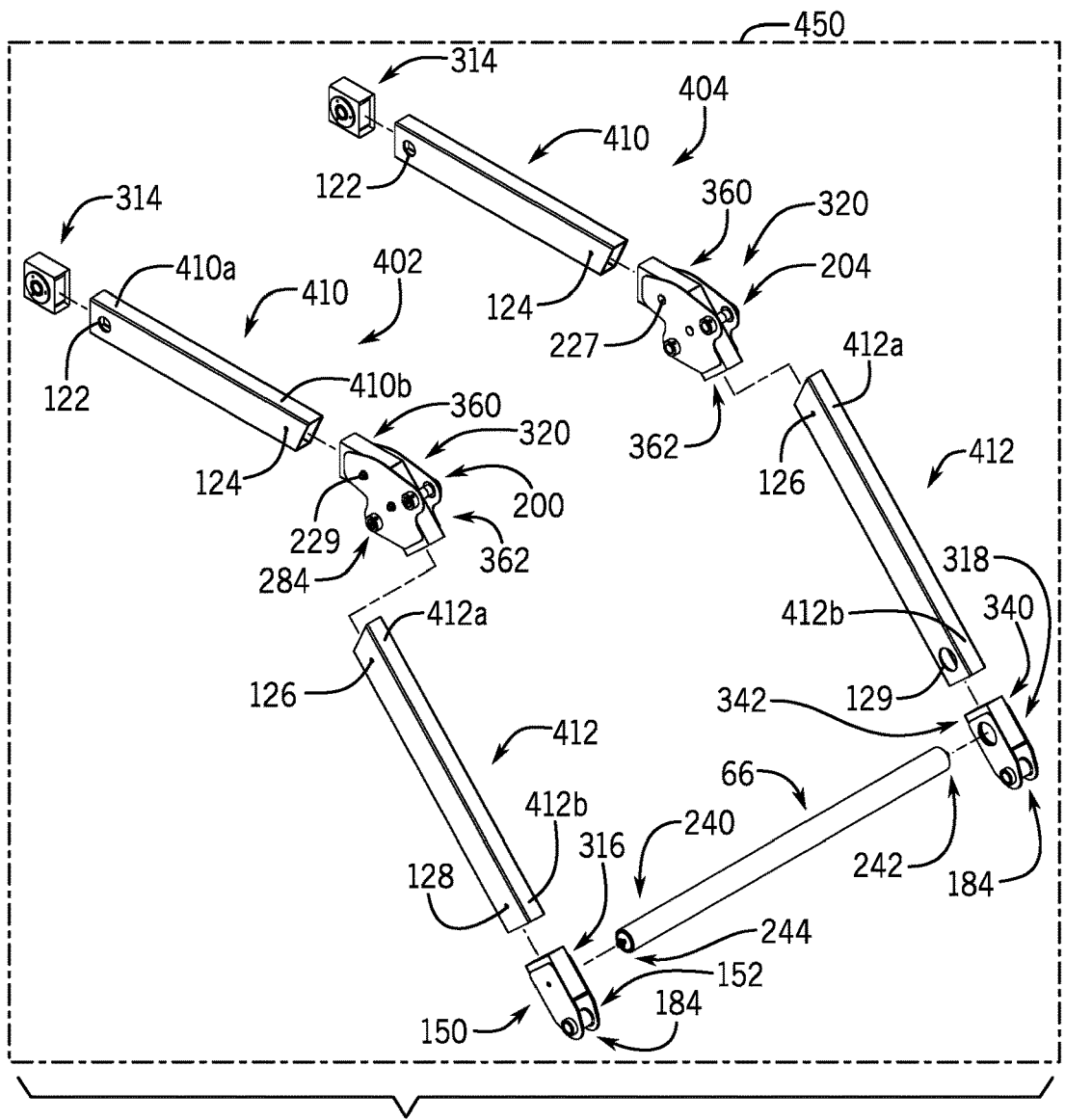
FIG. 37 is a partially exploded view of the hybrid loader boom arm assembly of FIG. 36.

With reference to FIG. 37, the first beam 410 includes a first end 410a and an opposite second end 410b. The first end 410a defines a respective first end of the arm assembly 402 and the second arm assembly 404. The first beam 410 defines the first through bore 122 at the first end 410a, and defines the second through bore 124 at the second end 410b. The first through bore 122 receives a portion of the vehicle mounting subassembly 414 to couple the vehicle mounting subassembly 414 to the first beam 410. The second through bore 124 is coupled to the knee mounting subassembly 320. In one example, the second end 410b of the first beam 410 is beveled. By beveling the second end 410b, the second end 410b of the first beam 410 may be positioned against a cooperating bevel defined on a third end 412a of the second beam 412 so that the second beam 412 extends at an angle relative to the first beam 410.

The second beam 412 includes the third end 412a and an opposite fourth end 412b. The fourth end 412b defines a respective second end of the arm assembly 402 and the second arm assembly 404. In one example, the third end 412a of the second beam 412 is beveled. By beveling the third end 412a, the second beam 412 extends at an angle relative to the first beam 410 to assist in coupling the bucket 52 (FIG. 1) to the HLBAA 400. The second beam 412 defines the third through bore 126 at the third end 412a, and defines the fourth bore 128 and the fifth bore 129 at the fourth end 412b. The third through bore 126 is coupled to the knee mounting subassembly 320. The fourth bore 128 and the fifth bore 129 each receives a portion of the bucket mount bracket subassembly 316, 318 and the torque transfer tube 66 to couple the bucket mount bracket subassembly 316, 318 and the torque transfer tube 66 to the second beam 412.

Figure 39:
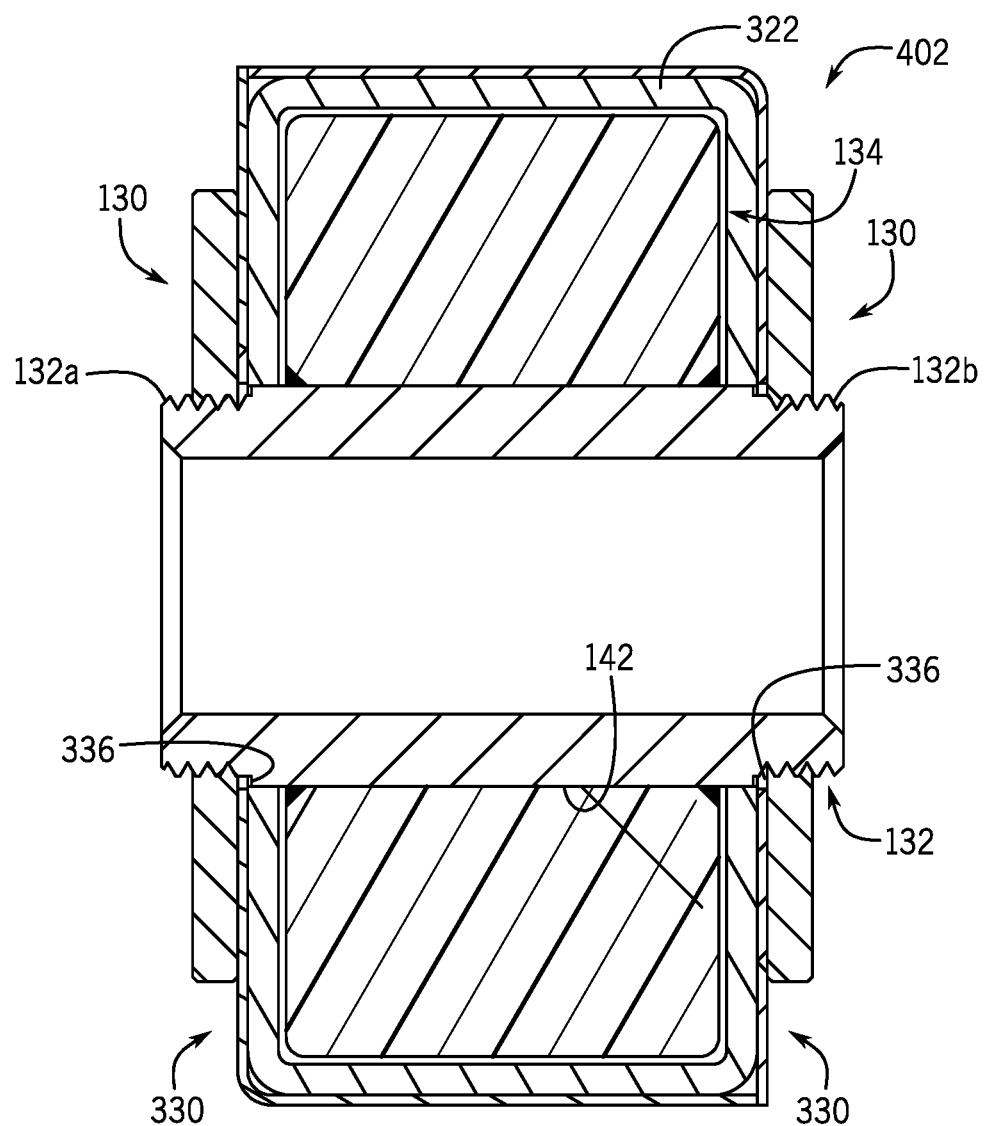
FIG. 39 is a cross-sectional view of the vehicle mounting subassembly, taken along line 39-39 of FIG. 36.

The vehicle mounting subassembly 314 is coupled to the first end 410a of each first beam 410 of the arm assembly 402 and the second arm assembly 404 and is configured to couple the arm assembly 402 and the second arm assembly 404 to the loader 10. With reference to FIG. 39, in one example, the vehicle mounting subassembly 314 includes the pair of lock plates 130, the sleeve 132, the block 134 and the pair of reinforcing plates 330. The pair of lock plates 130 is generally coupled to the first beam 310 so as contact a respective one of the pair of reinforcing plates 330. The sleeve 132 is received through the first through bore 122 and the block 134, and the plurality of threads 140a, 140b matingly engage with the plurality of threads 136a of a respective one of the pair of lock plates 130 to couple the vehicle mounting subassembly 314 to the first beam 310. The sleeve 132 enables the pin 252 (FIG. 2) to pass through the vehicle mounting subassembly 314 the couple the respective one of the arm assembly 402 and the second arm assembly 404 to the loader 10 (FIG. 1). The block 134 is sized to be received wholly within the outer tube 322 at the first end 410a of the first beam 410. The block 134 may be coupled to the outer tube 322 via the adhesive, which may surround the block 134 to fixedly retain the block 134 within the outer tube 322. The pair of reinforcing plates 330 is coupled about the outer tube 322 at the first end 410a of the first beam 310 to define an exterior surface of the first beam 410 at the first end 410a. Each of the reinforcing plates 330 are coupled to the outer tube 322 by the adhesive.

With reference back to FIG. 37, the bucket mount bracket subassembly 316, 318 couples the bucket 52 (FIG. 1) to the HLBAA 400. As the bucket mount bracket subassembly 316 is a mirror image of the bucket mount bracket subassembly 318, for ease of description, the bucket mount bracket subassembly 316 will be discussed herein with the understanding that the bucket mount bracket subassembly 318 is substantially the same. The bucket mount bracket subassembly 316 includes the first outer plate 150, the second inner plate 152, the flange assembly 154, the retaining flange 156 (FIG. 40), the second block 158 (FIG. 40), the first reinforcing plate 340 and the second reinforcing plate 342.

Figure 40:
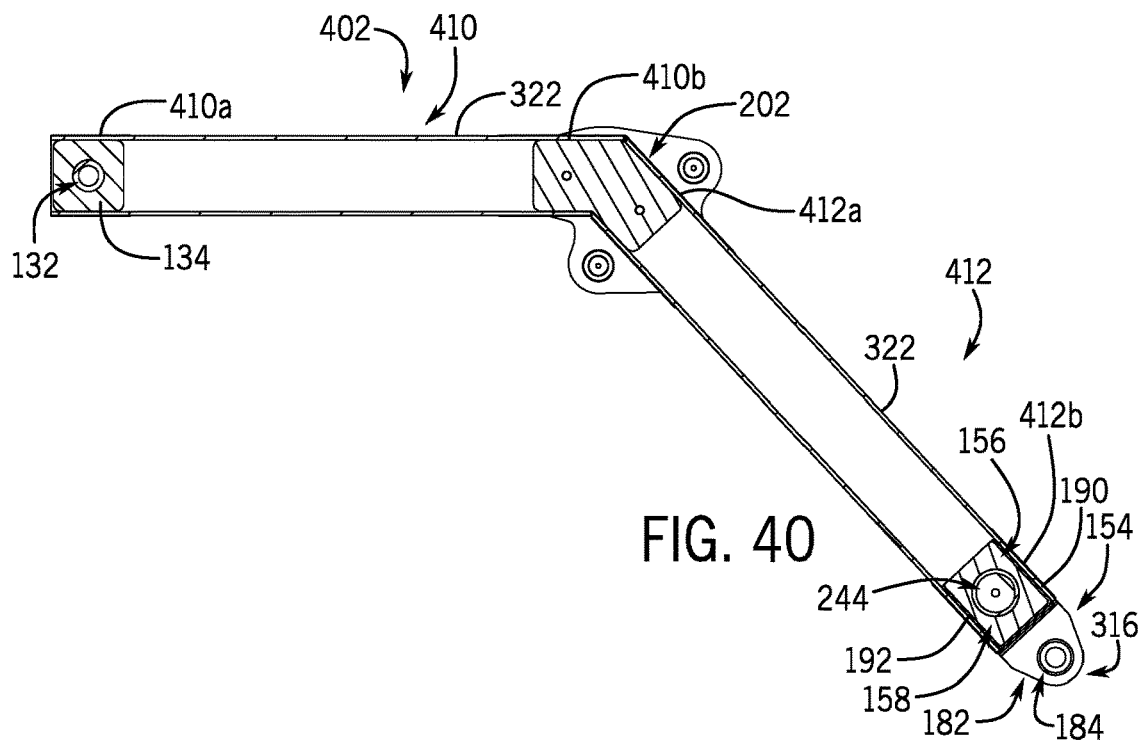
FIG. 40 is a cross-sectional view of one arm assembly of the hybrid loader boom arm assembly, taken along line 40-40 of FIG. 36.

The flange assembly 154 cooperates with the first outer plate 150 and the second inner plate 152 for coupling the bucket 52 (FIG. 1) to the arm assembly 402. The second block 158 is received wholly within the outer tube 322 at the fourth end 412b of the second beam 412. The second block 158 is received within the outer tube 322 such that the fourth bore 128 and the fifth bore 129 of the second beam 412 are coaxially aligned with the second cross-bore 196 of the second block 158. In addition, the second block 158 may be coupled to the outer tube 322 via the adhesive, which may surround the second block 158 to fixedly retain the second block 158 within the outer tube 322. The bucket mount bracket subassembly 316 is coupled to the second beam 412 such that the second block 158 is received wholly within the outer tube 322 of the second beam 412, and the flange assembly 154 is disposed external to the second beam 412 (FIG. 40). The first leg 190 and the second leg 192 are coupled to the slots 198, and the retaining base 194 is coupled to the base 180 of the flange assembly 154. The first reinforcing plate 340 and the second reinforcing plate 342 are coupled about the outer tube 322 at the fourth end 412b of the second beam 412, via the adhesive, for example, to define an exterior surface of the second beam 412 at the fourth end 412b. The first reinforcing plate 340 and the second reinforcing plate 342 cooperate to enclose the outer tube 322 at the fourth end 412b.

The knee mounting subassembly 320 interconnects the first beam 410 with the second beam 412. The knee mounting subassembly 320 includes the pair of knee plates 200, the angled block 202 (FIG. 40), the pair of coupling pins 204, the first pair of reinforcing plates 360 and the second pair of reinforcing plates 362. The angled block 202 is received wholly within a portion of the outer tube 322 of the first beam 410 and a portion of the outer tube 322 of the second beam 412 when the arm assembly 402 is assembled. The first pair of reinforcing plates 360 is coupled about the outer tube 322 at the second end 410b of the first beam 410 to define an exterior surface of the first beam 410 at the second end 410b. The second pair of reinforcing plates 362 is coupled about the outer tube 322 at the third end 412a of the second beam 412, via the adhesive, for example, to define an exterior surface of the second beam 412 at the third end 412a.

The torque transfer tube 66 interconnects the arm assembly 402 and the second arm assembly 404. The torque transfer tube 66 is coupled to each of the arm assembly 402 and the second arm assembly 404 at the fourth end 412b of the respective second beam 412. In this example, the adhesive may be applied to the surface 244a of the third block 244 to aid in coupling the third block 244 to the outer tube 322 of the second beam 412 (FIG. 40). In one example, the adhesive is also applied about the second cross-bore 196 of the second blocks 158 to further couple the first tube end 240 and the second tube end 242 to the respective second block 158.

The first beams 410, the second beams 412, the vehicle mounting assemblies 314, the bucket mount bracket subassemblies 316, 318, the knee mounting subassemblies 320, the torque transfer tube 66, the adhesive, the mechanical fasteners 227 and the flange nuts 229 comprise a kit 450 for the HLBAA 400. In one example, in order to assemble the arm assembly 402 and the second arm assembly 404, with the outer tubes 322 formed and the angled blocks 202 formed, with reference to FIG. 40, the angled blocks 202 are inserted into the second end 410b of a respective one of the outer tubes 322 associated with the first beam 410 and the third end 412a of a respective one of the outer tubes 322 associated with the second beam 412 to couple two of the outer tubes 322 together. This is repeated to form two subassemblies, one for each of the arm assembly 402 and the second arm assembly 404. The adhesive may be applied to the angled blocks 202 and used to couple the angled blocks 202 to the outer tubes 322 of the first beam 410 and the second beam 412.

With reference to FIGS. 37 and 40, with the retaining flanges 182 formed with the base 180, the bushing 184 is inserted through the bores 186 and coupled to the retaining flanges 182, via welding, for example. With the retaining flange 156 formed, the retaining flange 156 is coupled to the base 180, via welding, for example. With the second block 158 formed, the retaining flange 156 is coupled to the second block 158 (FIG. 34). Generally, with a layer of the adhesive applied to the slots 198 and the surface 158a of the second block 158, the first leg 190 and the second leg 192 are coupled to the slots 198 such that the first surface 194a contacts the surface 158a of the second block 158. The second block 158 is inserted into the fourth end 412b of one of the second beams 412. In one example, the adhesive is applied about the second block 158 to further couple the second block 158 to the outer tube 322. This process is repeated to couple another one of the second blocks 158 to the outer tube 322 associated with the other of the second beams 312.

With reference to FIGS. 37 and 40, with the blocks 134 formed, one of the blocks 134 is inserted into the first end 410a of one of the first beams 410, and the other of the blocks 134 is inserted into the first end 410a of the other of the first beams 410. The blocks 134 may be coupled to the outer tube 322 via the adhesive, which may surround the blocks 134 to fixedly retain the blocks 134 within the outer tube 322. One of the sleeves 132 is inserted through the first through bore 122 and the cross-bore 142 of the block 134 coupled to the first beam 410 of the arm assembly 402, and the other of the sleeves 132 is inserted through the first through bore 122 and the cross-bore 142 of the block 134 coupled to the first beam 410 of the second arm assembly 404.

With reference to FIGS. 37 and 40, with the first pair of reinforcing plates 360 formed, the first pair of reinforcing plates 360 is coupled about each of the first beams 410, via the adhesive, for example. With the second pair of reinforcing plates 362 formed, the second pair of reinforcing plates 362 are coupled about each of the second beams 412, via the adhesive, for example. The knee plates 200 are coupled to the reinforcing plates 360, 362, via welding, for example. With reference to FIG. 28, with the first reinforcing plate 340 and the second reinforcing plate 342 formed, the first reinforcing plate 340 and the second reinforcing plate 342 are coupled about the second beams 412, via the adhesive, for example. The first outer plates 150 are coupled to the second reinforcing plates 342 and the second inner plates 152 are coupled to the first reinforcing plates 340, via welding, for example. With the reinforcing plates 330 formed, the reinforcing plates 330 are coupled about the first beams 410, via the adhesive, for example. One of the pair of lock plates 130 is coupled to the first end 132a of the sleeve 132 of the arm assembly 402, and the other one of the lock plates 130 is coupled to the second end 132b to couple the sleeve 132 to the first beam 410 of the arm assembly 402. One of the pair of lock plates 130 is coupled to the first end 132a of the sleeve 132 of the second arm assembly 404, and the other one of the lock plates 130 is coupled to the second end 132b to couple the sleeve 132 to the first beam 410 of the second arm assembly 404.

With reference to FIG. 37, the mechanical fasteners 227 are inserted through the first plate bores 214 of each pair of knee plates 200 (FIG. 32), the first block bore 226 of the angled block 202 and the central plate bore 370 of the first pair of reinforcing plates 360. The mechanical fasteners 227 are secured with the flange nut 229, for example. The mechanical fasteners 227 are inserted through the second plate bores 216 of each pair of knee plates 200, the second block bore 228 of the angled block 202 and the central plate bore 376 of the second pair of reinforcing plates 362. The mechanical fasteners 227 are secured with the flange nut 229 to reinforce the connection of the knee plates 200 to the respective first beam 410 and the second beam 412. The coupling pins 204 are inserted through the first pin bore 218 and the second pin bore 220, respectively, and the collars 230 are coupled about the opposed ends of the coupling pins 204. Pins are inserted through the bores 204a of the coupling pins 204 and the cross-bores 232b of the collars 230 to couple the coupling pins 204 to the respective pair of knee plates 200.

With reference to FIGS. 37 and 40, with the torque transfer tube 66 formed, the adhesive is applied to the surface 244a and the second surface 244b of the third block 244 and the third block 244 is inserted into the first tube end 240. This process is repeated to couple another one of the third blocks 244 to the second tube end 242. With the third block 244 coupled to the first tube end 240, the first tube end 240 is positioned within the second cross-bore 196 of the second block 158 such that the shank 246a extends through the fourth bore 128 of the second beam 412 and the first plate bore 164 of the first outer plate 150. In one example, the adhesive is applied about the second cross-bore 196 to further couple the first tube end 140 to the second block 158. The flange nut 248 is coupled to the shank 246a to couple the first tube end 240 to the arm assembly 62. The second tube end 242 is positioned within the second cross-bore 196 of the second block 158 such that the shank 246a extends through the fourth bore 128 of the second beam 412 and the first plate bore 164 of the first outer plate 150. In one example, the adhesive is applied about the second cross-bore 196 to further couple the second tube end 242 to the second block 158. The flange nut 248 is coupled to the shank 246a to couple the second tube end 242 to the arm assembly 402.

With the HLBAA 400 assembled, the first end 410a of the first beams 410 of the HLBAA 400 may be coupled to the loader 10 (FIG. 1) or the compact utility tractor 1000 (FIG. 1A) via the pin 252 (FIG. 2) engaging the sleeves 132 of the respective vehicle mounting assemblies 314. The fourth end 412b of the second beams 412 of the HLBAA 400 may be coupled to the couplers 74, 76 for coupling the bucket 52 (FIG. 1 or FIG. 1A) to the HLBAA 400 by engaging the coupling pins 80 (FIG. 2) with each of the bushings 184 of each of the bucket mount bracket subassemblies 316, 318 and the couplers 74, 76. The hydraulic cylinders 34, 36, 38 may also be coupled to the coupling pins 204 of the arm assembly 402 and the second arm assembly 404.

Figure 41:
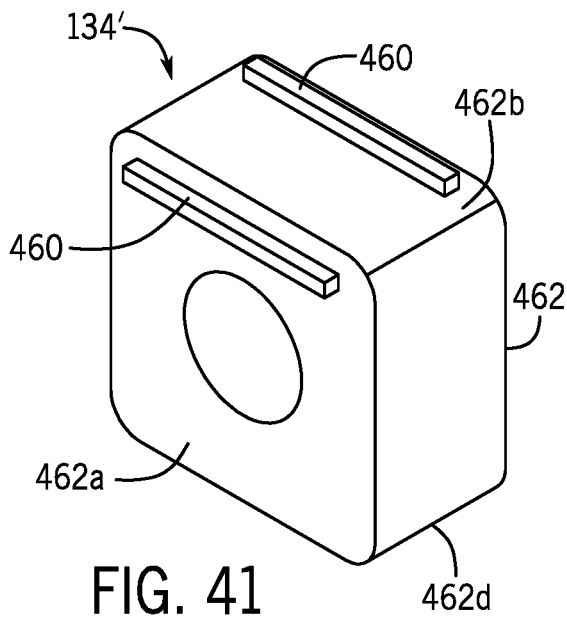
FIG. 41 is a perspective view of an example block having at least one rib for use with one of the hybrid loader boom arm assemblies of FIG. 1, 20 or 36 in accordance with various embodiments.
Figure 42:
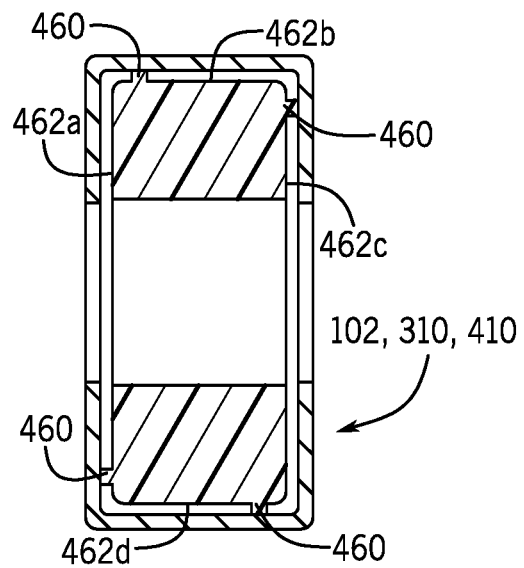
FIG. 42 is a cross-sectional schematic view that illustrates the block of FIG. 41 positioned within a first beam of one of the hybrid loader boom arm assemblies of FIG. 1, 20 or 36 in accordance with various embodiments.

It should be noted that the HLBAA 50 described with regard to FIGS. 1-19, the HLBAA 300 described with regard to FIGS. 20-35 and the HLBAA 400 described with regards to FIGS. 36-40 may be configured differently to couple a work implement, such as the bucket 52, to a work vehicle, such as the loader 10. In one example, with reference to FIGS. 41 and 42, one or more of the blocks 134, 158, 202 may be configured differently to assist in coupling the respective one of the blocks 134, 158, 202 to the respective one of the first beams 100, 310, 410 and/or second beams 102, 312, 412. For example, each of the blocks 134, 158, 202 may include at least one or a plurality of ribs 460. The ribs 460 may be formed integrally with or are monolithic with the respective block 134, 158, 202. In the example of FIGS. 41 and 42, an example block 134' is shown with four integral ribs 460. The ribs 460 are defined or formed integrally with the block 134' on each of the four sides 462a-462d of the block 134'. Each of the ribs 460 extend a distance beyond the respective side 462a-462d of the block 134' to assist in positioning the block 134' within the respective first beam 100, 310, 410. It should be noted that while the ribs 460 are illustrated as rectangular, the ribs 460 may have any desired shape that extends a distance above the respective side 462a-462d to aid in the insertion of the block 134' into the respective first beam 100, 310, 410. It should also be understood that the third block 244 may also include one or more of the ribs 460 to aid in the insertion of the third block 244 into the torque transfer tube 66.

Figure 43:
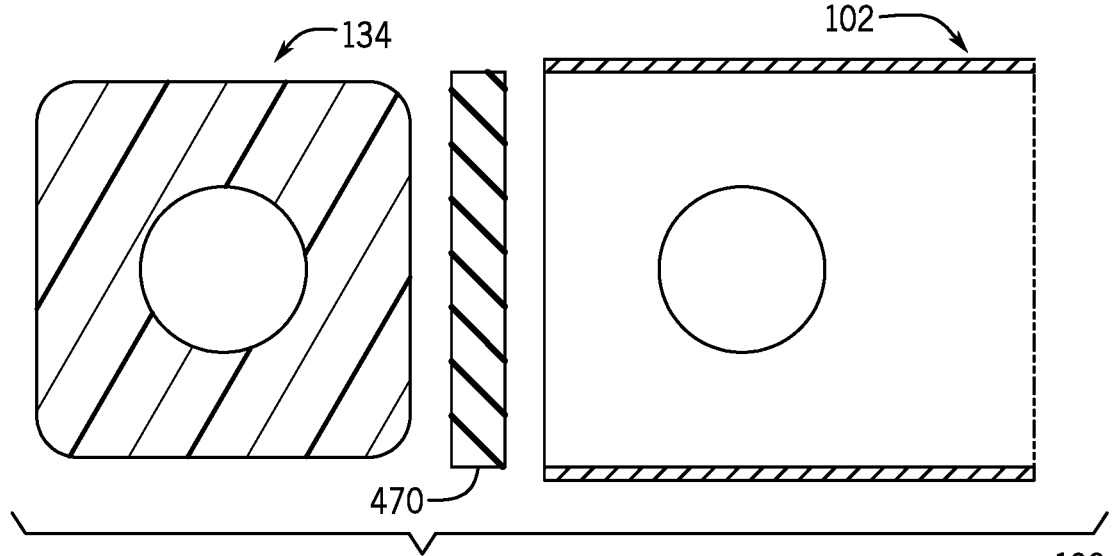
FIG. 43 is a partially exploded cross-sectional schematic view that illustrates an insert for use with coupling a block to one of the first beams of the hybrid loader boom arm assemblies of FIG. 1, 20 or 36 in accordance with various embodiments.
Figure 44:
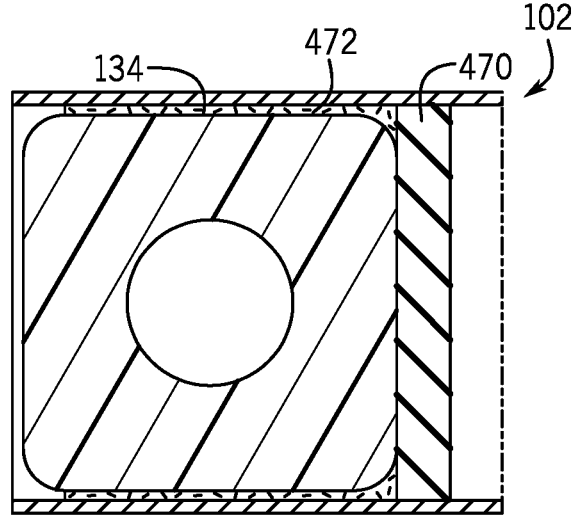
FIG. 44 is a cross-sectional schematic view that illustrates the block coupled to the first beam with an adhesive that is retained by the insert.

It should be noted that the HLBAA 50 described with regard to FIGS. 1-19, the HLBAA 300 described with regard to FIGS. 20-35 and the HLBAA 400 described with regards to FIGS. 36-40 may be configured differently to couple a work implement, such as the bucket 52, to a work vehicle, such as the loader 10. In one example, with reference to FIGS. 43 and 44, one or more of the blocks 134, 158, 202 may be configured differently to assist in coupling the respective one of the blocks 134, 158, 202 to the respective one of the first beams 100, 310, 410 and/or second beams 102, 312, 412. For example, each of the blocks 134, 158, 202 may include at least one insert or foam block 470. In the example of FIGS. 43 and 44, the block 134 is shown. It should be noted that the foam block 470 may be employed with the second block 158 and the angled block 202. Moreover, the foam block 470 may be employed with the third block 244 to couple the third block 244 to the torque transfer tube 66.

The foam block 470 may be discrete from the respective block 134, 158, 202, and may be composed of a suitable medium-density foam. In one example, the foam block 470 is composed of polyurethane, and is insert molded. Alternatively, the foam block 470 may be molded into the respective one of the first beams 100, 310, 410 and/or second beams 102, 312, 412 during the formation of the respective one of the first beams 100, 310, 410 and/or second beams 102, 312, 412. The foam block 470 has a cross-section that corresponds to a cross-section of the respective one of the respective one of the first beams 100, 310, 410 and/or second beams 102, 312, 412 such that the foam block 470 may be positioned within the respective one of the first beams 100, 310, 410 and/or second beams 102, 312, 412. With reference to FIG. 44, the foam block 470 is generally inserted into the respective one of the first beams 100, 310, 410 and/or second beams 102, 312, 412 prior to the insertion of the respective block 134, 158, 202 to serve as a dam to prevent the further advancement of the adhesive 472 within the respective one of the first beams 100, 310, 410 and/or second beams 102, 312, 412. Stated another way, the foam block 470 blocks the flow of the adhesive 472 through the respective one of the first beams 100, 310, 410 and/or second beams 102, 312, 412, which results in the adhesive 472 encapsulating and bonding the respective one of the blocks 134, 158, 202 to the respective one of the first beams 100, 310, 410 and/or second beams 102, 312, 412. In the example of the third block 244, the foam block 470 may have a circular cross-section to block the flow of the adhesive 472 through the torque transfer tube 66, which results in the adhesive 472 encapsulating and bonding the third blocks 244 to the torque transfer tube 66.

Figure 45:
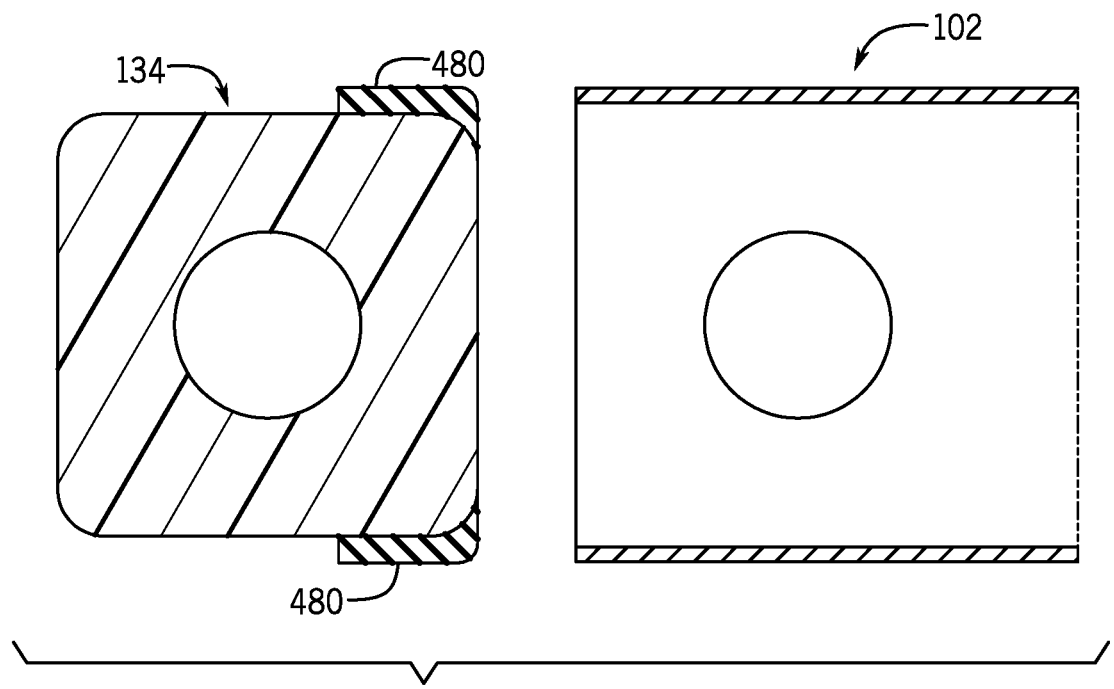
FIG. 45 is a partially exploded cross-sectional schematic view that illustrates an energy activated foam for use with coupling a block to one of the first beams of the hybrid loader boom arm assemblies of FIG. 1, 20 or 36 in accordance with various embodiments.

It should be noted that the HLBAA 50 described with regard to FIGS. 1-19, the HLBAA 300 described with regard to FIGS. 20-35 and the HLBAA 400 described with regards to FIGS. 36-40 may be configured differently to couple a work implement, such as the bucket 52, to a work vehicle, such as the loader 10. In one example, with reference to FIGS. 45 and 46, one or more of the blocks 134, 158, 202 may be configured differently to assist in coupling the respective one of the blocks 134, 158, 202 to the respective one of the first beams 100, 310, 410 and/or second beams 102, 312, 412. For example, each of the blocks 134, 158, 202 may include at least one energy activated foam block 480. In the example of FIGS. 45 and 45, the block 134 is shown. It should be noted that the energy activated foam block 480 may be employed with the second block 158 and the angled block 202. Moreover, the energy activated foam block 480 may be employed with the third block 244 to couple the third block 244 to the torque transfer tube 66.

Figure 46:
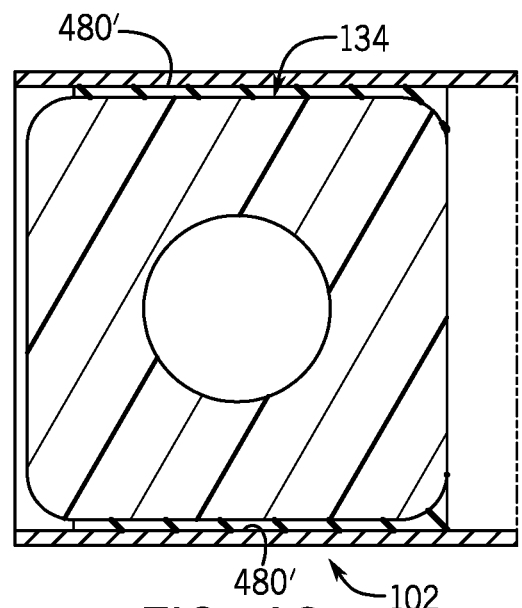
FIG. 46 is a cross-sectional schematic view that illustrates the energy activated foam of FIG. 45 in an activated state to couple the block to the first beam.

The energy activated foam block 480 may be composed of an energy activated foam, including, but not limited to, expandable epoxy products commercially available from Sika Automotive AG, such as SIKAREINFORCER®, which may be co-molded with the respective block 134, 158, 202, 244. In this example, the energy activated foam block 480 may be activated by an external source to cause the energy activated foam block 480 to expand into a foam layer 480' that encapsulates and secures the respective block 134, 158, 202 to the respective one of the first beams 100, 310, 410 and/or second beams 102, 312, 412 as shown in FIG. 46. In the example of the third block 244, the energy activated foam block 480 may be activated by an external source to cause the energy activated foam block 480 to expand into the foam layer 480' and encapsulate and secure the third block 244 to the torque transfer tube 66.

Figure 47:
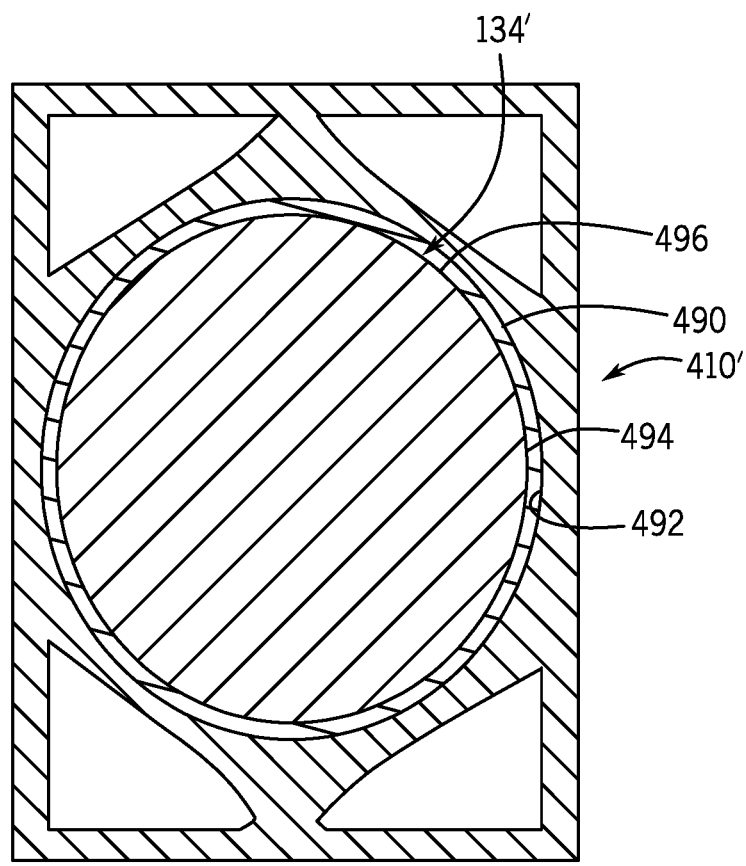
FIG. 47 is a cross-sectional schematic view of an example cross-section for one of the first beams and/or the second beams of the hybrid loader boom arm assemblies of FIG. 1, 20 or 36, and an example cross-section for one of the blocks of the hybrid loader boom arm assemblies of FIG. 1, 20 or 36.

It should be noted that the HLBAA 50 described with regard to FIGS. 1-19, the HLBAA 300 described with regard to FIGS. 20-35 and the HLBAA 400 described with regards to FIGS. 36-40 may be configured differently to couple a work implement, such as the bucket 52, to a work vehicle, such as the loader 10. In one example, with reference to FIG. 47, one or more of the blocks 134, 158, 202 and the first beams 100, 310, 410 and/or second beams 102, 312, 412 may be configured differently to assist in coupling the respective one of the blocks 134, 158, 202 to the respective one of the first beams 100, 310, 410 and/or second beams 102, 312, 412. For example, each of the blocks 134, 158, 202 may be formed with a circular cross-section, which may be received within a corresponding circular cross-section defined in the respective one of the first beams 100, 310, 410 and/or second beams 102, 312, 412. In the example of FIG. 47, a first beam 410' is shown with a hexagonal cross-section 490, which defines an internal cylindrical bore 492. The hexagonal cross-section 490 of first beam 410' is integrally formed with the first beam 410', via pultrusion, for example. A block 134' is formed with a circular cross-section 494, and is sized to be received within the cylindrical bore 492. The circular cross-section 494 of block 134' is formed, via pultrusion, for example. Alternatively, the block 134' may comprise a tube having a thickened wall, which is formed from G10 material via pultrusion, for example. By forming the block 134' with the circular cross-section, the adhesive 496 may be disposed about the perimeter of the block 134', and the block 134' may be inserted and bonded to the first beam 410' by inserting the block 134' and twisting the block 134' within the first beam 410', which may reduce assembly time.

Also, the following examples are provided, which are numbered for easier reference:

1. A hybrid loader boom arm assembly for a loader work vehicle, the loader boom arm comprising: an arm assembly that includes: a hollow first beam formed from a lightweight material; a block formed from a second lightweight material, the block having a first block end received within a first end of the first beam; at least one first steel reinforcing plate coupled to the first beam at the end; and at least one connecting plate coupled to the at least one first reinforcing plate.

2. The loader boom arm of example 1, wherein the first beam has a third end opposite the first end, and the third end receives a second block formed from the second lightweight material.

3. The loader boom arm of example 2, wherein the second block defines a cross-bore and the loader boom arm further comprises a sleeve, the sleeve coupled to the cross-bore and configured to couple the arm assembly to the loader work vehicle.

4. The loader boom arm of example 3, further comprising a pair of lock plates coupled to opposed ends of the sleeve to retain the sleeve within the cross-bore at the third end of the first beam.

5. The loader boom arm of example 4, further comprising at least one second steel reinforcing plate, the at least one second steel reinforcing plate coupled to the third end of the first beam and at least one of the pair of lock plates is adjacent to the at least one second steel reinforcing plate.

6. The loader boom arm of example 5, wherein the at least one second steel plate extends from the first end of the first beam to the third end of the first beam.

7. The loader boom arm of example 1, wherein the block has a second block end, the loader boom arm further comprising a hollow second beam formed from the lightweight material and at least one third steel reinforcing plate coupled to the second beam at the second end, the second block end received within a second end of the ii second beam to couple the second beam to the first beam, the second beam has a fourth end opposite the second end, and a third block formed from the second lightweight material is coupled within the fourth end.

8. The loader boom arm of example 7, wherein the third block defines a pair of opposed slots and a third bore, and the loader boom arm further comprises a bucket mount bracket, the bucket mount bracket coupled to each of the pair of opposed slots.

9. The loader boom arm of example 8, further comprising a hollow torque transfer tube, the torque transfer tube having a first tube end coupled to the third bore.

10. The loader boom arm of example 9, further comprising a second arm assembly, the second arm assembly including a second third block coupled within an end of a fourth beam, and a second tube end of the torque transfer tube is coupled to the second third block of the second arm assembly.

11. The loader boom arm of example 1, wherein each of the blocks includes at least one rib on a perimeter of the respective block to align the block within the respective first end.

12. The loader boom arm of example 1, wherein each of the blocks includes an insert that cooperates with an adhesive to couple each of the blocks within the respective first end.

13. The loader boom arm of example 1, wherein the first beam further comprises a hollow tube formed from a third lightweight material disposed over and coupled to the first beam.

14. The loader boom arm of example 2, wherein the first beam is formed to define a cylindrical interior channel for receiving the second block.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hybrid loader boom arm assembly for a loader work vehicle, the loader boom arm comprising:
   an arm assembly that includes:
      a hollow first beam formed from a lightweight material;
      a block formed from a second lightweight material, the block received within a first end of the first beam forming a vehicle mounting subassembly;
      at least one first steel reinforcing plate coupled to and outer wall of the first beam;
      at least one connecting plate coupled to the at least one first reinforcing plate, thereby disposing the first reinforcing plate between the at least one connecting plate and the outer wall of the first beam at an opposite second end of the first beam.

2. The loader boom arm of claim 1, wherein the first beam has a third end opposite the first end, and the third end receives a second block formed from the second lightweight material.

3. The loader boom arm of claim 2, wherein the second block defines a cross- bore and the loader boom arm further comprises a sleeve, the sleeve coupled to the cross-bore and configured to couple the arm assembly to the loader work vehicle.

4. The loader boom arm of claim 3, further comprising a pair of lock plates coupled to opposed ends of the sleeve to retain the sleeve within the cross-bore at the third end of the first beam.

5. The loader boom arm of claim 4, further comprising at least one second steel reinforcing plate, the at least one second steel reinforcing plate coupled to the third end of the first beam and at least one of the pair of lock plates is adjacent to the at least one second steel reinforcing plate.

6. The loader boom arm of claim 5, wherein the at least one second steel reinforcing plate extends from the first end of the first beam to the third end of the first beam.

7. The loader boom arm of claim 5, wherein the block has a second block end, the loader boom arm further comprising a hollow second beam formed from the lightweight material and at least one third steel reinforcing plate coupled to the second beam at the second end, the second block end received within a second end of the second beam to couple the second beam to the first beam, the second beam has a fourth end opposite the second end, and a third block formed from the second lightweight material is coupled within the fourth end.

8. The loader boom arm of claim 7, wherein the third block defines a pair of opposed slots and a third bore, and the loader boom arm further comprises a bucket mount bracket, the bucket mount bracket coupled to each of the pair of opposed slots.

9. The loader boom arm of claim 8, further comprising a hollow torque transfer tube, the torque transfer tube having a first tube end coupled to the third bore.

10. The loader boom arm of claim 9, further comprising a second arm assembly, the second arm assembly including a second third block coupled within an end of a fourth beam, and a second tube end of the torque transfer tube is coupled to the second third block of the second arm assembly.

11. The loader boom arm of claim 1, wherein the block includes at least one rib disposed on a perimeter of the block to align the block within the first end of the first beam.

12. The loader boom arm of claim 1, wherein each of the blocks includes an insert that cooperates with an adhesive to couple each of the blocks within the respective first end.

13. The loader boom arm of claim 1, wherein the first beam further comprises a hollow tube formed from a third lightweight material disposed over and coupled to the first beam.

14. The loader boom arm of claim 2, wherein the first beam is formed to define a cylindrical interior channel for receiving the second block.

15. A hybrid loader boom arm assembly for a loader work vehicle, the loader boom arm comprising:
   an arm assembly that includes:
      a hollow first beam formed from a lightweight material;
      a hollow second beam formed from the lightweight material;
      a block formed from a second lightweight material, the block received within a first end of the first beam and received within a second end of the second beam, the block configured to couple the first beam to the second beam to form a vehicle mounting subassembly;
      at least one first steel reinforcing plate coupled to the first beam at the first end;
      at least one second steel reinforcing plate coupled to the second beam at the second end; and
      at least one connecting plate coupled to the at least one first reinforcing plate and the at least one second reinforcing plate, thereby disposing the first reinforcing plate between the at least one connecting plate and the outer wall of the first beam at an opposite second end of the first beam.

16. The loader boom arm of claim 15, wherein the first beam has a third end opposite the first end, the third end receives a second block formed from the second lightweight material, the second block defines a cross-bore and the loader boom arm further comprises a sleeve, the sleeve coupled to the cross-bore and configured to couple the arm assembly to the loader work vehicle.

17. The loader boom arm of claim 16, further comprising a pair of lock plates coupled to opposed ends of the sleeve to retain the sleeve within the cross-bore at the third end of the first beam.

18. The loader boom arm of claim 15, wherein the second beam has a fourth end opposite the second end, and a third block formed from the second lightweight material is coupled within the fourth end.

19. The loader boom arm of claim 18, wherein the third block defines a pair of opposed slots and a third bore, and the loader boom arm further comprises a bucket mount bracket, the bucket mount bracket coupled to each of the pair of opposed slots.

20. The loader boom arm of claim 19, further comprising a hollow torque transfer tube and a second arm assembly, the torque transfer tube having a first tube end coupled to the third bore, the second arm assembly including a second third block coupled within an end of a fourth beam, and a second tube end of the torque transfer tube is coupled to the second third block of the second arm assembly.

* * * * *